US010525898B2

(12) United States Patent
Dry et al.

(10) Patent No.: US 10,525,898 B2
(45) Date of Patent: Jan. 7, 2020

(54) ELECTRONIC DEVICE HOLDER FOR A VEHICLE SEAT

(71) Applicant: Ford Global Technologies, LLC, Dearborn, MI (US)

(72) Inventors: Alan George Dry, Grosse Pointe Woods, MI (US); Gunnar Groesbeck, Traverse City, MI (US); Joseph S. Talamonti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/045,215

(22) Filed: Jul. 25, 2018

(65) Prior Publication Data

US 2018/0326918 A1 Nov. 15, 2018

Related U.S. Application Data

(63) Continuation of application No. 14/565,749, filed on Dec. 10, 2014, now Pat. No. 10,065,570.

(51) Int. Cl.
*B60R 11/02* (2006.01)
*B60R 11/00* (2006.01)

(52) U.S. Cl.
CPC ....... *B60R 11/02* (2013.01); *B60R 2011/0015* (2013.01); *B60R 2011/0075* (2013.01)

(58) Field of Classification Search
CPC .......... B64D 11/0015; B64D 11/00152; B60R 11/02; B60R 11/0252; H05K 5/0221
(Continued)

(56) References Cited

U.S. PATENT DOCUMENTS 2,958,369 A  11/1960 Pitts et al.
3,403,938 A  10/1968 Cramer et al.
(Continued)

FOREIGN PATENT DOCUMENTS

EP  0754590  1/1997
EP  0926969  1/2002
(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.
(Continued)

*Primary Examiner* — Adam J Waggenspack
(74) *Attorney, Agent, or Firm* — Vichit Chea; Price Heneveld LLP

(57) ABSTRACT

An electronic device holder includes a mounting surface configured to receive and retain an electronic device. First and second doors are disposed on opposite sides of the mounting surface and are gearingly engaged to one another on a rear side of the mounting surface for synchronized lateral movement between open and closed positions. An actuator is disposed on either the first or second door for actuating the doors to the open position from the closed position. A detent lever is pivotally coupled to either the first or second door and is configured to detent the doors in the open position. A detent release lever is pivotally coupled to the mounting surface, and is configured to release the detent lever such that the doors automatically move from the open position to the closed position.

18 Claims, 48 Drawing Sheets

(58) Field of Classification Search
USPC .................................. 224/929, 255; 248/924
See application file for complete search history.

(56) References Cited

U.S. PATENT DOCUMENTS

| | | | |
|---|---|---|---|
| 3,929,374 | A | 12/1975 | Hogan et al. |
| 4,324,431 | A | 4/1982 | Murphy et al. |
| 4,334,709 | A | 6/1982 | Akiyama et al. |
| 4,353,595 | A | 10/1982 | Kaneko et al. |
| 4,541,669 | A | 9/1985 | Goldner |
| 4,629,248 | A | 12/1986 | Mawbey |
| 4,720,141 | A | 1/1988 | Sakamoto et al. |
| 4,915,447 | A | 4/1990 | Shovar |
| 5,171,062 | A | 12/1992 | Courtois |
| 5,174,526 | A | 12/1992 | Kanigowski |
| 5,457,745 | A | 10/1995 | Wang |
| 5,518,294 | A | 5/1996 | Ligon, Sr. et al. |
| 5,560,681 | A | 10/1996 | Dixon et al. |
| 5,647,635 | A | 7/1997 | Aumond et al. |
| 5,755,493 | A | 5/1998 | Kodaverdian |
| 5,769,489 | A | 6/1998 | Dellanno |
| 5,775,778 | A | 7/1998 | Riley et al. |
| 5,826,938 | A | 10/1998 | Yanase et al. |
| 5,836,648 | A | 11/1998 | Karschin et al. |
| 5,895,094 | A | 4/1999 | Mori et al. |
| 5,902,014 | A | 5/1999 | Dinkel et al. |
| 5,913,568 | A | 6/1999 | Brightbill et al. |
| 5,951,039 | A | 9/1999 | Severinski et al. |
| 6,024,406 | A | 2/2000 | Charras et al. |
| 6,062,642 | A | 5/2000 | Sinnhuber et al. |
| 6,145,925 | A | 11/2000 | Eksin et al. |
| 6,155,593 | A | 12/2000 | Kimura et al. |
| 6,179,379 | B1 | 1/2001 | Andersson |
| 6,189,966 | B1 | 2/2001 | Faust et al. |
| 6,196,627 | B1 | 3/2001 | Faust et al. |
| 6,206,466 | B1 | 3/2001 | Komatsu |
| 6,217,062 | B1 | 4/2001 | Breyvogel et al. |
| 6,220,661 | B1 | 4/2001 | Peterson |
| 6,224,150 | B1 | 5/2001 | Eksin et al. |
| 6,292,236 | B1 | 9/2001 | Rosen |
| 6,296,308 | B1 | 10/2001 | Cosentino et al. |
| 6,312,050 | B1 | 11/2001 | Eklind |
| 6,364,414 | B1 | 4/2002 | Specht |
| 6,375,269 | B1 | 4/2002 | Maeda et al. |
| 6,394,546 | B1 | 5/2002 | Knoblock et al. |
| 6,454,353 | B1 | 9/2002 | Knaus |
| 6,523,892 | B1 | 2/2003 | Kage et al. |
| 6,550,856 | B1 | 4/2003 | Ganser et al. |
| 6,565,150 | B2 | 5/2003 | Fischer et al. |
| 6,619,605 | B2 | 9/2003 | Lambert |
| 6,682,140 | B2 | 1/2004 | Minuth et al. |
| 6,695,406 | B2 | 2/2004 | Plant |
| 6,698,832 | B2 | 3/2004 | Boudinot |
| 6,736,452 | B2 | 5/2004 | Aoki et al. |
| 6,758,522 | B2 | 7/2004 | Ligon, Sr. et al. |
| 6,769,582 | B1 | 8/2004 | Beletsky et al. |
| 6,808,230 | B2 | 10/2004 | Buss et al. |
| 6,824,212 | B2 | 11/2004 | Malsch et al. |
| 6,848,742 | B1 | 2/2005 | Aoki et al. |
| 6,860,559 | B2 | 3/2005 | Schuster, Sr. et al. |
| 6,860,564 | B2 | 3/2005 | Reed et al. |
| 6,866,339 | B2 | 3/2005 | Itoh |
| 6,869,140 | B2 | 3/2005 | White et al. |
| 6,890,029 | B2 | 5/2005 | Svantesson |
| 6,938,953 | B2 | 9/2005 | Håland et al. |
| 6,955,399 | B2 | 10/2005 | Hong |
| 6,962,392 | B2 | 11/2005 | O'Connor |
| 6,969,118 | B2 | 11/2005 | Yamada |
| 6,988,770 | B2 | 1/2006 | Witchie |
| 6,997,473 | B2 | 2/2006 | Tanase et al. |
| 7,040,699 | B2 | 5/2006 | Curran et al. |
| 7,082,036 | B2* | 7/2006 | Cheng .................... G06F 1/181 |
| | | | 292/19 |
| 7,100,992 | B2 | 9/2006 | Bargheer et al. |
| 7,131,694 | B1 | 11/2006 | Buffa |
| 7,149,078 | B2 | 12/2006 | Schedivy |
| 7,159,934 | B2 | 1/2007 | Farquhar et al. |
| 7,185,950 | B2 | 3/2007 | Pettersson et al. |
| 7,208,686 | B1* | 4/2007 | Chen ...................... G06F 1/181 |
| | | | 174/559 |
| 7,213,876 | B2 | 5/2007 | Stoewe |
| 7,229,118 | B2 | 6/2007 | Saberan et al. |
| 7,261,371 | B2 | 8/2007 | Thunissen et al. |
| 7,272,984 | B2 | 9/2007 | Fan |
| 7,344,189 | B2 | 3/2008 | Reed et al. |
| 7,350,859 | B2 | 4/2008 | Klukowski |
| 7,393,005 | B2 | 7/2008 | Inazu et al. |
| 7,425,034 | B2 | 9/2008 | Bajic et al. |
| 7,441,838 | B2 | 10/2008 | Patwardhan |
| 7,467,823 | B2 | 12/2008 | Hartwich |
| 7,478,869 | B2 | 1/2009 | Lazanja et al. |
| 7,481,489 | B2 | 1/2009 | Demick |
| 7,506,924 | B2 | 3/2009 | Bargheer et al. |
| 7,506,938 | B2 | 3/2009 | Brennan et al. |
| 7,530,633 | B2 | 5/2009 | Yokota et al. |
| 7,543,888 | B2 | 6/2009 | Kuno |
| 7,551,458 | B2 | 6/2009 | Carnevali |
| 7,578,552 | B2 | 8/2009 | Bajic et al. |
| 7,597,398 | B2 | 10/2009 | Lindsay |
| 7,614,693 | B2 | 11/2009 | Ito |
| 7,641,281 | B2 | 1/2010 | Grimm |
| 7,669,925 | B2 | 3/2010 | Beck et al. |
| 7,669,928 | B2 | 3/2010 | Snyder |
| 7,712,833 | B2 | 5/2010 | Ueda |
| 7,717,459 | B2 | 5/2010 | Bostrom et al. |
| 7,726,733 | B2 | 6/2010 | Balser et al. |
| 7,735,932 | B2 | 6/2010 | Lazanja et al. |
| 7,752,720 | B2 | 7/2010 | Smith |
| 7,753,451 | B2 | 7/2010 | Maebert et al. |
| 7,775,602 | B2 | 8/2010 | Lazanja et al. |
| 7,784,863 | B2 | 8/2010 | Fallen |
| 7,802,843 | B2 | 9/2010 | Andersson et al. |
| 7,819,470 | B2 | 10/2010 | Humer et al. |
| 7,823,971 | B2 | 11/2010 | Humer et al. |
| 7,845,729 | B2 | 12/2010 | Yamada et al. |
| 7,857,381 | B2 | 12/2010 | Humer et al. |
| 7,871,126 | B2 | 1/2011 | Becker et al. |
| 7,891,701 | B2 | 2/2011 | Tracht et al. |
| 7,909,360 | B2 | 3/2011 | Marriott et al. |
| 7,931,294 | B2 | 4/2011 | Okada et al. |
| 7,931,330 | B2 | 4/2011 | Itou et al. |
| 7,946,649 | B2 | 5/2011 | Galbreath et al. |
| 7,959,226 | B2 | 6/2011 | Hattori et al. |
| 7,963,553 | B2 | 6/2011 | Huynh et al. |
| 7,963,595 | B2 | 6/2011 | Ito et al. |
| 7,963,600 | B2 | 6/2011 | Alexander et al. |
| 7,971,931 | B2 | 7/2011 | Lazanja et al. |
| 7,971,937 | B2 | 7/2011 | Ishii et al. |
| 8,011,726 | B2 | 9/2011 | Omori et al. |
| 8,016,355 | B2 | 9/2011 | Ito et al. |
| 8,029,055 | B2 | 10/2011 | Hartlaub |
| 8,038,222 | B2 | 10/2011 | Lein et al. |
| 8,075,053 | B2 | 12/2011 | Tracht et al. |
| 8,109,569 | B2 | 2/2012 | Mitchell |
| 8,123,246 | B2 | 2/2012 | Gilbert et al. |
| 8,128,167 | B2 | 3/2012 | Zhong et al. |
| 8,162,391 | B2 | 4/2012 | Lazanja et al. |
| 8,162,397 | B2 | 4/2012 | Booth et al. |
| 8,167,370 | B2 | 5/2012 | Arakawa et al. |
| 8,210,568 | B2 | 7/2012 | Ryden et al. |
| 8,210,605 | B2 | 7/2012 | Hough et al. |
| 8,210,611 | B2 | 7/2012 | Aldrich et al. |
| 8,226,165 | B2 | 7/2012 | Mizoi |
| 8,267,443 | B1* | 9/2012 | Kuo ........................ G06F 1/181 |
| | | | 292/137 |
| 8,342,607 | B2 | 1/2013 | Hofmann et al. |
| 8,388,061 | B2 | 3/2013 | Saito et al. |
| 8,424,927 | B2* | 4/2013 | Tsai ....................... F16B 5/0664 |
| | | | 292/137 |
| 8,474,778 | B2 | 7/2013 | Jacobson |
| 8,727,192 | B2 | 5/2014 | Lai |
| 8,833,716 | B2 | 9/2014 | Funk et al. |
| 9,010,597 | B2* | 4/2015 | Prescott .................. B60R 7/088 |
| | | | 224/197 |

(56) References Cited

U.S. PATENT DOCUMENTS

| | | | |
|---|---|---|---|
| 9,022,469 B2 * | 5/2015 | Lavelle | B60R 11/0235 |
| | | | 297/217.3 |
| 9,421,914 B2 * | 8/2016 | Dry | B60N 2/879 |
| 9,797,542 B2 * | 10/2017 | Grziwok | F16M 11/04 |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0085383 A1 | 4/2009 | Hicks et al. | |
| 2009/0165263 A1 | 7/2009 | Smith | |
| 2009/0322124 A1 | 12/2009 | Barkow et al. | |
| 2010/0038937 A1 | 3/2010 | Andersson et al. | |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0121624 A1 | 5/2011 | Brncick et al. | |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0254335 A1 | 10/2011 | Pradier et al. | |
| 2011/0260506 A1 | 10/2011 | Kuno | |
| 2011/0272548 A1 * | 11/2011 | Rudkowski | F16B 5/121 |
| | | | 248/231.81 |
| 2011/0272978 A1 | 11/2011 | Nitsuma | |
| 2011/0278885 A1 | 11/2011 | Procter et al. | |
| 2011/0278886 A1 | 11/2011 | Nitsuma | |
| 2011/0298261 A1 | 12/2011 | Holt et al. | |
| 2011/0316311 A1 * | 12/2011 | Westerink | B60N 3/004 |
| | | | 297/163 |
| 2012/0032486 A1 | 2/2012 | Baker et al. | |
| 2012/0037754 A1 | 2/2012 | Kladde | |
| 2012/0063081 A1 | 3/2012 | Grunwald | |
| 2012/0080914 A1 | 4/2012 | Wang | |
| 2012/0091695 A1 | 4/2012 | Richez et al. | |
| 2012/0091766 A1 | 4/2012 | Yamaki et al. | |
| 2012/0091779 A1 | 4/2012 | Chang et al. | |
| 2012/0109468 A1 | 5/2012 | Baumann et al. | |
| 2012/0119551 A1 | 5/2012 | Brncick et al. | |
| 2012/0125959 A1 | 5/2012 | Kucera | |
| 2012/0127643 A1 | 5/2012 | Mitchell | |
| 2012/0129440 A1 | 5/2012 | Kitaguchi et al. | |
| 2012/0162891 A1 | 6/2012 | Tranchina et al. | |
| 2012/0175924 A1 | 7/2012 | Festag et al. | |
| 2012/0187729 A1 | 7/2012 | Fukawatase et al. | |
| 2012/0248833 A1 * | 10/2012 | Hontz | B60N 3/004 |
| | | | 297/188.05 |
| 2012/0261974 A1 | 10/2012 | Yoshizawa et al. | |
| 2013/0076092 A1 | 3/2013 | Kulkarni et al. | |
| 2013/0181492 A1 | 7/2013 | Prescott et al. | |
| 2013/0220877 A1 | 8/2013 | Stern | |
| 2014/0209648 A1 | 7/2014 | Jahn | |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |
| WO | 2012138699 A1 | 10/2012 |
| WO | 2013101644 A1 | 7/2013 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct. 9, 2012 (3 pages).

"Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

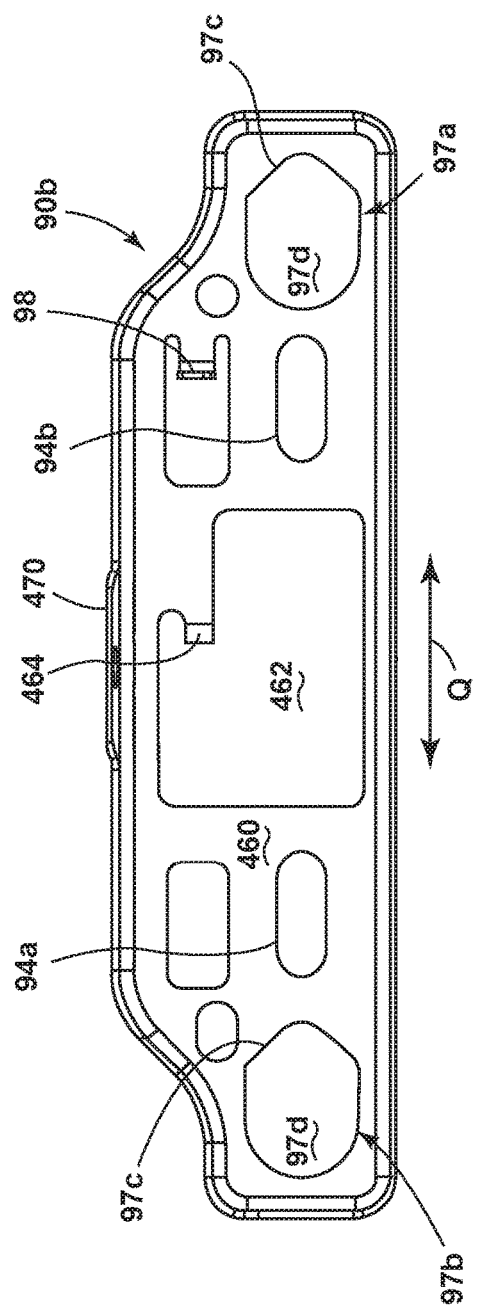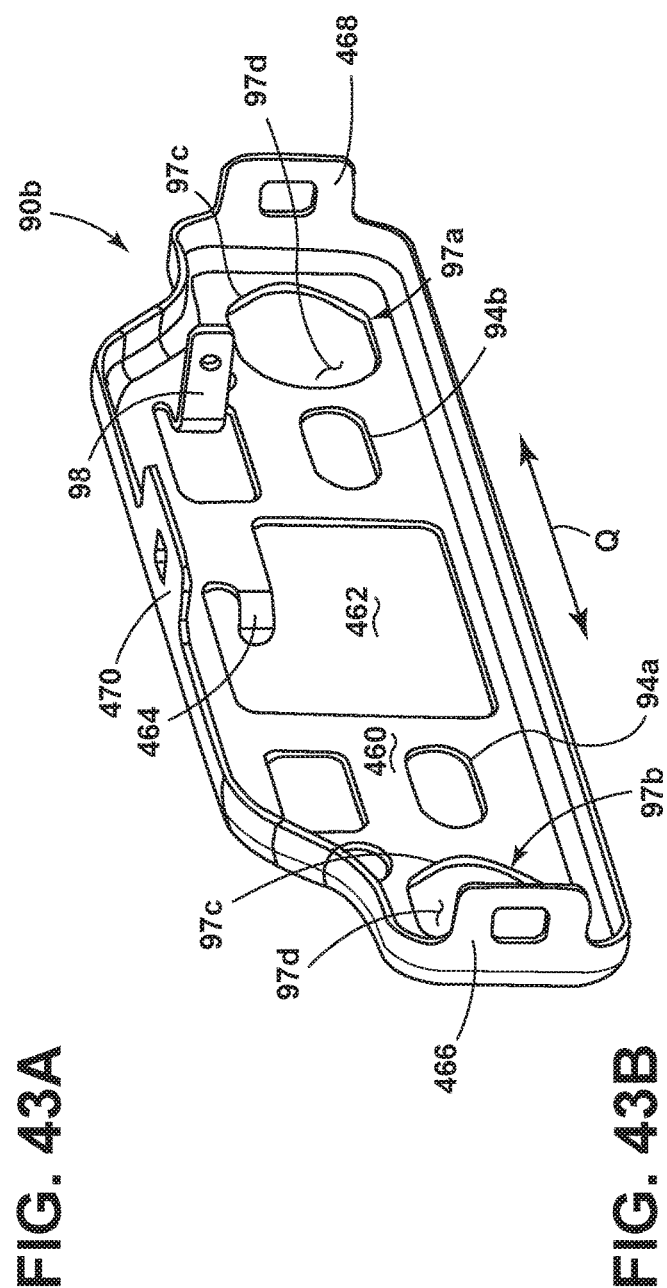
FIG. 43A
FIG. 43B

ELECTRONIC DEVICE HOLDER FOR A VEHICLE SEAT

CROSS-REFERENCE TO RELATED APPLICATION

This application is a continuation of U.S. patent application Ser. No. 14/565,749 (now U.S. Pat. No. 10,065,570), filed on Dec. 10, 2014, entitled ELECTRONIC DEVICE HOLDER FOR A VEHICLE SEAT, the entire disclosure of which is hereby incorporated herein by reference.

FIELD OF THE INVENTION

The present invention generally relates to a holder assembly for an electronic device for mounting to the rear of a seatback within a vehicle interior, and more specifically, to a holder assembly for an electronic device which provides for easy loading and electronic connectivity with the electronic device, while being mounted to the frame of a seatback without interfering with the set tolerances of the seatback frame.

BACKGROUND OF THE INVENTION

Tablets, touch screen devices, and other like portable electronic devices are often handheld or supported on the lap of the user. Users will often switch between holding the device, supporting the device on their lap, or placing the device in an electronic device holder with high frequency. The ease of mounting and dismounting a portable electronic device, such as a tablet, into and out of an electronic device holder is important. The portable electronic device must be easily retained in the holder during loading and unloading of the electronic device. Thus, providing an electronic device holder that can be operated by a single hand to provide a secure mounting within the device holder is desired. Further, seatback frames generally include an upper cross member having some type of support flange disposed therealong. With multiple manufactures and stamping plants for the parts of the seatback frame, a number of configurations exist for the support flange. Thus, a coupling system is desired, wherein a structural member has the versatility to couple to the various configurations of a support flange in a seatback frame to provide an appropriate and consistent landing for attaching a mounting bracket.

The present invention provides an electronic device holder securely mounted to a seatback in a vehicle which can be loaded and unloaded by a single hand of the user in a fast and secure manner, while further providing an electrical connection between the electronic device and a power source or data connection of the vehicle.

SUMMARY OF THE INVENTION

One aspect of the present invention includes an electronic device holder having a mounting surface configured to receive an electronic device. First and second doors are disposed at opposite sides of the mounting surface and are gearingly engaged to one another on a rear side of the mounting surface for synchronized lateral movement between open and closed positions. An actuator is disposed on either the first or second door for actuating the doors to the open position from the closed position.

Another aspect of the present invention includes an electronic device holder having first and second doors slideably coupled to a mounting surface between open and closed positions. A detent lever is pivotally coupled to either the first or second door and is configured to detent the doors in the open position. A detent release lever is pivotally coupled to the mounting surface, and is configured to release the detent lever such that the doors automatically move from the open position to the closed position.

Yet another aspect of the present invention includes a mounting system having a seatback frame with a mounting bracket supported thereon. A cover is disposed over the mounting bracket and includes a seatback dock. The seatback dock includes one or more access apertures aligned with one or more receiving apertures disposed on the mounting bracket. A locking plate is slideable supported on the mounting bracket between locked and unlocked positions. The locking plate includes one or more locking apertures which are aligned with the one or more receiving apertures of the mounting bracket. An electronic device holder with a mounting portion is configured to detachably mount to the mounting bracket. The mounting portion includes one or more mounting members configured to be received in the one or more receiving apertures of the mounting bracket. The one or more mounting members are locked into place on the mounting bracket by the locking plate as received in the one or more receiving apertures of the mounting bracket.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 43A is a side elevational view of a locking plate;

FIG. 43B is a perspective view of the locking plate of FIG. 43A;

DETAILED DESCRIPTION OF THE PREFERRED EMBODIMENTS

Figure 1:
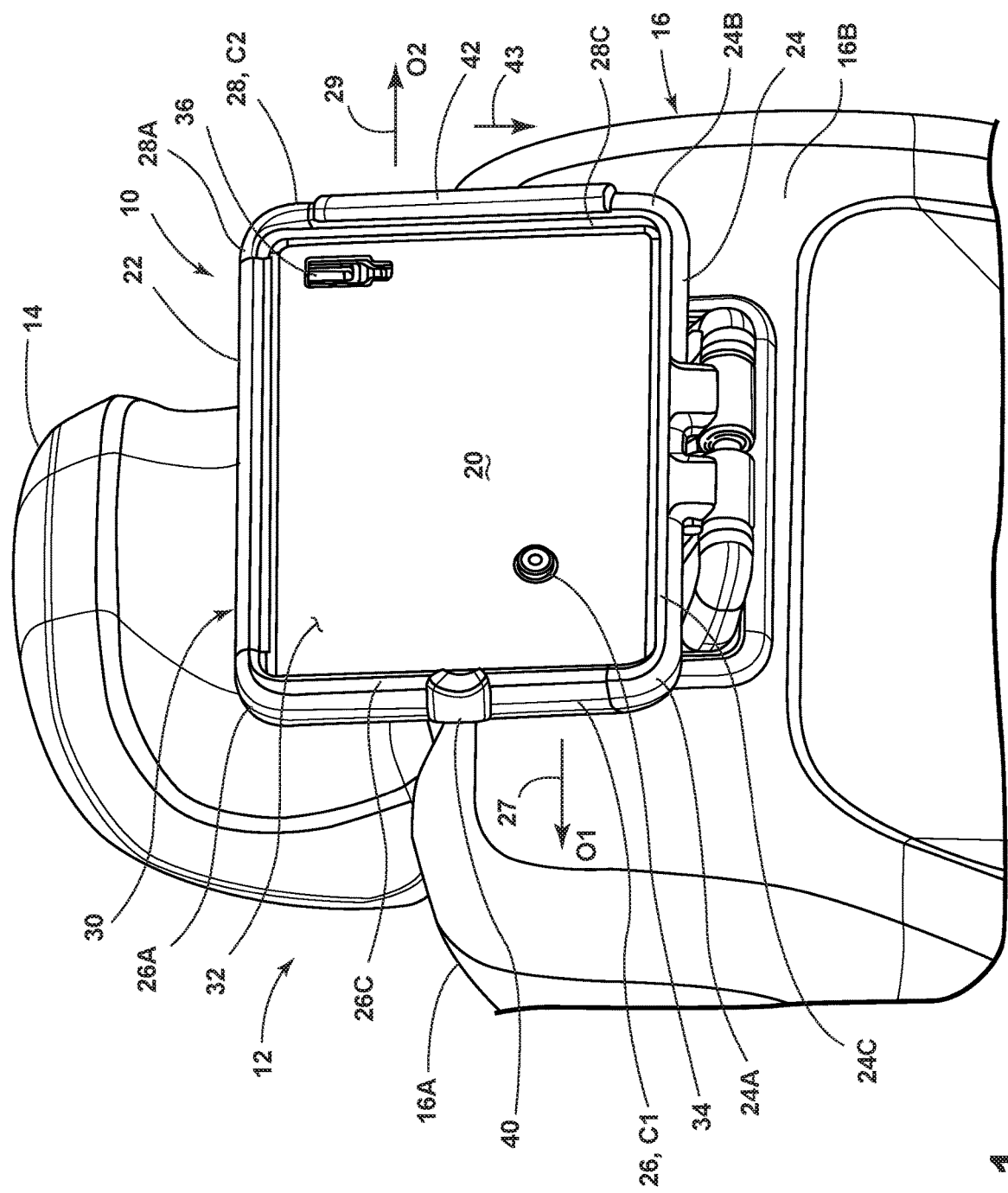
FIG. 1 is a fragmentary rear perspective view of a vehicle seat having an electronic device holder mounted to a seatback thereof according to an embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates an electronic device holder as mounted to a vehicle seat 12. The vehicle seat 12 includes a headrest assembly 14 as well as a seatback 16 having a front side 16A and a rear side 16B. The electronic device holder 10 is hingedly or pivotally coupled to the rear side 16B of the seatback 16 and is configured to support and retain an electronic device thereon. The electronic device to be supported by the electronic device holder 10 is generally a portable electronic device, such as a tablet, a mobile phone, a DVD player, or other like electronic device. For the purposes of this disclosure, the electronic device to be supported in the electronic device holder 10 may be described herein as a tablet, although one of ordinary skill in the art will recognize that other such electronic devices can be used with the present invention.

Referring again to FIG. 1, the electronic device holder 10 includes a mounting surface 20 having upper and lower frame members 22, 24 extending outwardly therefrom. The upper and lower frame members 22, 24 are rigid members which are vertically spaced-apart on opposite sides of the mounting surface 20 and extend outwardly in a car-rearward direction from the mounting surface 20 in assembly. As further shown in FIG. 1, the electronic device holder 10 further includes left and right door assemblies 26, 28 which are disposed on opposite sides of the mounting surface 20 and are further operable between open and closed positions. In the embodiment of FIG. 1, the left and right door assemblies 26, 28 are shown in the closed position C1, C2, respectively. The left and right door assemblies 26, 28 are configured to move laterally, with respect to the mounting surface 20, for receiving an electronic device within the electronic device holder 10. Specifically, the left hand door 26, also referred to as the first door 26, is configured to move laterally in a direction as indicated by arrow 27 to the open position O1, as further described below and shown FIG. 27. Similarly, the right hand door 28, also referred to as the second door 28, is configured to move laterally in a direction as indicated by arrow 29 to the open position O2, which is also shown and described below with reference to FIG. 27. With the first and second doors 26, 28 in the closed positions C1, C2, a frame assembly 30 is defined by the first and second doors 26, 28 and the upper and lower frame members 22, 24. As shown in FIG. 1, the frame assembly 30 surrounds the mounting surface 20 in a substantially continuous manner. Thus, the first and second doors 26, 28, in a similar manner to the upper and lower frame members 22, 24, extend outwardly from the mounting surface 20, such that the frame 30 surrounds and generally defines a mounting cavity 32 disposed directly adjacent to the mounting surface 20 in a car-rearward direction for receiving an electronic device.

With further reference to FIG. 1, the first and second doors 26, 28 have generally C-shaped cross-sections, thereby defining lip or outer edge portions 26C, 28C, respectively, which are used to abut and retain an electronic device in the mounting cavity 32 when the first and second doors 26, 28 are in the closed position C1, C2. Similarly, the lower frame member 24 also includes a generally C-shaped cross-section having a lip or outer edge portion 24C which is also used to retain an electronic device in use. As further shown in FIG. 1, the lower frame member 24 also includes L-shaped retaining corners 24A, 24B disposed on opposite sides thereof. The corner portions 24A, 24B are used to retain an electronic device in the electronic device holder 10 when the first and second doors 26, 28 are in the open position O1, O2, as further described below. Specifically, the L-shaped retaining corners 24A, 24B are configured to support an electronic device in a pre-load position, otherwise referred to herein as a forward tilt FT position, as further described below with reference to FIG. 28. The first and second doors 26, 28 further include inwardly turned L-shaped upper corner portions 26A, 28A which help to retain an upper portion of an electronic device as retained within the electronic device holder 10. Thus, the lip or outer edge portions 24C, 26C and 28C of the lower frame member 24 and the first and second doors 26, 28, respectively, are spaced outwardly from the mounting surface 20 and surround the mounting cavity 32 for capturing and retaining an electronic device in the mounting cavity 32. The first and second doors 26, 28 are configured to move from the closed positions C1, C2 to the open position O1, O2 in a synchronized manner due to a geared connection between the first and second doors 26, 28, as further described below.

Figure 27:
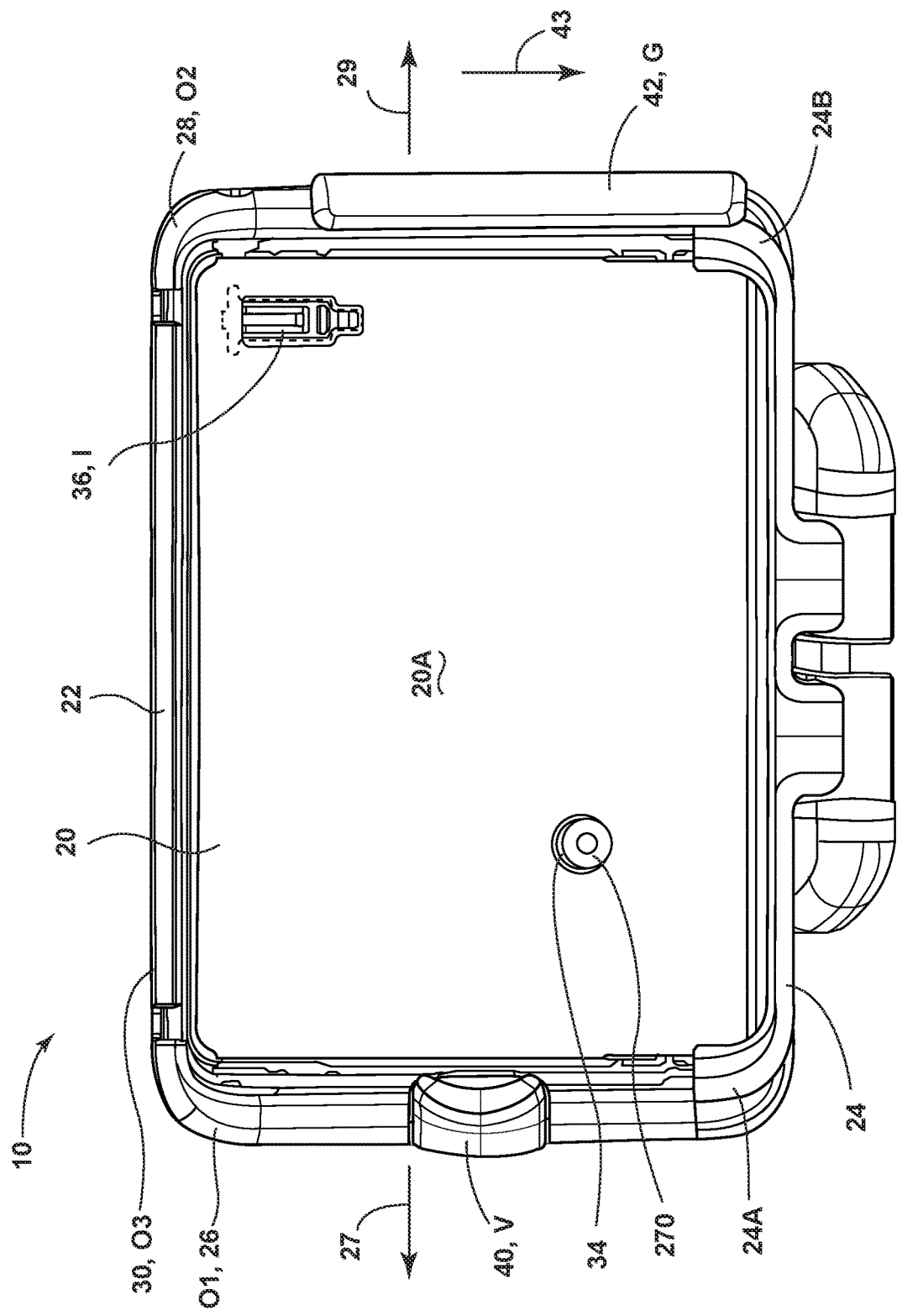
FIG. 27 is a front plan view of the electronic device holder showing the left and right hand doors in an open position with the actuator lever in the actuated position.

Referring still to FIG. 1, the electronic device holder 10 further includes an ejector pin 34 and a detent release lever 36. In use, the ejector pin 34 helps urge an electronic device retained in the electronic device holder 10 to a pre-load or forward tilt position when the first and second doors 26, 28 are in the open position O1, O2, as further described below, for facilitating the removal of the electronic device. As further shown in FIG. 1, the first door 26 includes an electrical connector 40 which is used to connect to an electrical port of an electronic device as retained within the electronic device holder 10. The second door 28 includes an actuator 42 which is a slide actuator, or "shotgun" actuator, configured to move vertically in a direction as indicated by arrow 43 along the second door 28 between at-rest and actuated positions. As shown in FIG. 1, the actuation lever 42 is shown in the at-rest position and is configured to move downwardly along path 43 to the actuated position (shown in FIG. 27) which, as further described below, drives the first and second doors 26, 28 from the closed position C1, C2 (FIG. 1) laterally to the open position O1, O2 (FIG. 27). Actuation of the actuation lever 42 is contemplated to be about 10-15 mm of travel along the actuation path indicated by arrow 43.

Figure 2:
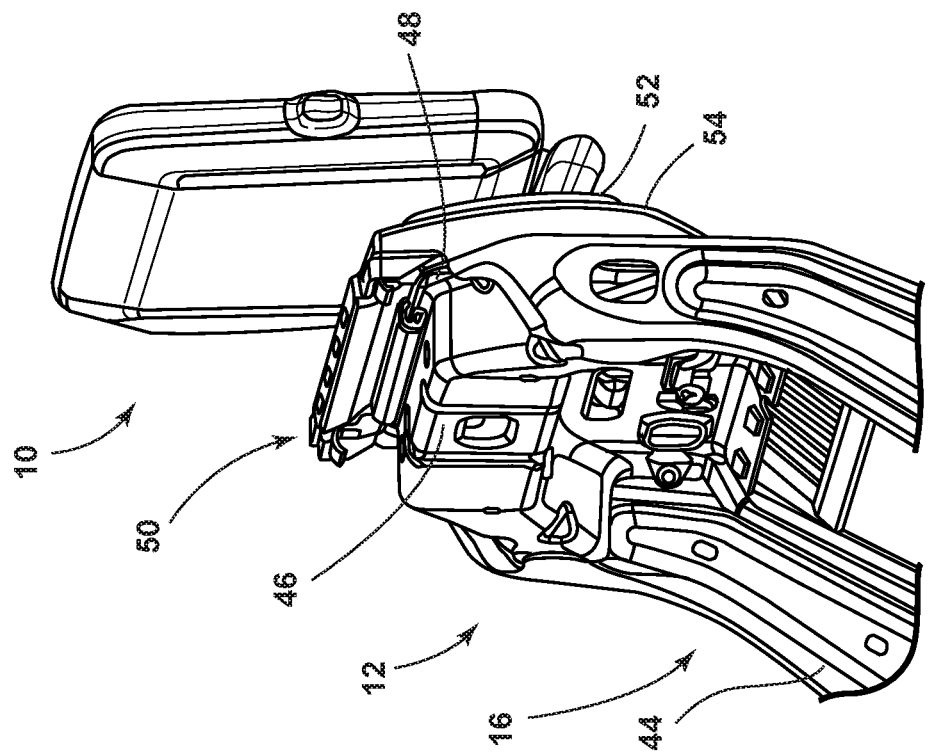
FIG. 2 is a fragmentary front perspective view of the vehicle seat and electronic device holder of FIG. 1 with a seat cover removed to reveal a seatback frame and mounting system.

Referring now to FIG. 2, the vehicle seat 12 is shown having a seat cover removed to reveal a seatback frame 44. The seatback frame 44 includes an upper portion 46 having an upwardly extending and forwardly rolled support flange 48 which is used to support a mounting system 50 for mounting the electronic device holder 10 to the vehicle seat 12. The mounting system 50 includes an outer panel 52 and a trim retention cover 54 for concealing componentry of the mounting system 50.

Figure 3:
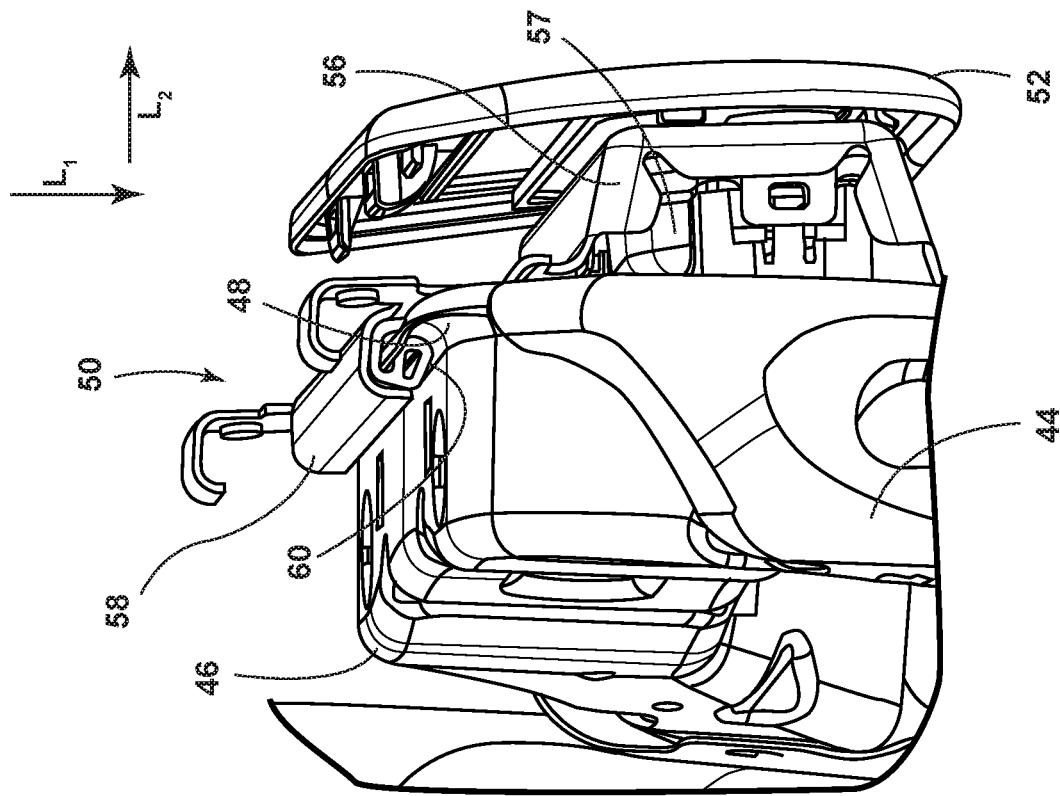
FIG. 3 is a fragmentary side perspective view of a mounting bracket for the electronic device holder mounted to the seatback frame.

Referring now to FIG. 3, the mounting system 50 is shown having the electronic device holder 10 and trim retention cover 54 removed to reveal a mounting bracket 56 having an inverted U-shaped channel 58 disposed at an uppermost portion thereof. In assembly, the mounting system 50 is configured, such that the inverted U-shaped channel 58 of the mounting bracket 56 engages the support flange 48 of the seatback frame 44 for generally supporting the weight of the mounting system 50 and the electronic device holder 10 when mounted thereto, as shown in FIG. 2. The inverted U-shaped channel 58, having a hook-shaped cross-section, is supported by the support flange 48 against loads that may be realized on the mounting system 50 in direction as indicated by arrows $L_1$ and $L_2$, as well as load forces intermediate thereto, as further described below. As further shown in FIG. 3, a support member 60 is disposed between the support flange 48 of the seatback frame 44 and the inverted U-shaped channel 58 of the mounting bracket 56 in assembly. The support member 60, as shown in FIG. 3, has a cross-section akin to a cursive lowercase "a" shape for engaging the support flange 48 and supporting the mounting bracket 56 at the inverted U-shaped channel 58. It is contemplated that the seatback frame 44 and the mounting bracket 56 are comprised of a stamped metal material to provide adequate rigidity and support for a vehicle occupant, as well as to provide rigid support for the electronic device holder 10 in assembly. The support member 60 is contemplated to be comprised of a polymeric material that is adequately resilient to provide an anti-vibrational seal between the metal components. The support member 60 is further contemplated to be a linear member comprised of an extruded polymer having sufficient rigidity to couple to the support flange 48, as well as having flexibly resilient properties for ease of installation.

Referring again to FIG. 3, a power module 57 is disposed adjacent to the mounting bracket 56, and is configured to power the electronic device holder 10 when coupled thereto, as shown in FIG. 2. The power module 57 is accessible through the mounting system 50, as further described below. As used throughout this disclosure, the term "power module" is used to describe any type of electrical port that is configured to provide power to the electronic device holder 10 as well as provide a point of exchange for electronic and/or digital data to the electronic device. As electrically coupled to the power module 57, the electronic device holder 10 can be used to charge an electronic device retained therein. Thus, it is contemplated that the power module 57 is electrically coupled to a power supply of a vehicle in which the vehicle seat 12 is disposed, such that power module 57 is electrically coupled to an external power source for powering and interfacing with an electronic device. Further, it is contemplated that the power module 57 can be a modular power module having its own power supply contained therein, such as a battery powered module.

Figure 4A:
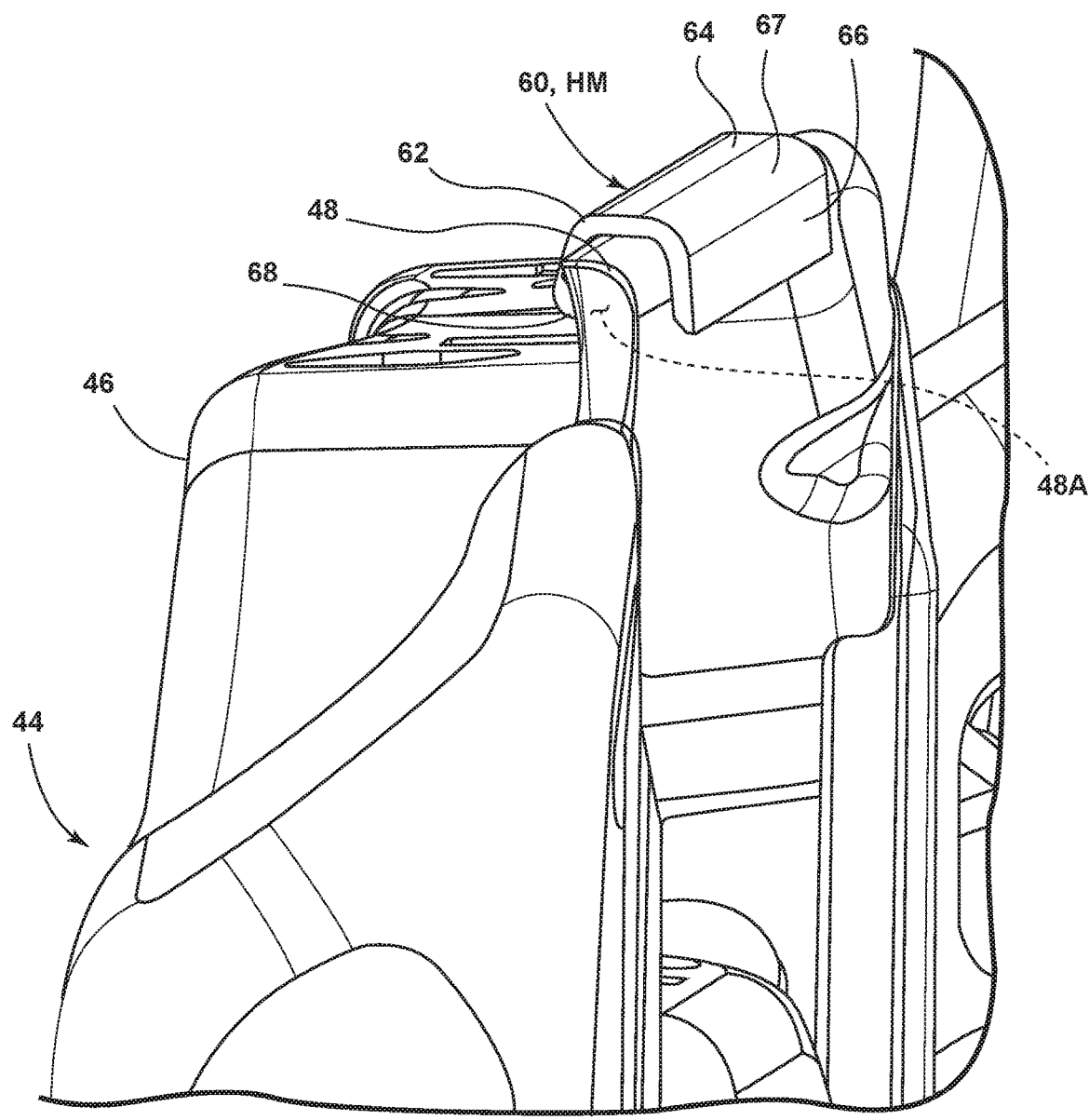
FIG. 4A is a fragmentary rear perspective view of the seatback frame having the mounting bracket removed therefrom and a support member mounted on a support flange.
Figure 4B:
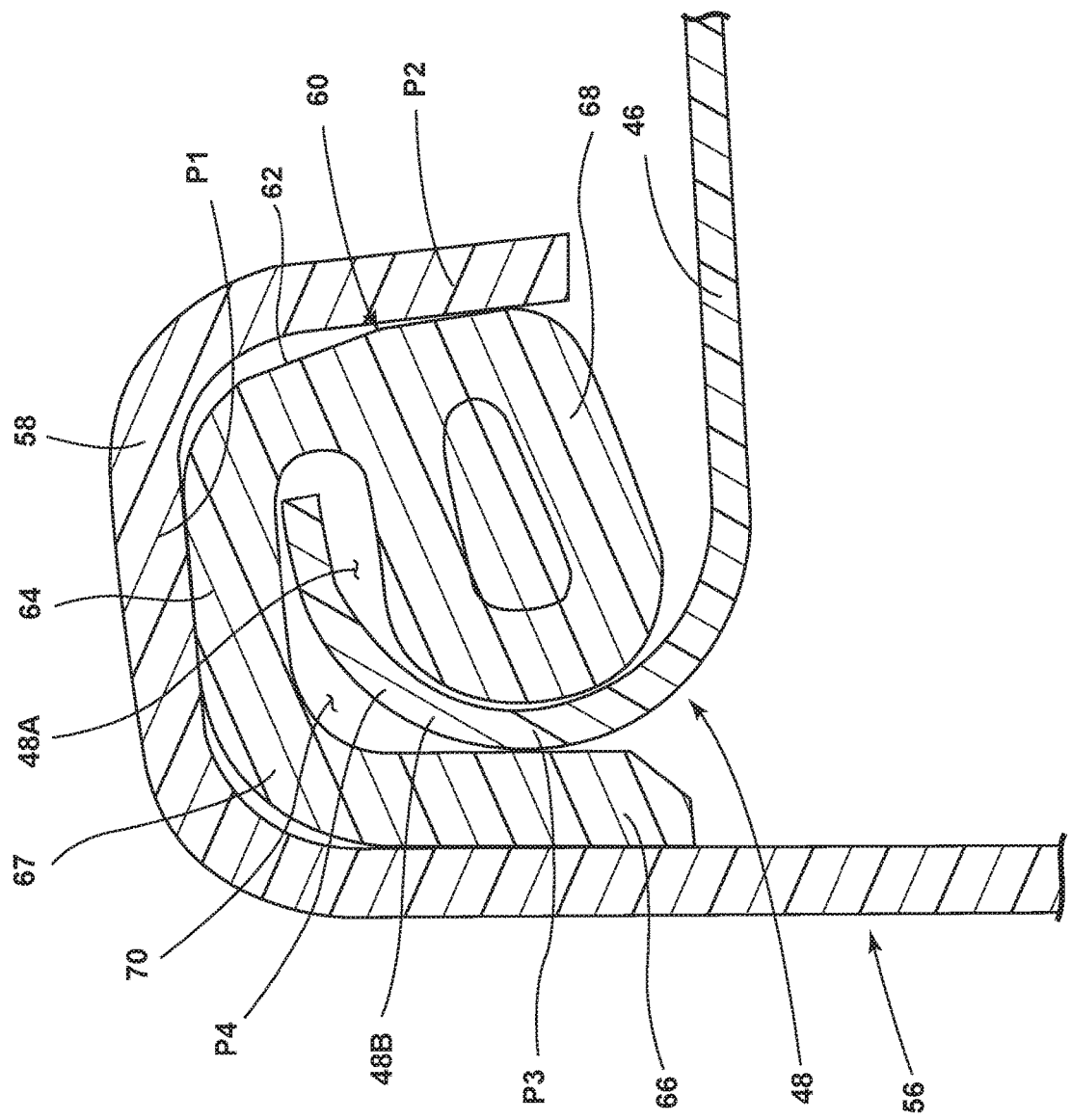
FIG. 4B is a cross-sectional view of the mounting bracket coupled to the support flange and support member.

Referring now to FIG. 4A, the seatback frame 44 is shown with the mounting bracket 56 removed therefrom to reveal the support member 60 as coupled to the support flange 48 of the seatback frame 44. As shown in FIG. 4A, as well as FIG. 4B, the support member 60 includes a front wall 62, a top wall 64 and a rear wall 66 to define a generally inverted U-shaped body portion 67. The support member 60 further includes a loop shaped portion 68 which helps to locate the support member 60 to the support flange 48 within a cavity portion 48a defined by the support flange 48 given its forwardly curved configuration at forward curve 48b. The loop shaped portion 68 extends inwardly from front wall 62 into the inverted U-shaped portion 67. The configuration of the body portion 67 of the support member 60 is geometrically similar to the inverted U-shaped channel 58 of the mounting bracket 56, as shown in FIG. 3, for ease in properly locating the mounting bracket 56 to the support member 60 as supported on the support flange 48. The support member 60 solves a very common, but often very difficult problem in the automotive industry where carry-over parts, such as the seatback frame 44, are standard and a single part design is used world-wide on many different vehicles. As shown in FIGS. 4A and 4B, the seatback frame 44 has a unique structure in the support flange 48 which is used to support the attachment of the mounting bracket 56. As noted above, seatback frames are made by multiple stamping plants world-wide, such that the ultimate shape of the support flange 48 is often varied from vehicle to vehicle. While the overall configuration of the support flange 48 various with different seatback frames, the material thicknesses of the support flange 48 is relatively consistent from vehicle to vehicle, and the support flange 48 is generally curved forward, at forward curve 48B, to avoid a sharp edge in the seatback frame 44 for purposes of occupant safety in a potential collision event. The use of the support member 60 allows for a structural attachment configuration that requires no changes to the various stamped support flanges, such as support flange 48, for use therewith. Thus, as shown in FIGS. 4A and 4B, the support member 60 is rolled onto the forward curve 48b of support flange 48 to thereby define a home position HM of the support member 60, wherein the support flange 48 is received in a generally L-shaped channel 70 of the support member 60. In the home position HM, support member 60 substantially covers the support flange 48 and defines a landing on which the inverted U-shaped channel 58 of the mounting bracket 56 can be received. Thus, with the support member 60 in the home position HM, as shown in FIG. 4A, the inverted U-shaped channel 58 can be driven downward onto the support member 60, as shown in FIG. 4B, thereby forcing the support member 60 into a vice grip onto the material thickness M1 of the support flange 48. Driving the inverted U-shaped channel 58 onto the support member 60 wedges the support member 60 into the inverted U-shaped channel 58 as well as the cavity portion 48a of the support flange 48. This configuration provides pinch points P1-P4 acting between the support member 60, the inverted U-shaped channel 58, and the support flange 48, to provide a secure engagement for the mounting bracket 56. Thus, the support member provides a compliant and self-retaining connection location for the mounting bracket 56 that is consistent and repeatable across varied support flange configurations without changing the seatback frame structurally.

Figure 5:
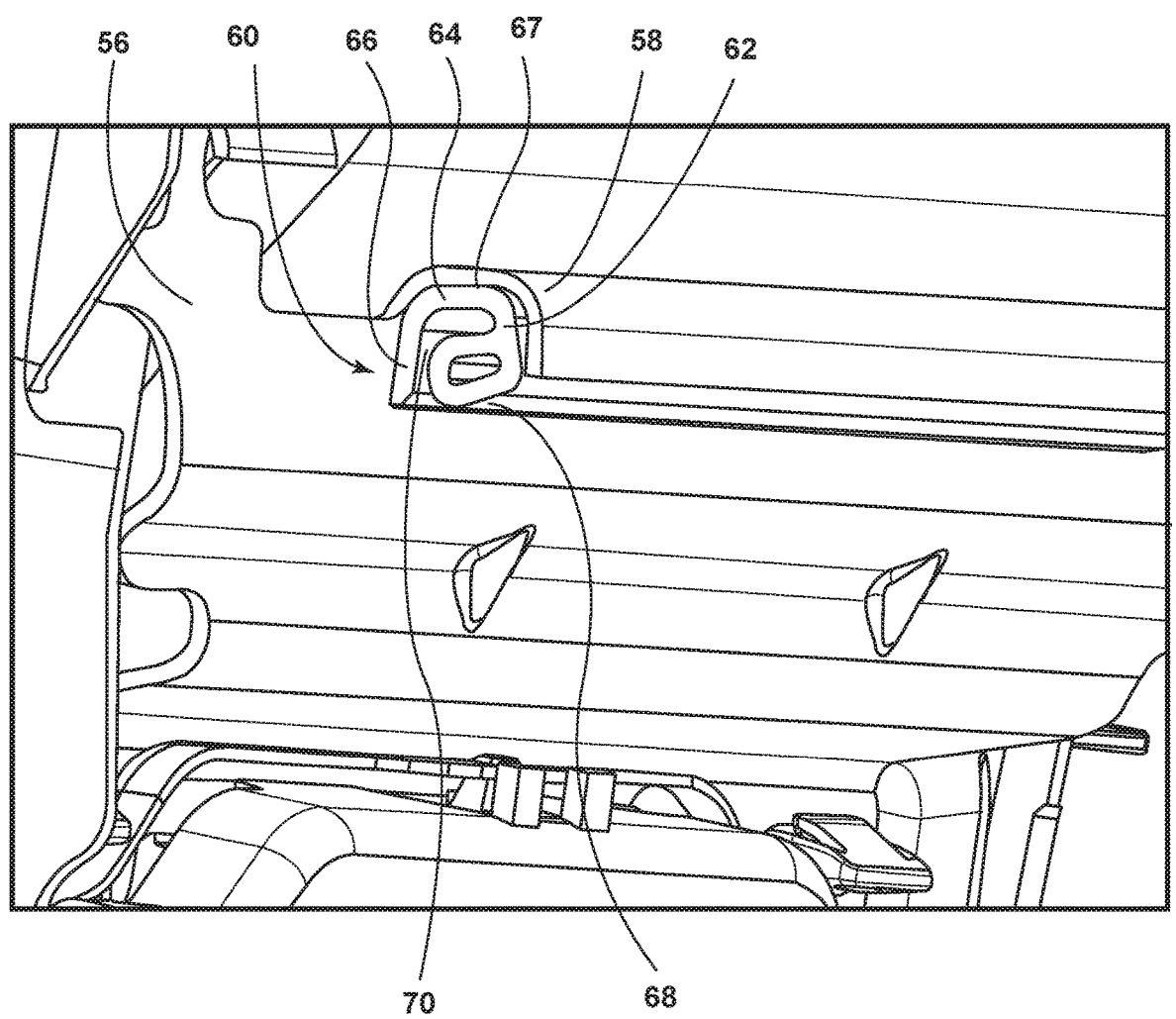
FIG. 5 is a perspective view of the mounting bracket of the electronic device holder.

Referring now to FIG. 5, the support member 60 is shown disposed within the inverted U-shaped channel 58 of the mounting bracket 56, wherein the body portion 67 of the support member 60 is shown generally configured to match the U-shaped cross-section of the inverted U-shaped channel 58. The loop shaped portion 68 disposed off of the front wall 62 of the support member 60, defines the L-shaped channel 70 between the body portion 67 and the loop shaped portion 68. This L-shaped channel 70 is configured to receive the support flange 48 along a curvature thereof, as best shown in FIG. 4B, in a snap-fit style engagement.

Figure 6:
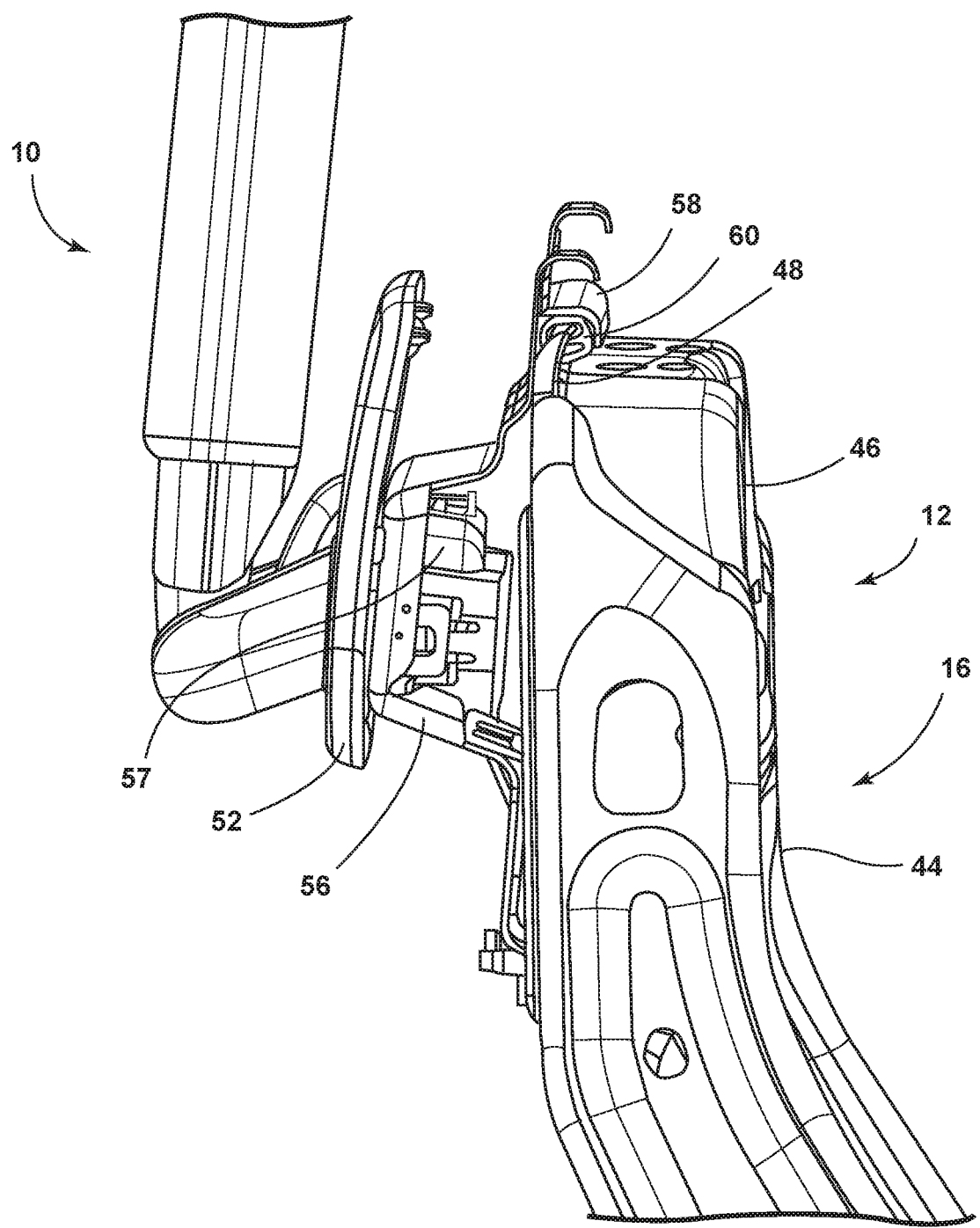
FIG. 6 is a fragmentary side perspective view of the electronic device holder mounted to the seatback frame.

Referring now to FIG. 6, a side profile of the seatback 16 of the vehicle seat 12 is shown with the seatback frame 44 having the electronic device holder 10 mounted thereto. The electronic device holder 10 is mounted to the upper portion 46 of the seatback frame 44 at support flange 48 via inverted U-shaped channel 58 of mounting bracket 56. As described above, the support member 60 is disposed between the inverted U-shaped channel 58 of the mounting bracket 56 and the support flange 48 of the seatback frame 44. In this way, the mounting bracket 56 is primarily supported from the support flange 48 and the support member 60, providing adequate support for the electronic device holder 10 in a cantilevered fashion.

Figure 8:
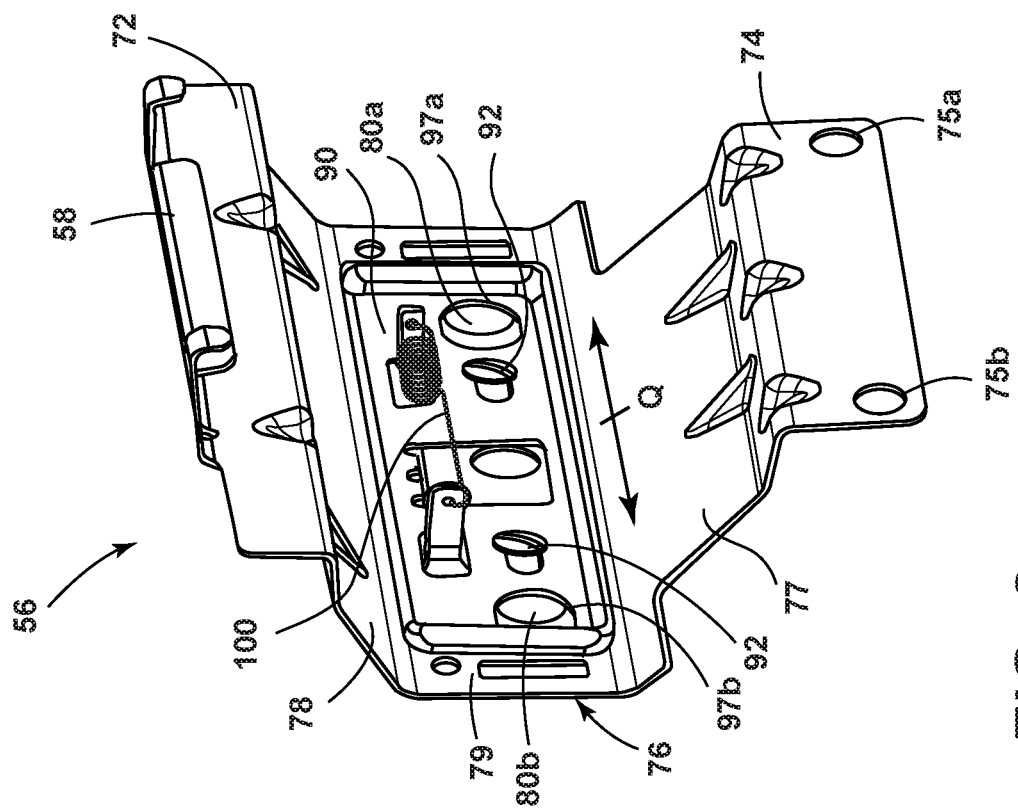
FIG. 8 is a perspective view of the mounting bracket and locking plate of FIG. 7 as assembled.
Figure 7:
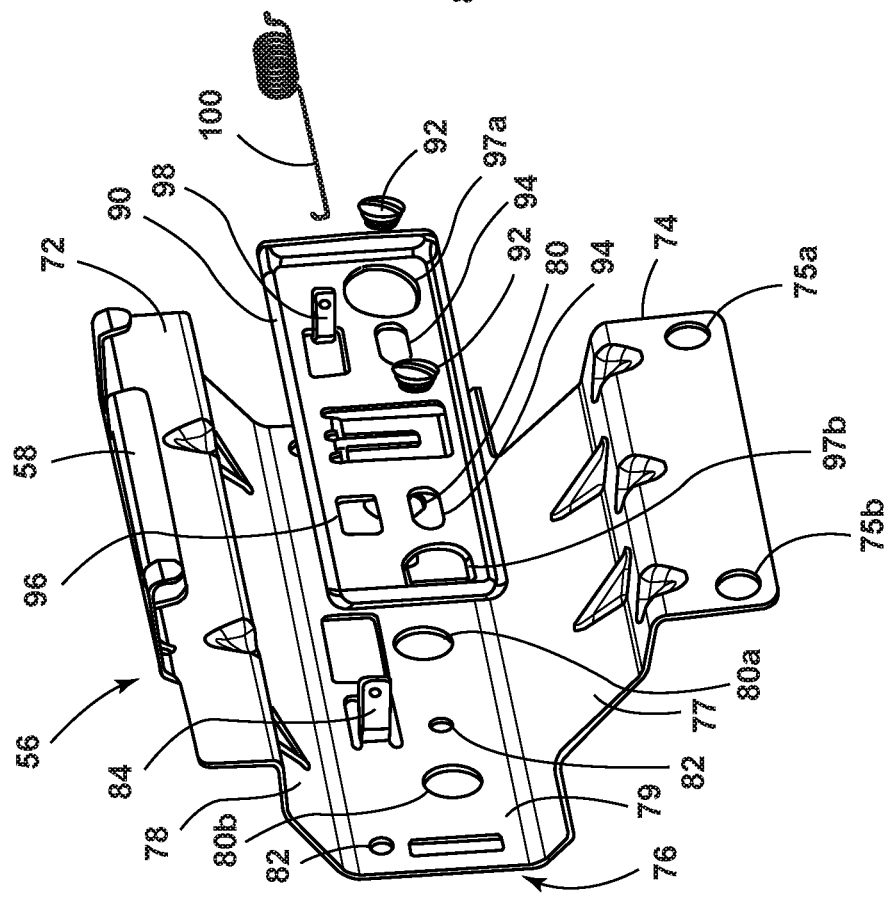
FIG. 7 is an exploded perspective view of a mounting bracket and locking plate.

Referring now to FIGS. 7 and 8, the mounting bracket 56 is shown having upper and lower mounting portions 72, 74 with a rearwardly extending body portion 76. The body portion 76 of the mounting bracket 56 includes first and second angled walls 77, 78 and a mounting wall 79. Referring again to FIG. 3, the power module 57 is shown disposed in the rearwardly extending body portion 76 of the mounting bracket 56. As further shown in FIG. 7, the mounting wall 79 includes first and second receiving apertures 80a, 80b disposed therethrough, as well as a number of mounting apertures 82 which are used to mount a locking plate 90 to the mounting wall 79 of the mounting bracket 56 in a slideable manner. The locking plate 90 is slideably mounted to the mounting bracket 56 via fasteners 92 which pass through mounting apertures 94, which are disposed through the locking plate 90, to reach the mounting apertures 82 disposed on the mounting wall 79 of the mounting bracket 56. The mounting wall 79 further includes a forwardly extending tab 84 which passes through aperture 96 disposed on the locking plate 90 in assembly, as shown in FIG. 8. The locking plate 90 similarly includes a forward extending tab 98 which cooperates with the tab 84 of the mounting bracket 56 for connecting a biasing member 100, such as a spring, therebetween. As specifically shown in FIG. 8, first and second locking apertures 97a, 97b, are disposed through the locking plate 90, and align with first and second receiving apertures 80a, 80b of the mounting bracket 56 to securely mount electronic device holder 10 to the mounting bracket 56. As further shown in FIGS. 7 and 8, the lower mounting portion 74 of the mounting bracket 56 includes first and second mounting apertures 75a, 75b which are used to couple the mounting bracket 56 to the seatback frame 44, as further described below. The upper mounting portion 72 includes the inverted U-shaped channel 58 disposed along an upper portion thereof. In FIG. 8, the locking plate 90 is shown in a default locked position and slidingly mounted to the mounting wall 79 of the mounting bracket 56 via fasteners 92 for lateral movement in a direction as indicated by arrow Q. The function of the locking plate 90 is further described below with reference to FIGS. 44A-45.

Figure 9:
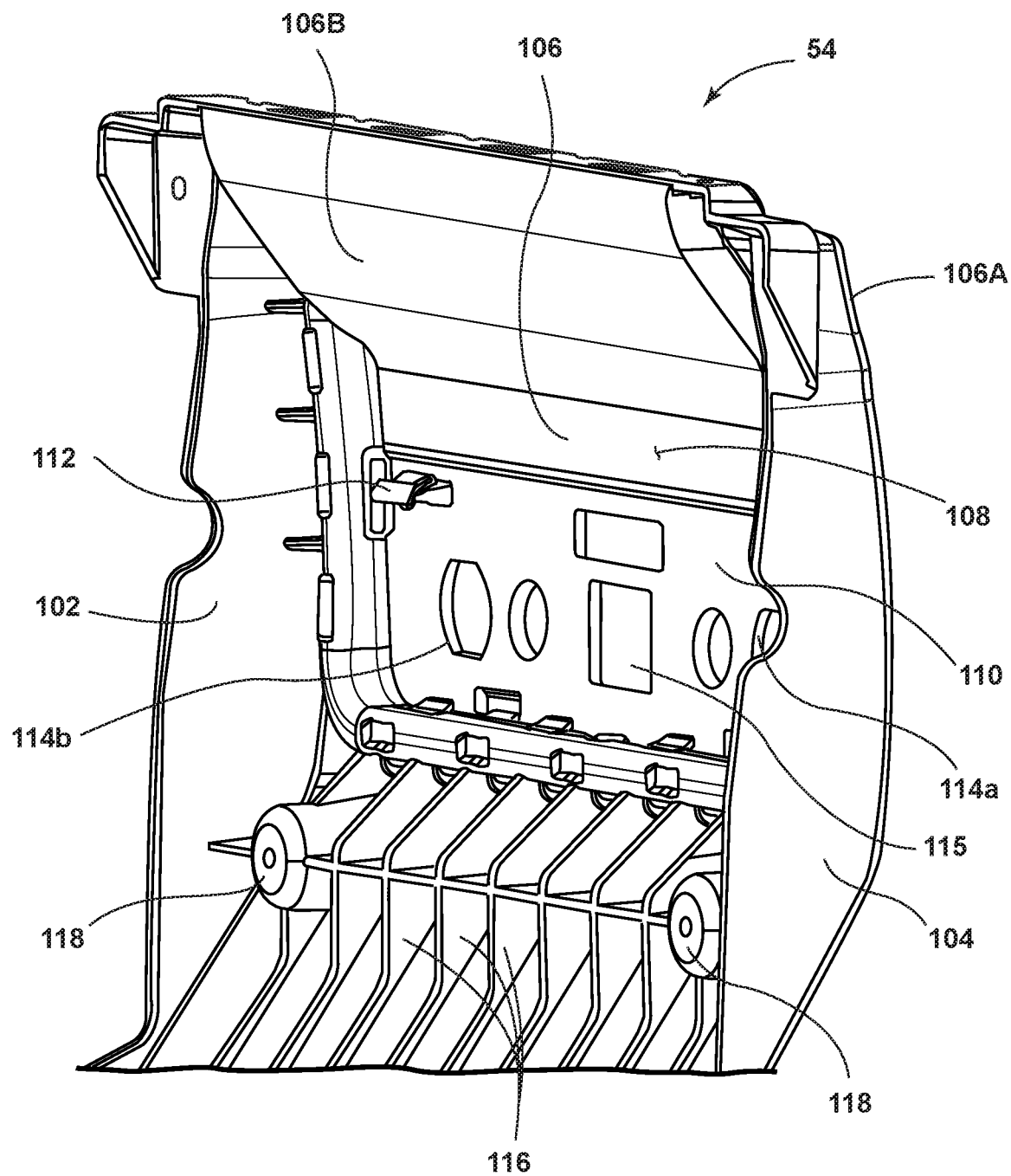
FIG. 9 is a perspective view of a B-side of a cover.

Referring now to FIG. 9, the trim retention cover 54 for the mounting system 50 (shown in FIG. 3) is shown having first and second side walls 102, 104 with a body portion 106, which includes a B-side 106B and an A-side 106A disposed therebetween. The body portion 106 rearwardly extends to define a cavity 108 which generally follows the contours of the mounting bracket 56 shown in FIGS. 7 and 8. The body portion 106 further includes a central mounting wall 110 having clip members 112 and first and second access apertures 114a, 114b disposed therethrough, as well as a central aperture 115. The clips 112 are used to mount the trim retention cover 54 to the mounting bracket 56 as further described below. The body portion 106 of the trim retention cover 54 further includes a plurality of spaced-apart support ribs 116 disposed on a lower portion thereof. The support ribs 116 help to rigidify the structure of the trim retention cover 54 for better supporting an electronic device holder. Adjacent to the support ribs 116, mounting bosses 118 are disposed on opposite sides of the body portion 106. In assembly, the mounting bracket 56 is coupled to the trim retention cover 54 at mounting bosses 118 as further described below. Finally, the trim retention cover 54 further includes upper mounting apertures 119 which are also used to couple the mounting bracket 56 to the trim retention cover 54.

Figure 10:
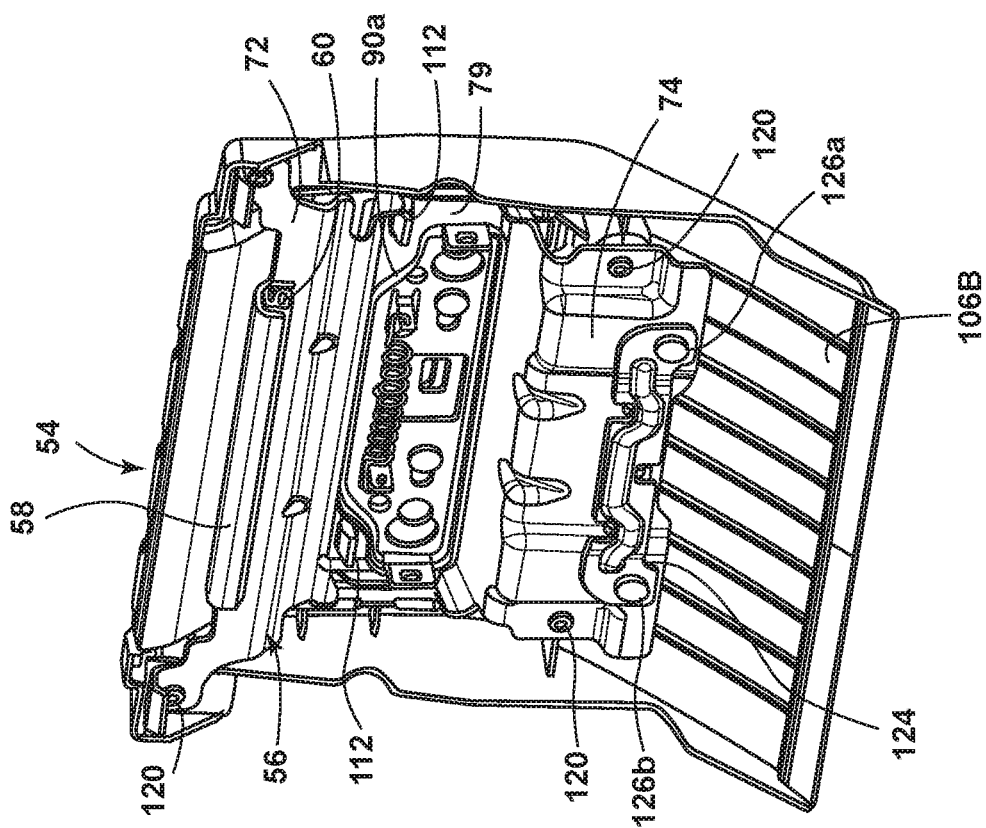
FIG. 10 is an exploded view of a mounting bracket and the cover of FIG. 9.
Figure 11:
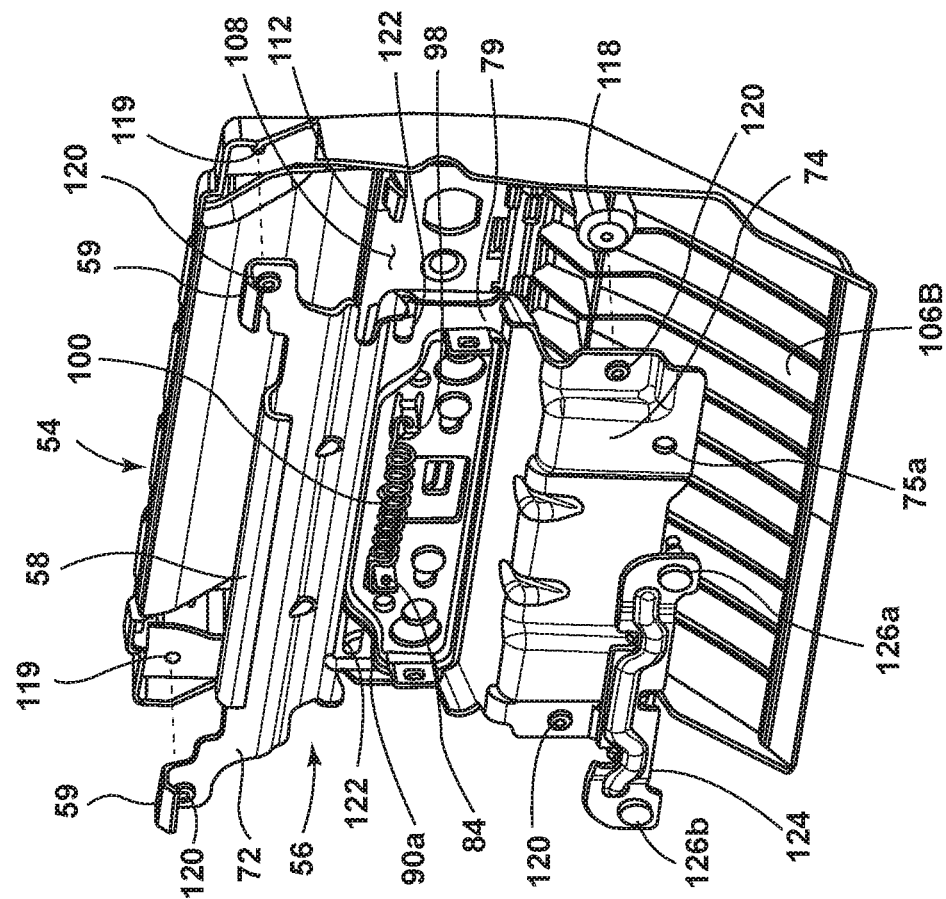
FIG. 11 is a perspective view of the mounting bracket and the cover of FIG. 10 as assembled.

Referring now to FIGS. 10 and 11, another embodiment of a mounting bracket 56 is shown exploded away from the trim retention cover 54. In this embodiment, the mounting bracket 56 includes upper and lower mounting portions 72, 74, wherein the upper mounting portion 72 includes two upper hook members 59 disposed on opposite sides of the inverted U-shaped channel 58. The upper hook members 59 includes apertures and fasteners 120 which are used to couple the mounting bracket 56 to mounting apertures 119 disposed on the trim retention cover 54. On the lower mounting portion 74, the mounting bracket 56 also includes apertures and fasteners 120 for mounting the mounting bracket 56 to the mounting bosses 118 of the trim retention cover 54. As further shown in FIG. 10, the mounting bracket 56 includes another embodiment of the locking plate 90a slidingly coupled to mounting wall 79. The locking plate 90a is configured such that clip receiving apertures 122 are accessible for receiving clips 112 of the trim retention cover 54 when the mounting bracket 56 is coupled to the trim retention cover 54 as shown in FIG. 11. As further shown in FIGS. 10 and 11, the biasing member is in the form of a tension spring, thereby connecting outwardly extending tabs 84 and 98 of the mounting bracket 56 and locking plate 90a, respectively, to bias the locking plate to a locked position, as further described below. As further shown in FIGS. 10 and 11, a mounting plate 124 includes first and second mounting posts 126a, 126b configured to be received through first and second mounting apertures 75a, 75b disposed on the lower mounting portion 74 of the mounting bracket 56. In assembly, the mounting plate 124 is coupled to the mounting bracket 56 at first and second mounting apertures 75a, 75b via first and second mounting posts 126a, 126b, wherein a portion of the seatback frame 44 is captured therebetween, as further described below.

Figure 12:
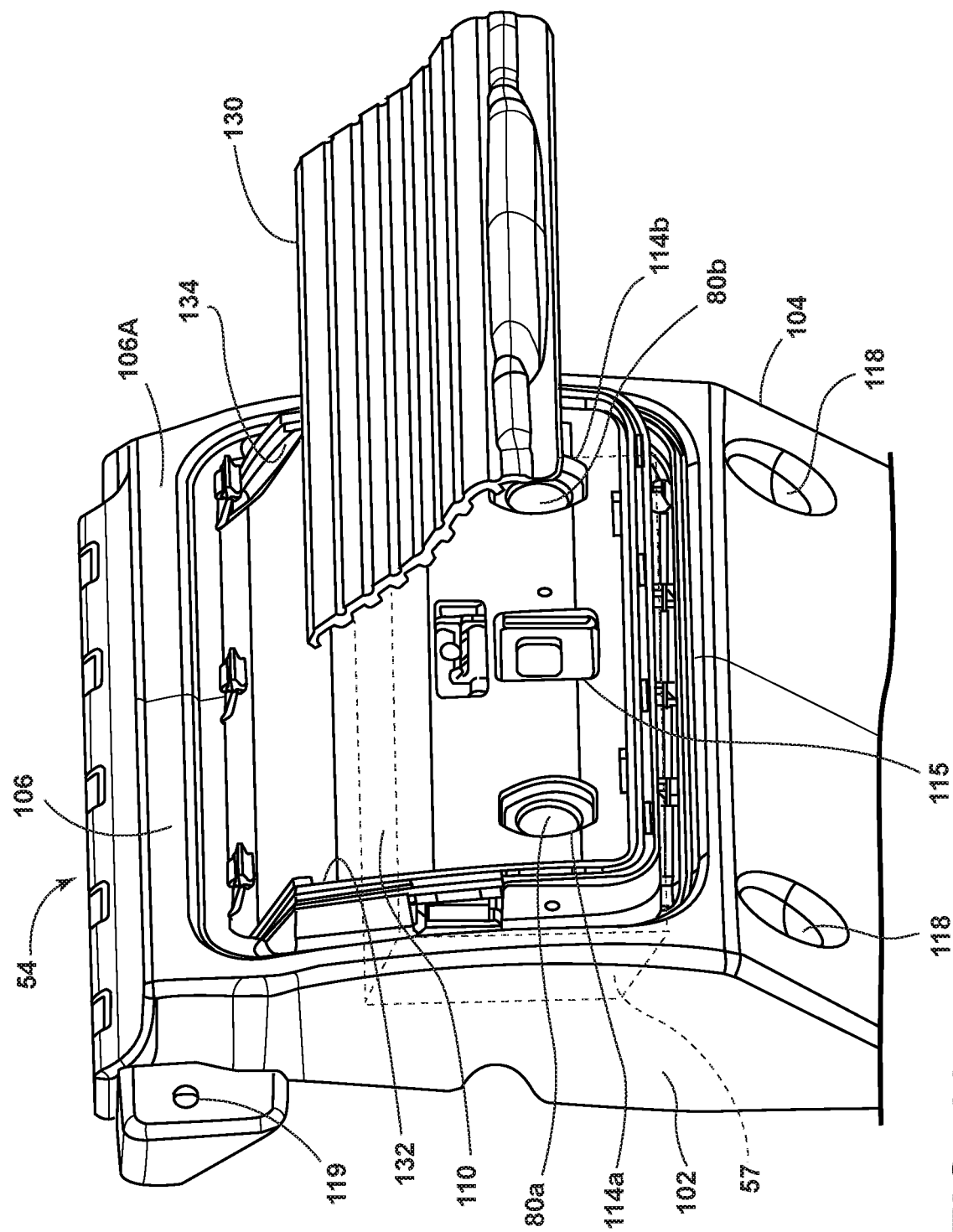
FIG. 12 is a perspective view of the A-side of the cover of FIG. 9 having a retractable door exploded away therefrom.
Figure 13:
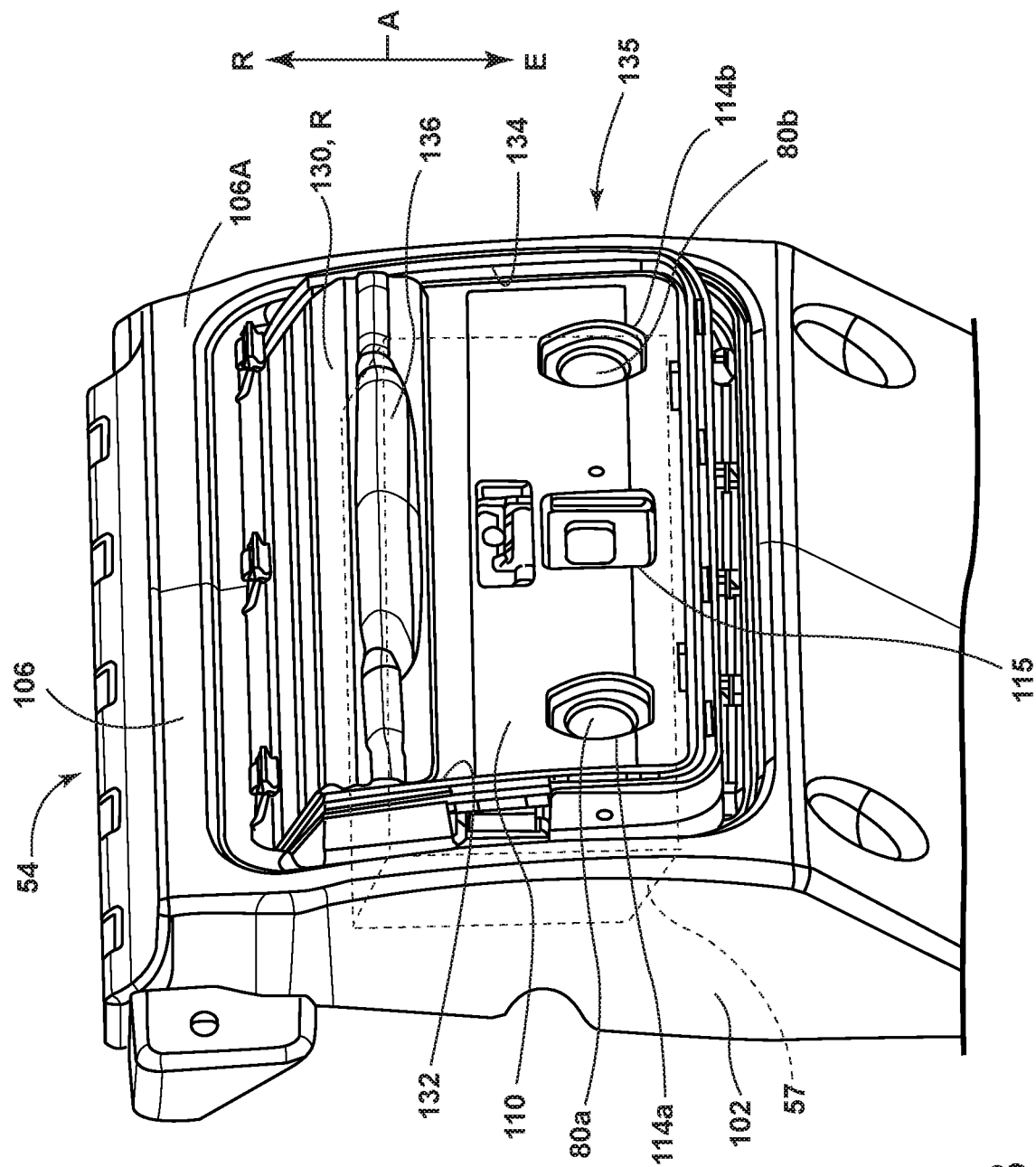
FIG. 13 is a perspective view of the cover and retractable door of FIG. 12 as assembled with the retractable door in a retracted position.

Referring now to FIG. 12, the trim retention cover 54 is shown from the A-side 106A of the body portion 106, wherein the central mounting wall 110 is shown having a retractable door 130 exploded away therefrom. On the A-side 106A of the body portion 106, the mounting wall 110 includes first and second track members 132, 134 which are configured to receive the retractable door 130 and guide the retractable door 130 between extended and retracted positions. As shown in FIG. 13, the retractable door 130 is mounted to the first and second track members 132, 134 and is in the retracted position R on a seatback dock 135. The door 130 further includes a handle 136 which is configured to be engaged by a user to move the door 130 to the extended position E along a path as indicated by arrow A. In this way, the retractable door 130 moves along the first and second track members 132, 134 so as to provide access to the mounting wall 110 of the trim retention cover 54 in the retracted position R, and to cover the same in the extended position E. With the retractable door 130 in the retracted position R, access apertures 114a, 114b of the trim retention cover 54 and receiving apertures 80a, 80b of the mounting bracket 56 are aligned and accessible for mounting an electronic device holder thereto, and central aperture 115 is also accessible for electrically connecting the electrical device holder to the power module 57. In the extended position E, the retractable door 130 covers the receiving apertures 80a, 80b, 114a, 114b to provide an aesthetically pleasing cover when an electronic device holder is not mounted to the vehicle seatback.

Figure 15:
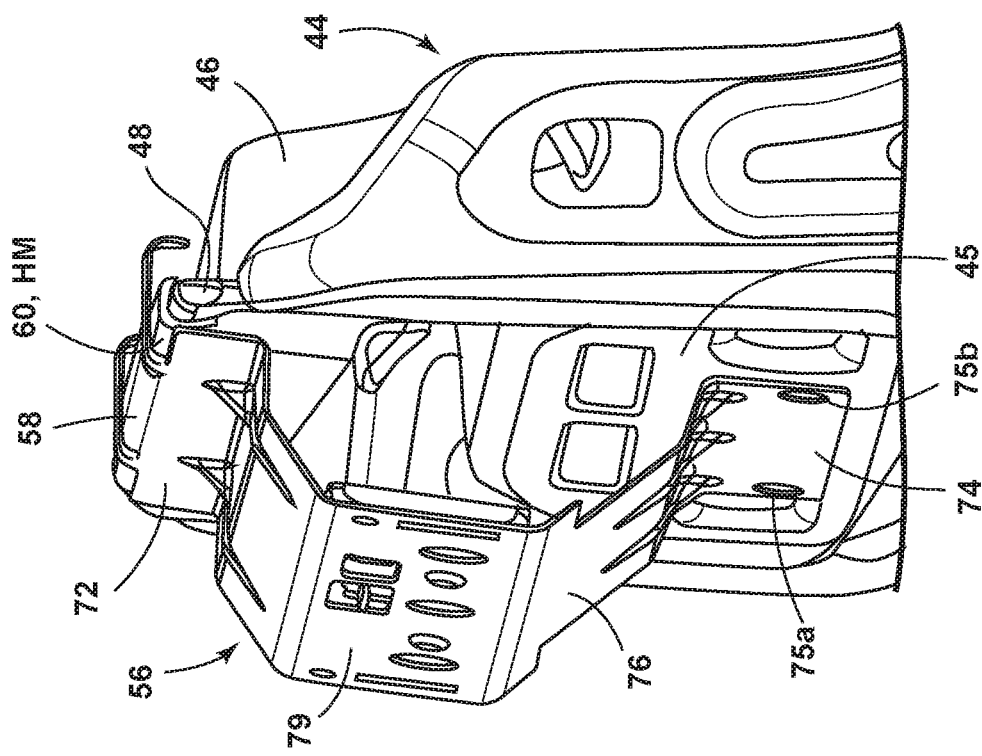
FIG. 15 is a fragmentary rear perspective view of the mounting bracket of FIG. 14 mounted on the seatback frame.
Figure 14:
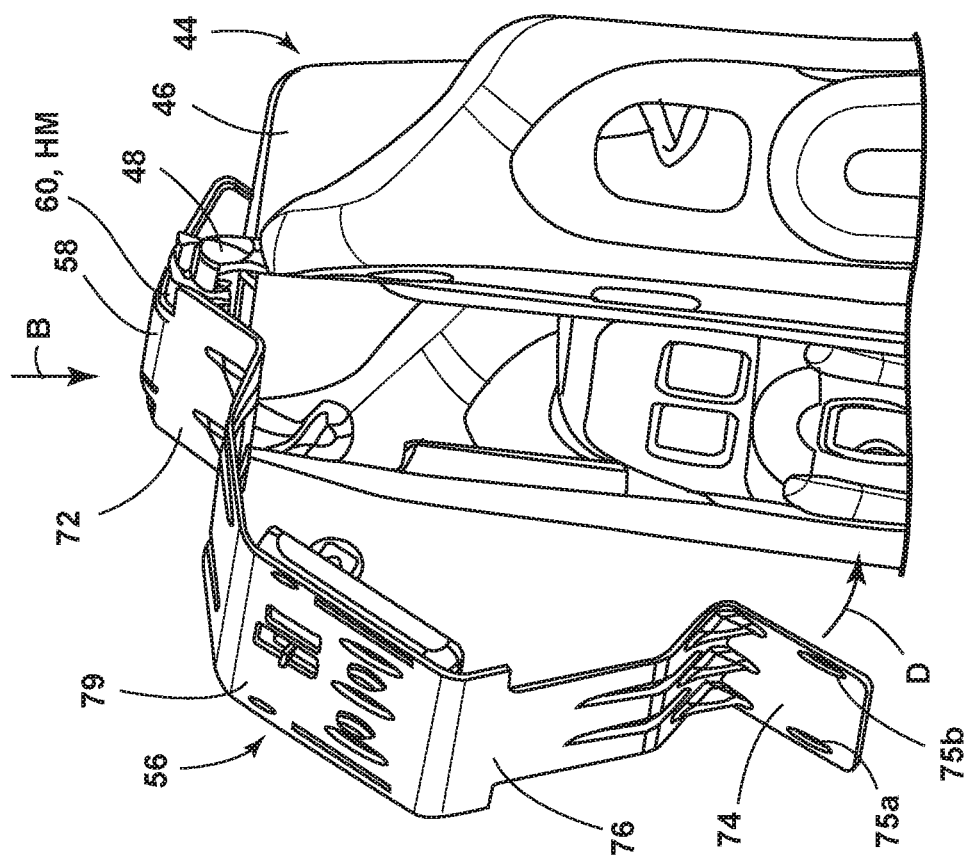
FIG. 14 is a fragmentary rear perspective view of the mounting bracket being mounted to the seatback frame.

Referring now to FIGS. 14 and 15, the mounting bracket 56 is shown being mounted to the seatback frame 44, after the support member 60 is rolled into place on the support flange 48 to the home position HM for providing a landing for mounting bracket 56. With specific reference to FIG. 14, the mounting bracket 56 is first vertically loaded, in a direction as indicated by arrow B, onto the support member 60 and support flange 48 at the inverted U-shaped channel 58 disposed on the upper mounting portion 72 of the mounting bracket 56. Once the mounting bracket 56 is mounted on the support member 60 and support flange 48 at the inverted U-shaped channel 58, the lower mounting portion 74 of the mounting bracket 56 is rotated towards the seatback frame 44 in a direction as indicated by arrow D. In this position, the mounting bracket 56 is mainly supported at the upper mounting portion 72 via the mounting of the inverted U-shaped channel 58 to support flange 48, having support member 60 disposed therebetween and providing a mounting landing, as described above. Further, in the position shown in FIG. 15, the mounting wall 79 of the mounting bracket 56 is in a substantially vertical position, with the lower mounting portion 74 abutting the seatback frame 44. In this position, the first and second mounting apertures 75a, 75b are configured to receive the first and second mounting posts 126a, 126b of mounting plate 124 as further described below.

Figure 17:
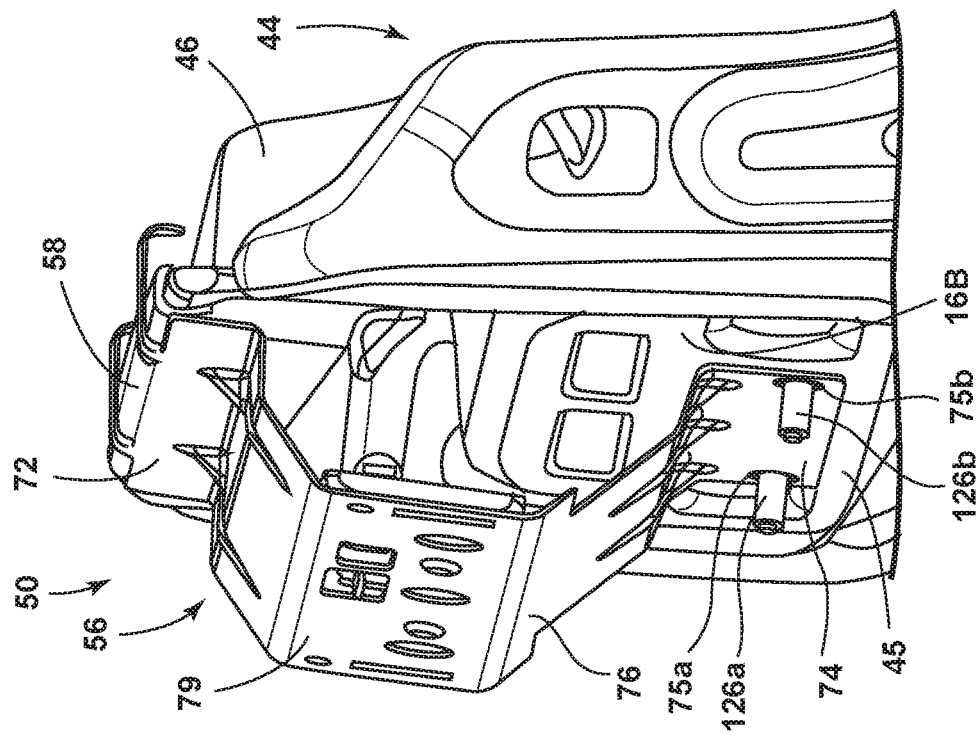
FIG. 17 is a fragmentary rear perspective view of the mounting bracket mounted on the seatback frame.
Figure 16:
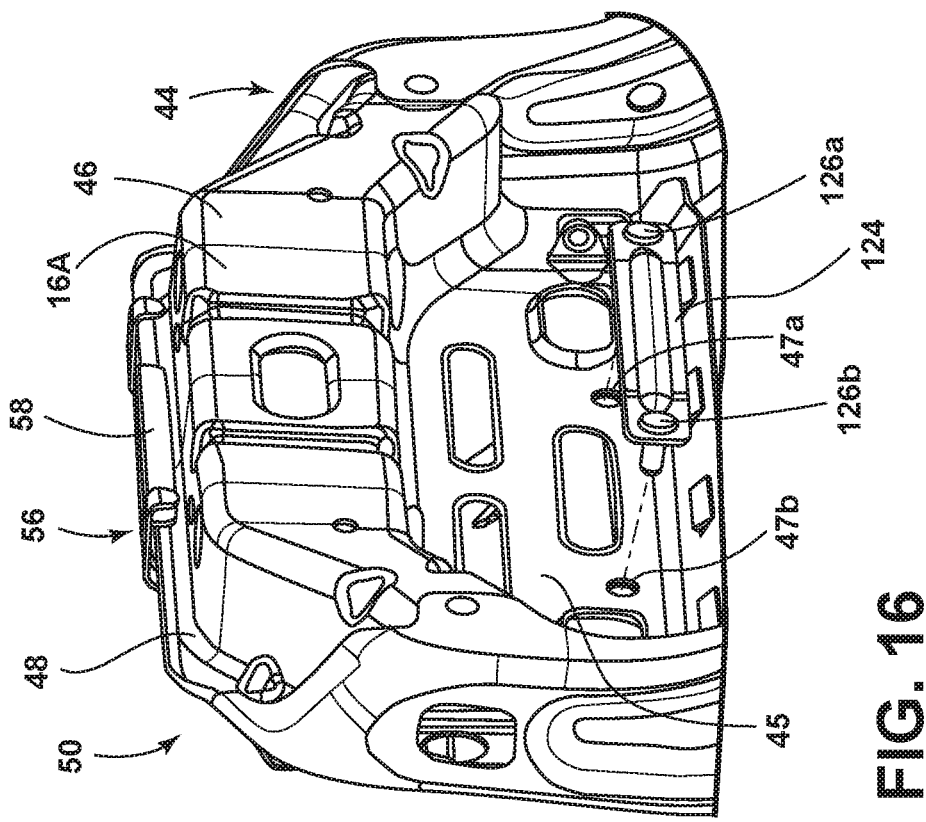
FIG. 16 is a fragmentary front perspective view of the mounting bracket of FIG. 15 mounted on the seatback frame with a mounting plate exploded away therefrom.

Referring now to FIGS. 16 and 17, the mounting bracket 56 is coupled to the seatback frame 44 as generally supported by the support flange 48. The seatback frame 44 includes a mounting portion 45 which, as shown in FIGS. 15 and 17, abuts the lower mounting portion 74 of the mounting bracket 56 as properly positioned on the seatback frame 44. The mounting portion 45 of the seatback frame 44 includes first and second mounting apertures 47a, 47b, through which first and second mounting posts 126a, 126b of mounting plate 124 are received. Thus, in the exploded view of FIG. 16, the mounting plate 124 will mount to the mounting portion 45 from the front side 16A of the seatback frame 44 through first and second mounting apertures 47a, 47b using first and second mounting posts 126a, 126b. With reference to FIG. 17, the first and second mounting posts 126a, 126b are shown extending through the first and second mounting apertures 75a, 75b of the lower mounting portion 74 of the mounting bracket 56, which abuts the mounting portion 45 on the rear side 16B of the seatback frame 44.

Thus, the mounting system 50 does not require the mounting bracket 56 to be mounted to the seatback frame 44 with additional screws or bolts that require additional fastening locations in a standard seatback frame 44. Instead, the mounting system 50 of the present concept includes the mounting bracket 56 being generally supported from the support flange 48 via the inverted U-shaped channel 58 along the upper mounting portion 72. At the lower mounting portion 74 of the mounting bracket 56, the first and second mounting posts 126a, 126b of the mounting plate 124 extend through the first and second mounting apertures 47a, 47b of the seatback frame 44, and further extend through the first and second mounting apertures 75a, 75b of the lower mounting portion 74 of the mounting bracket 56. The first and second mounting apertures 47a, 47b disposed in the seatback frame 44 are contemplated to be preexisting mounting apertures disposed on the seatback frame 44, such that the mounting system 50 of the present concept does not require additional screw or bolt holes in the seatback frame 44. With the mounting plate 124 in place and the mounting posts 126a, 126b extending through the first and second mounting apertures 75a, 75b of the lower mounting portion 74 (see FIGS. 16, 17), the trim retention cover 54 can be clipped to the mounting bracket 56, such that the first and second mounting posts 126a, 126b abut the lower portion of the trim retention cover 54 near the support ribs 116 (see FIGS. 9-11). In this way, the trim retention cover 54 cooperates with the mounting bracket 56 and mounting plate 124 to capture and positively retain a portion of the seatback frame 44 therebetween for maintaining proper alignment of the mounting system 50. It is contemplated that this coupling is a non-load bearing coupling which does not interfere with the pre-set tolerances of the vehicle seat 12 in a way that rigidly coupled screws or bolts being added to the seat frame structure would so interfere. In this way, the mounting system 50 does not require customized attachment holes at or near support flange 48, yet supports the electronic device holder 10 adequately. Further, the design of the mounting system 50 does not require screws or bolts to couple to the seatback frame 44 to support the electronic device holder 10.

Thus, as shown in FIG. 16, mounting apertures 47a, 47b are available low down on the seatback frame 44, but the remaining structural features of the seatback frame 44, near its upper portion, are already used for other seat attachments and support functions. The only available feature is the top curled edge of the stamping, the support flange 48, which, as noted above, is dimensionally uncontrolled from the various seatback frame manufacturers. Thus, the support member 60 was developed to provide a compliant, self-retaining component that would interface firmly with the controlled surfaces of the seatback frame 44, while also complying with the uncontrolled surfaces, such as the support flange 48. When rolled onto the curled edge of the support flange, as shown in FIG. 4A, the support member 60 becomes self-retaining, and yet provides a consistent and repeatable compliant surface in the home position HM onto which the inverted U-shaped channel 58 of the main mounting bracket 54 can be mounted. The result is a tight, vibration or rattle resistant connection at the top of the mounting bracket 54 without any modifications to the world sourced and uncontrolled seatback frame 44.

Figure 18:
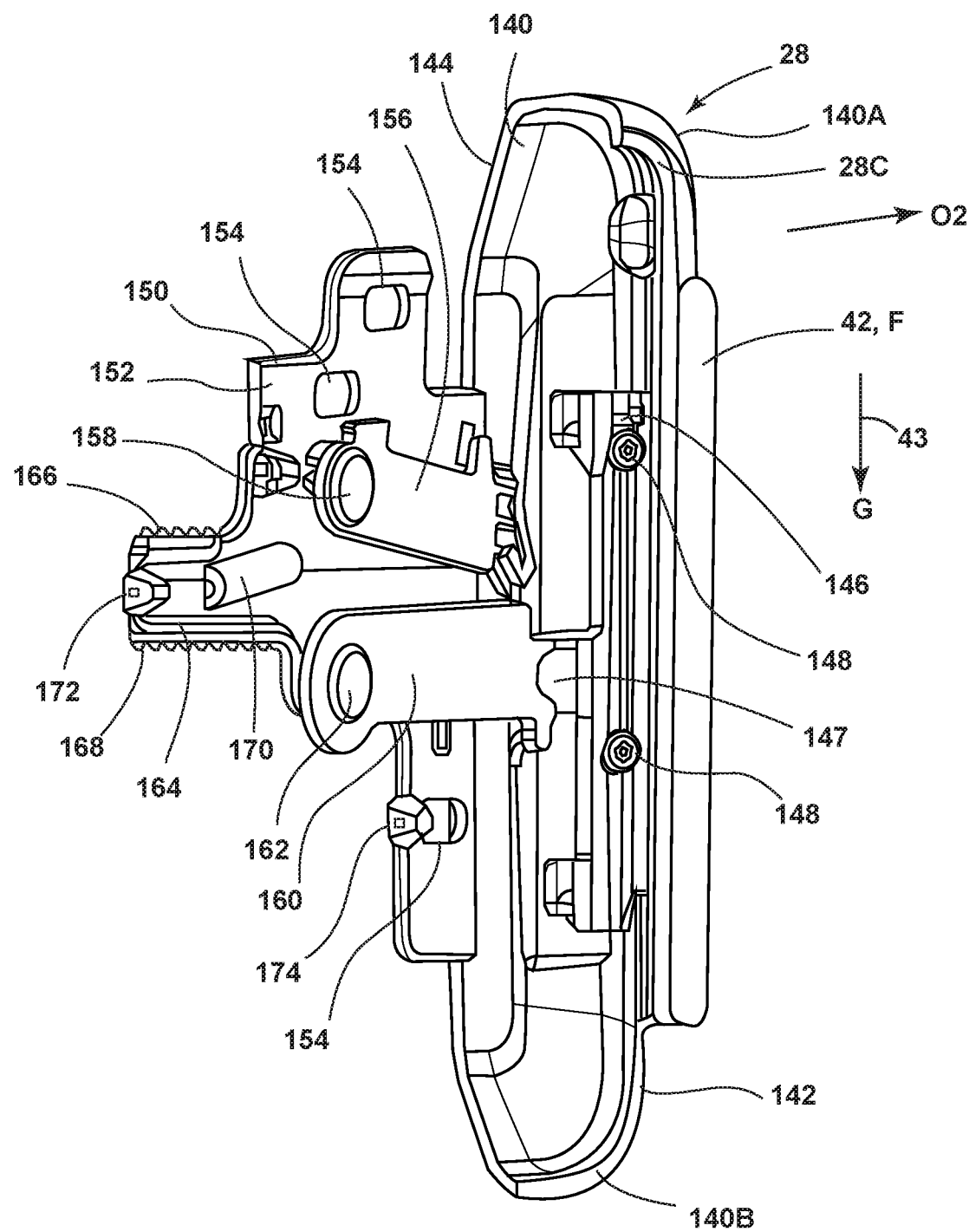
FIG. 18 is a perspective view of a right hand door assembly.

Referring now to FIG. 18, the right hand or second door 28 is shown having a main body portion 140 which includes front and rear sides 142, 144. The body portion 140 includes an upper portion 140A and a lower portion 140B. As shown in FIG. 18, the upper portion 140A has a generally U-shaped configuration culminating in the lip or outer edge 28C. The lower portion 140B of the body portion 140 is shown in FIG. 18 having a different configuration relative to the upper portion 140A for accommodating the corner portion 24B of lower frame member 24 (FIG. 1). In assembly, the front portion 142 and rear portion 144 are disposed on opposite sides of the mounting surface 20 (FIG. 1). Disposed on the front side 142 of the second door 28, actuation lever 42 is slideably coupled thereto for movement along actuation path 43. Thus, the actuation lever 42 moves vertically in a direction as indicated by arrow 43 along the front side 142 of the body portion 140. The actuation lever 42 is shown in FIG. 18 in an at-rest position F and is moveable along path 43 to an actuated position G. The actuation lever 42 is coupled to a carriage 146 via fasteners 148. In assembly, the carriage 146 moves with the actuation lever 42 along path 43. The carriage 146 further includes a connecting portion 147 for connecting to a biasing lever, as further described below.

Figure 25:
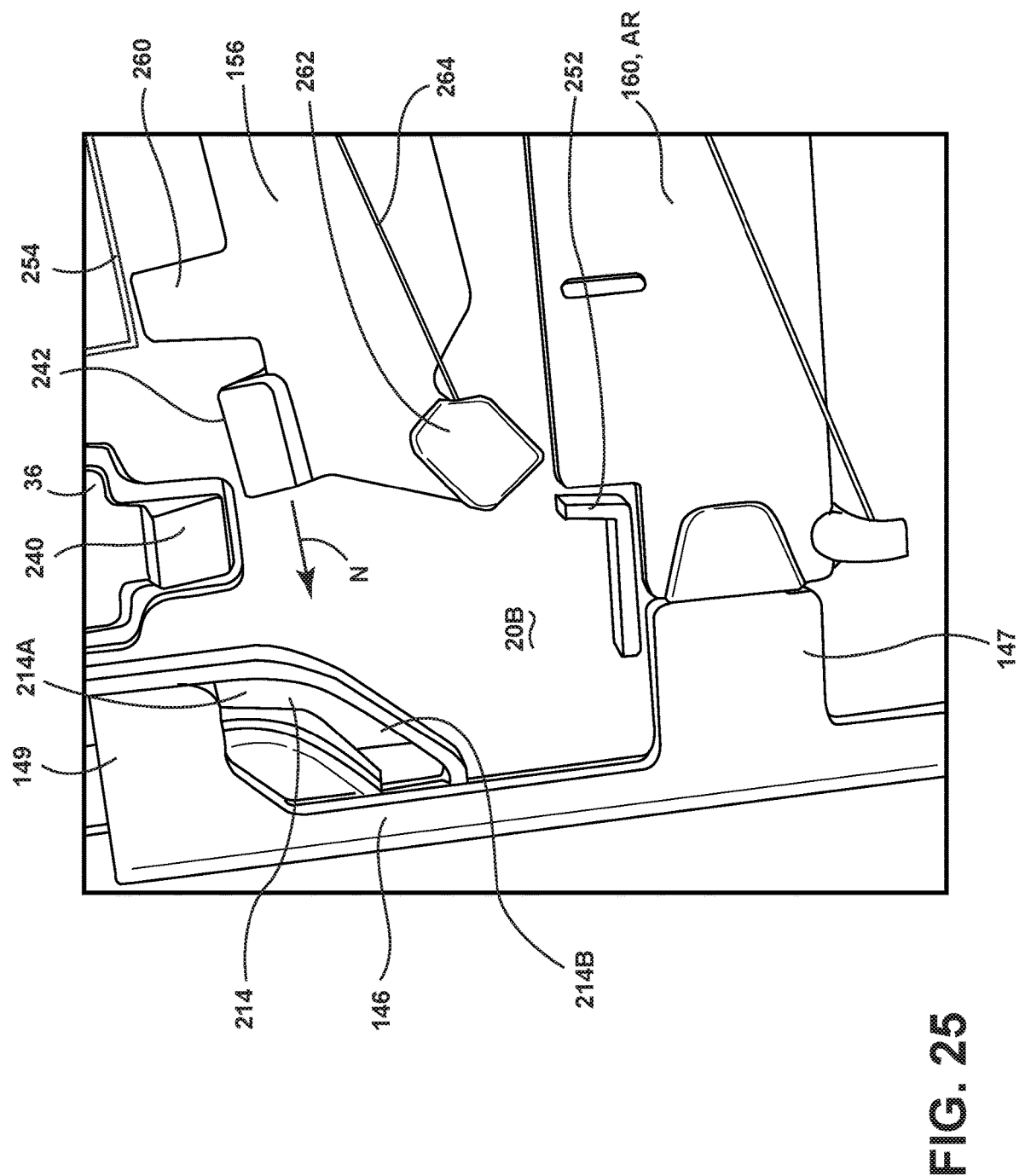
FIG. 25 is a rear perspective view of the detent release lever and detent lever of FIG. 24 further showing a locking lever coupled to an actuator carriage.

Referring again to FIG. 18, the second door 28 also includes a mounting portion 150 having a body portion 152 with a number of slots 154 disposed therethrough which are elongated slots. The slots 154 are used to mount the second door 28 to the mounting surface 20 (FIG. 1) in a slideable manner. In this way, the door 28 can move laterally in a direction as indicated by arrow 29 from the closed position C2 to the open position O2. A detent lever 156 is pivotally coupled to the body portion 152 of the mounting portion 150 at pivot location 158. The detent lever 156 is used to detent, or otherwise retain, the first and second doors 26, 28 in the open position O1, O2 as shown in FIG. 27. A locking lever 160 is also pivotally coupled to the body portion 152 of the mounting portion 150 at pivot location 162. The locking lever 160 is coupled to the carriage 146 at connecting portion 147, such that the locking lever 160 pivots with the movement of the actuation lever 42 in assembly. The mounting portion 150 further includes an engagement portion 164 extending laterally off the body portion 152. The engagement portion 164 includes upper and lower racks 166, 168 which are used to mount the second door 28 to a back side of the mounting surface 20 in a geared relationship with first door 26, as further described below. The upper and lower racks 166, 168 are generally toothed track sections which are configured to engage a gear for movement in an incremental manner with first door 26. As further shown in FIG. 18, a spring housing 170 is disposed on the body portion 152 of the mounting portion 150 and first engagement flange 172 is disposed at a distal end of the engagement portion 164. In assembly, the spring housing 170 is configured to house a biasing mechanism which couples to the locking lever 160 to bias the locking lever 160 to an at-rest position AR, as best shown in FIG. 25. The first engagement flange 172 is further configured to couple to a biasing member which is coupled to both the first door 26 and second door 28 to bias the doors 26, 28 towards the closed position C1, C2, as further described below. The mounting portion 150 further includes a second engagement flange 174 which is also configured to couple to a biasing member between the first door 26 and second door 28 to bias the first and second doors 26, 28 towards the closed position C1, C2, (FIG. 1) as further described below.

Figure 19:
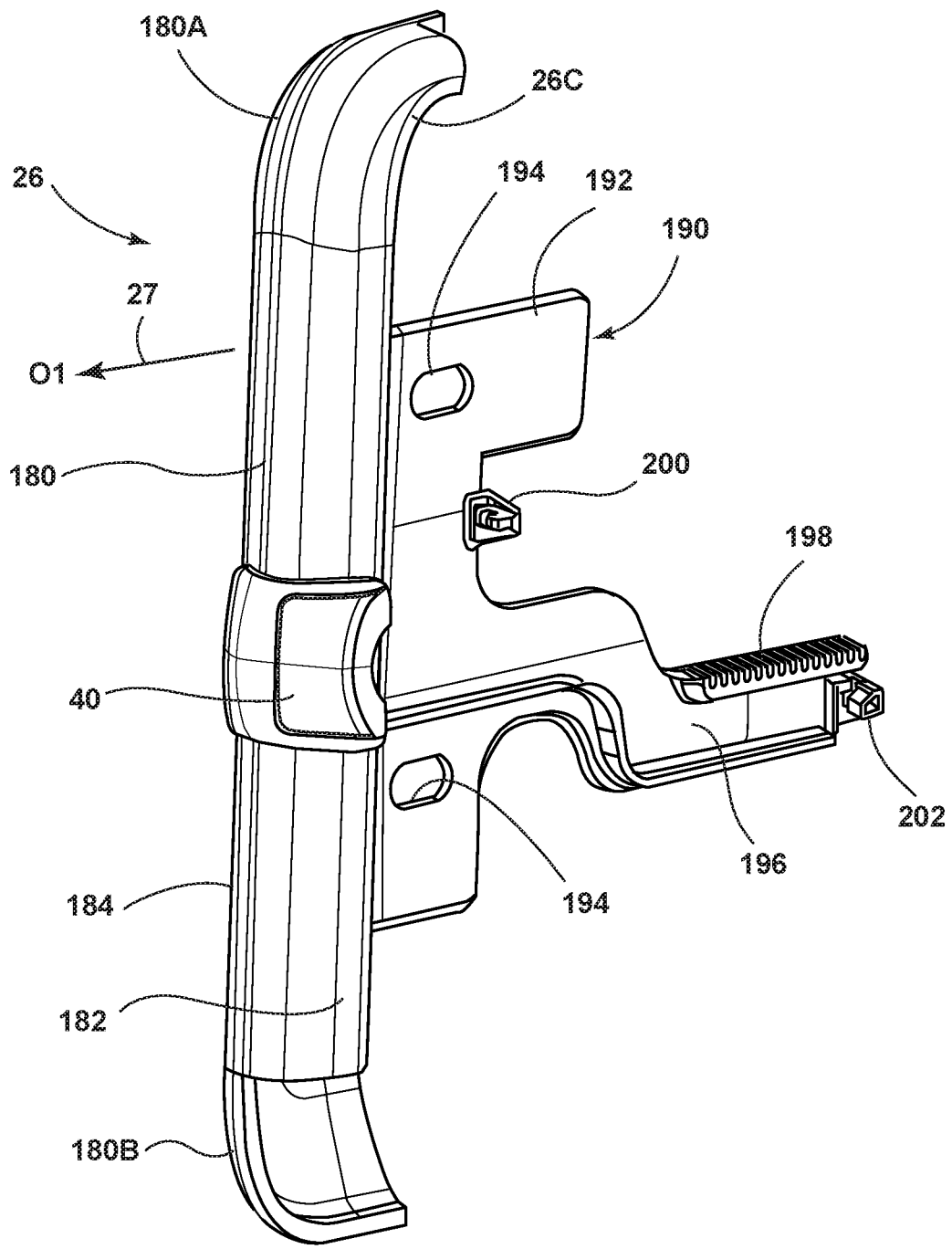
FIG. 19 is a perspective view of a left hand door assembly.

Referring now to FIG. 19, the left hand or first door 26 is shown having a main body portion 180 which includes front and rear sides 182, 184. The body portion 180 includes an upper portion 180A and a lower portion 180B. As shown in FIG. 19, the upper portion 180A has a generally U-shaped configuration culminating in the lip or outer edge 26C. The lower portion 180B of the body portion 180 is shown in FIG. 19 having a different configuration relative to the upper portion 180A to accommodate the corner portion 24A of the lower frame member 24 (FIG. 1). In assembly, the front portion 182 and rear portion 184 are disposed on opposite sides of the mounting surface 20 (FIG. 1). The first door 26, much like second door 28, also includes a mounting portion 190 having a body portion 192 with a number of slots 194 disposed therethrough which are elongated slots. The slots 194 are used to mount the first door 26 to the mounting surface 20 (FIG. 1) in a slideable manner along a rear side 20B of the mounting surface 20. In this way, the first door 26 can move laterally in a direction as indicated by arrow 27 from the closed position C1 to the open position O1 (FIG. 1). The mounting portion 190 further includes an engagement portion 196 extending laterally off the body portion 192. The engagement portion 196 includes a rack or toothed section 198 which is used to mount the first door 26 to a back surface of the mounting surface 20 in a geared relationship with the second door 28, as further described below. The rack 198 is generally a toothed track section which is configured to engage a gear for movement in an incremental manner with second door 28. The mounting portion 190 further includes a first engagement flange 200 which is configured to couple to a biasing member between the first door 26 and the first engagement flange 172 of the second door 28 to bias the first and second doors 26, 28 towards the closed position C1, C2, (FIG. 1) as further described below. As further shown in FIG. 19, a second engagement flange 202 is disposed at a distal end of the engagement portion 196. In assembly, the second engagement flange 202 is configured to couple to a biasing member also coupled to the second engagement flange 174 of the second door 28 to bias the first and second doors 26, 28 towards the closed position C1, C2, (FIG. 1) as further described below. Referring again to FIG. 19, the first door 26 further includes an electrical connector 40 slideably received through receiving aperture 181 (FIG. 29) disposed on the body portion 180 of the first door 26. In assembly, the electrical connector 40 is used to connect to an electronic device received in the electronic device holder 10 (FIG. 1) for powering, charging and interfacing with the electronic device as further described below.

Figure 20:
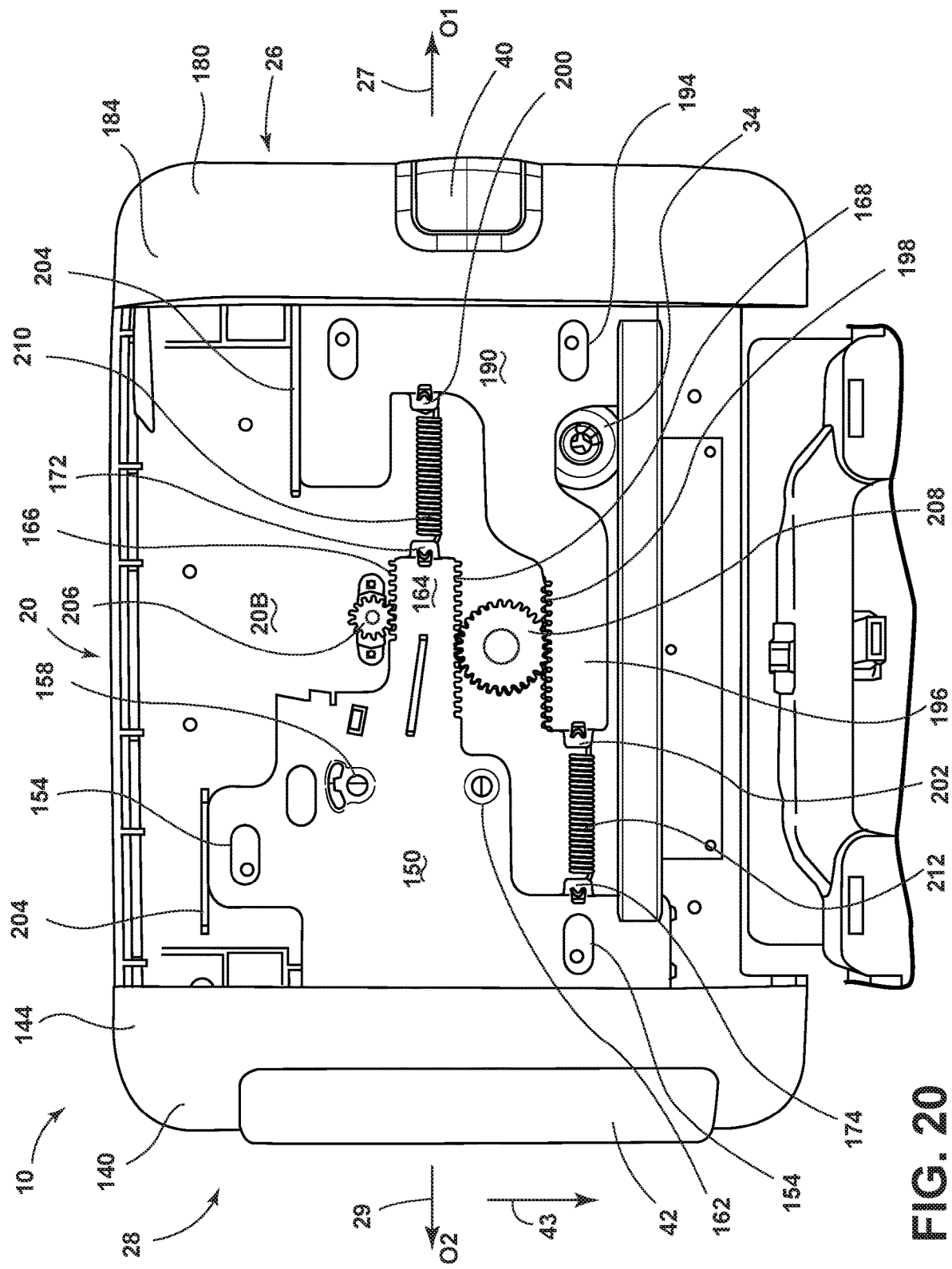
FIG. 20 is a rear plan view of the doors of FIGS. 18 and 19 mounted to a back side of a mounting surface.

Referring now to FIG. 20, the first and second doors 26, 28 are shown slideably mounted to a rear side 20B of the mounting surface 20. The rear side 20B includes a number of guide members 204 outwardly extending therefrom which abut and guide the mounting portions 190, 150 of the first and second doors 26, 28, respectively. As noted above, the engagement portion 164 of the second door 28 includes upper and lower rack portions 166, 168 which are toothed sections gearingly coupled to the rear side 20B of mounting surface 20. Specifically, upper rack 166 is coupled to a damper mechanism 206 which is rotatably mounted to the rear side 20B of the mounting surface 20. The damper mechanism 206 is an optional damper mechanism to dampen the movement of the first and second doors 26, 28 between the open and closed positions along paths 27, 29 respectively. The lower rack portion 168 is shown in FIG. 20 coupled to a spur gear 208 which is further coupled to rack portion 198 of first door 26. The spur gear 208 is rotatably mounted to the rear side 20B of the mounting surface 20, such that the first door 26 is gearingly engaged or coupled to the second door 28 for synchronized movement therewith. Thus, as the first or second door 26, 28 opens or closes, the reciprocal door also opens and closes to ensure that an electronic device housed in the electronic device holder 10 is grasped by both the first and second doors 26, 28 as the first and second doors 26, 28 close around the electronic device. As further shown in FIG. 20, the first engagement flanges 200, 172 of the first and second doors 26, 28 are coupled to a first biasing mechanism 210 which is shown in the form of a coil spring or tension spring. Further, the second engagement flanges 202, 174 of the first and second door 26, 28 are coupled on opposite sides to a second biasing mechanism 212. In assembly, the first and second biasing mechanisms 210, 212 cooperate to urge the first and second doors 26, 28 towards the closed position C1, C2, thereby facilitating the closure of the first and second doors 26, 28 around an electronic device as retained within the electronic device holder 10.

Figure 21:
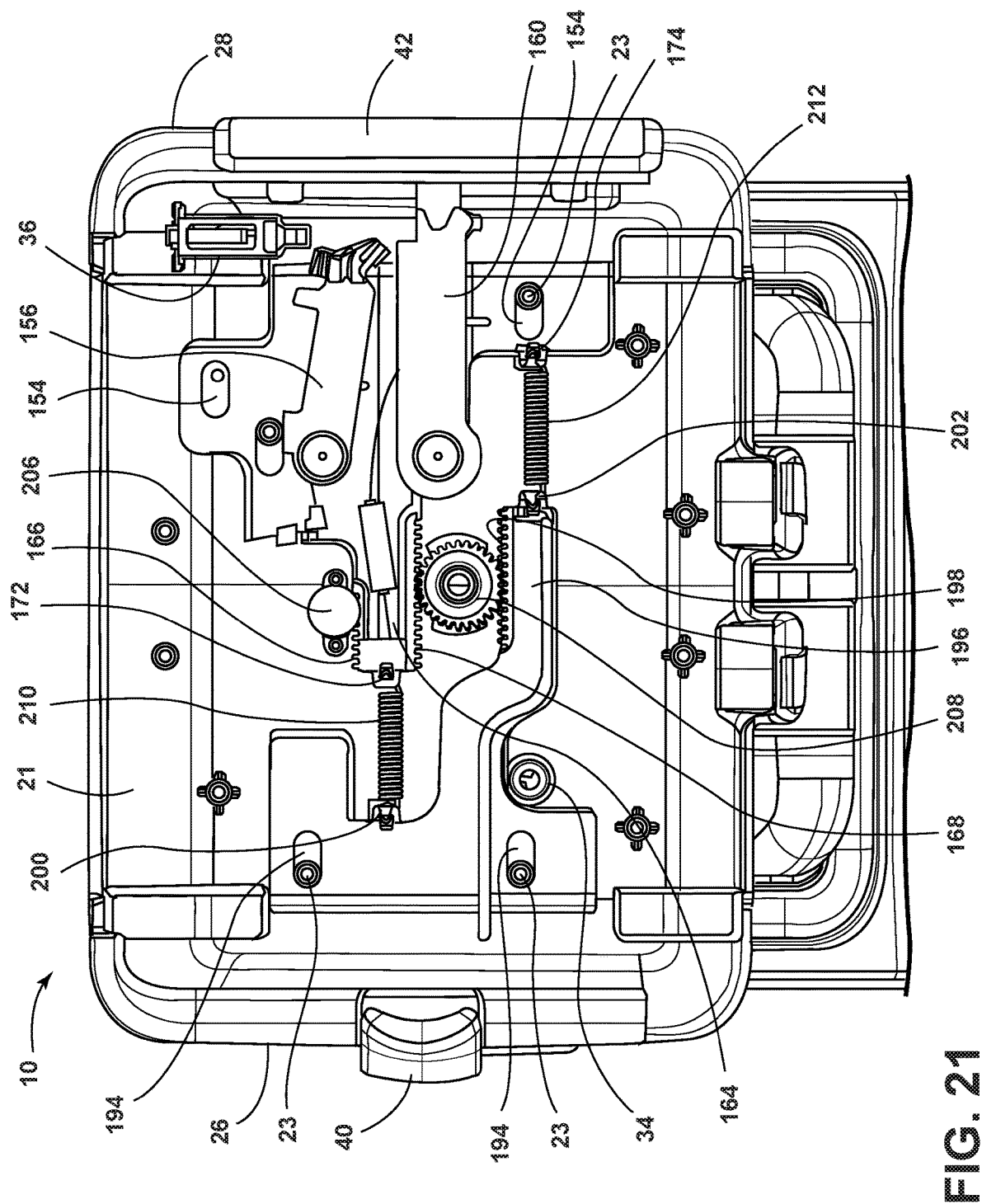
FIG. 21 is a front plan view of the electronic device holder of FIG. 20 with the mounting surface removed.

Referring now to FIG. 21, the electronic device holder 10 is shown from a front view having the mounting surface 20 removed. With the mounting surface 20 removed, a rear housing 21 is shown. As further shown in FIG. 21, the geared relationship between the first and second doors 26, 28 through spur gear 208 is shown, as well as the biasing of the doors 26, 28 to the closed position via first and second biasing members 210, 212. As further shown in FIG. 21, rear housing 21 includes screw towers 23 which are disposed in slots 194 and 154 of the first and second doors 26, 28, respectively, thereby providing a hard stop for the opening of the first and second doors 26, 28. It is contemplated that the slots 194, 154 are configured to allow approximately 10 mm of travel for the first and second doors 26, 28 from the closed position C1, C2 (FIG. 29) to the open position O1, O2 (FIG. 27). The screw towers 23 are configured to receive fasteners that connect the mounting surface 20 to the rear housing 21 with the mounting portions 190, 150 of the first and second doors 26, 28 slideably mounted therebetween.

Figure 23:
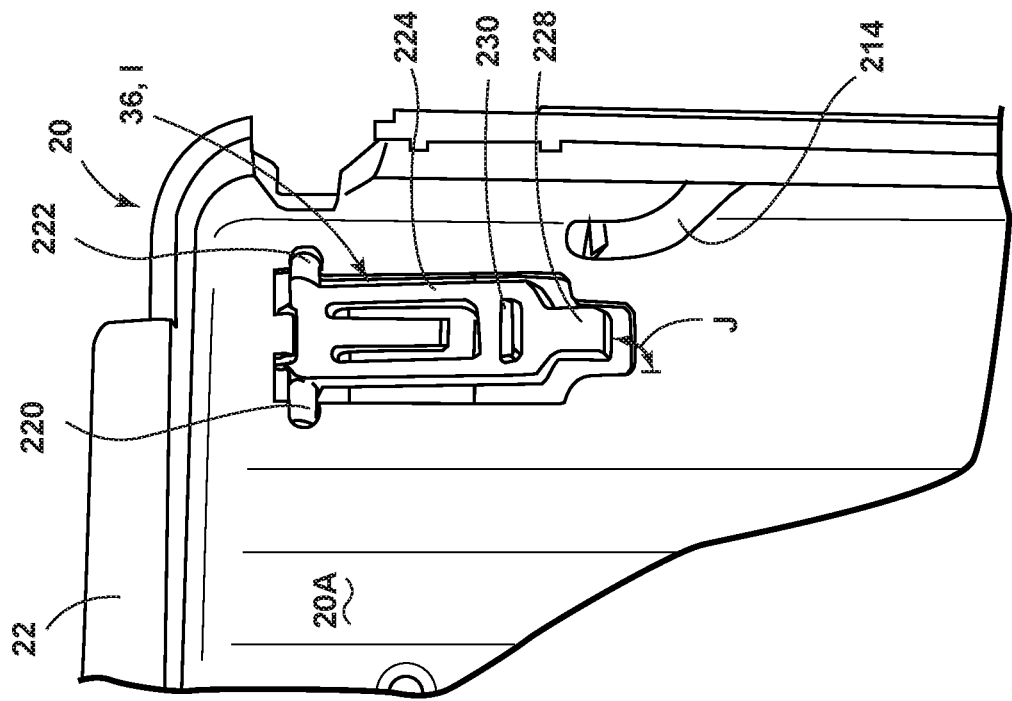
FIG. 23 is a fragmentary front perspective view of the detent release lever of FIG. 22 shown in an extended position.
Figure 22:
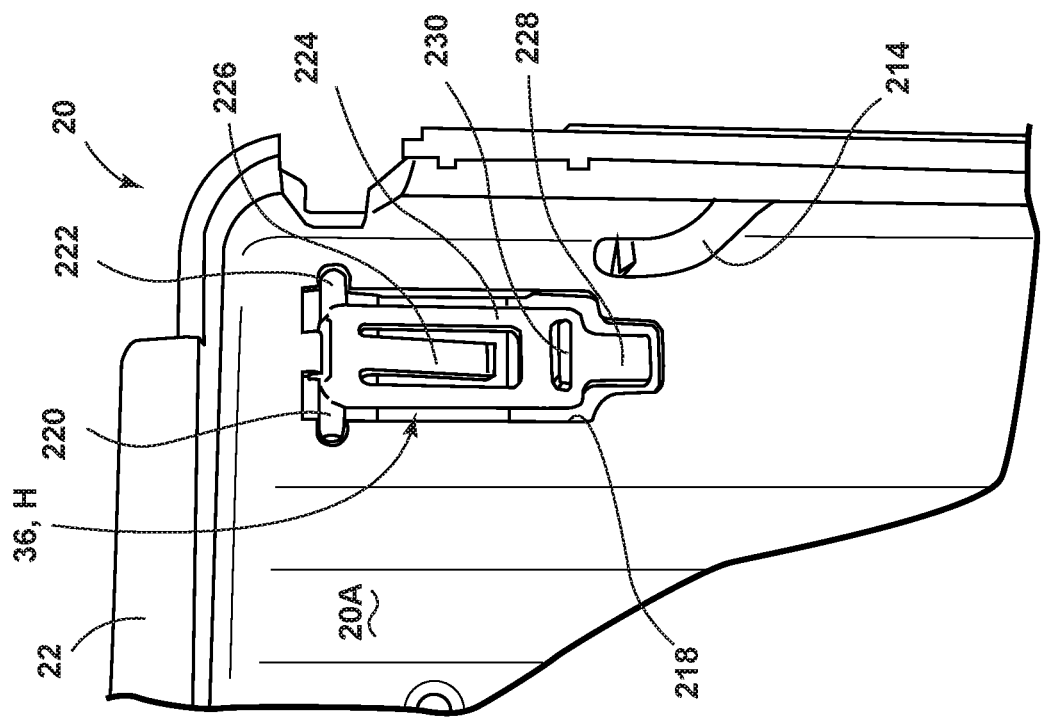
FIG. 22 is a fragmentary front perspective view of a detent release lever pivotally coupled to the mounting surface in a depressed position.

Referring now to FIGS. 22 and 23, a portion of the front side 20A of the mounting surface 20 is shown having detent release lever 36 pivotally mounted thereto. Specifically, the detent release lever 36 is mounted to the mounting surface 20 at pivot points 220, 222. The detent release lever 36 includes a body portion 224 having a spring tab 226 disposed therein. At a distal most end of the detent release lever 36, an engagement tab 228 and an abutment flange 230 are disposed. In FIG. 22, the detent release lever 36 is shown disposed in a generally vertical position, such that the detent release lever 36 is generally flush with front side 20A of mounting surface 20. In this vertical position, described herein as release position H, the detent release lever 36 is disposed within aperture 218 of the mounting surface 20, and it is contemplated that the spring tab 226 can abut the rear housing 21 of the electronic device holder 10 in this release position H. The detent release lever 36 is in the release position H when an electronic device is positioned in the electronic device holder 10. When the electronic device is placed in the electronic device holder 10, the abutment flange 230 abuts a back panel of the electronic device. An upper actuation slot 214 is shown disposed through the mounting surface 20 which is used to couple the actuation lever 42 (FIG. 1) to the mounting surface 20 for movement along actuation path 43. As the actuation lever 42 moves towards the actuated position, the detent release lever 36 is moved from the release position H to the extended position I along actuation path J as shown in FIG. 23. In the extended position I, the engagement tab 228 and abutment flange 230 are fully extended outward, approximately 5 mm, from the front side 20A of the mounting surface 20 as the body portion 224 of the detent release lever 36 has pivoted at pivot points 220, 222.

Figure 24:
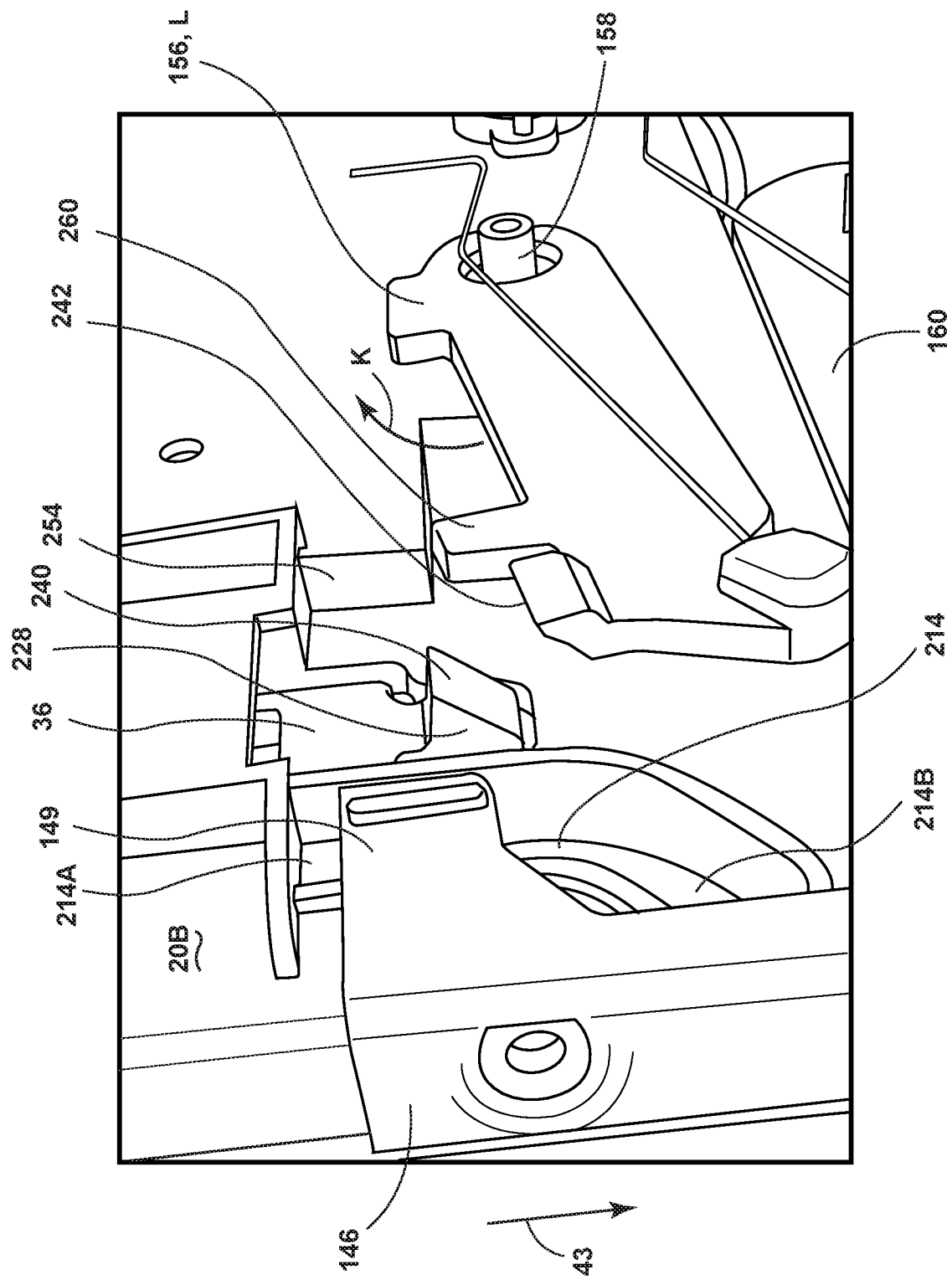
FIG. 24 is a rear perspective view of the detent release lever and a detent lever.

Referring now to FIG. 24, the detent release lever 36 is shown having a cammed surface 240 disposed on the engagement tab 228. Detent lever 156 is shown having a similarly cammed surface 242. As described above, detent lever 156 is generally coupled to the second door 28, however, the detent lever 156 is shown in FIG. 24 without the second door 28 to clearly show the interaction of the cammed surfaces 240, 242. In FIG. 24, the carriage 146, which is attached to the actuator 42 in assembly, is shown coupled to the upper actuation slot 214. The upper actuation slot 214 includes a generally vertical portion 214A and a laterally extending portion 214B. Thus, the carriage 146 includes a connecting portion 149 that is disposed within the upper actuation slot 214 and guided therealong. It is contemplated that the carriage 146 includes a second coupling portion which is disposed within a lower actuation slot 216 (see FIG. 26) having the same configuration as upper actuation slot 214. As the carriage 146 moves downward in the direction as indicated by arrow 43 by the movement of the actuation lever 42 by the user, the connecting portion 149 will generally move vertically along vertical portion 214A, and then move outwardly through laterally extending portion 214B of the upper and lower actuation slots 214, 216. In this way, the second door 28 moves outwardly and away from the mounting surface 20 to release an electronic device housed therein. As the carriage 146 moves along upper actuation slot 214, detent lever 156 will move from the at-rest position L, shown in FIG. 24, to an actuated position M, shown in FIG. 26, along an actuation path as indicated by arrow K. Thus, in FIG. 24, the detent lever 156 and the detent release lever 36 are shown as they would be positioned when the doors 26, 28 are closed and locked, as shown in FIG. 1.

Referring now to FIG. 25, as the second door is moved outwardly by the movement of the carriage 146 to the laterally extending portion 214B of upper actuation slot 214, the detent lever 156 will also move laterally in the direction as indicated by arrow N. The movement in the direction as indicated by arrow N aligns the cammed surface 240 of the detent release lever 36 with the cammed surface 242 of the detent lever 156. As the detent lever 156 pivots in the direction as indicated by arrow K towards the actuated position M (FIG. 26), the cammed surface 242 of the detent lever 156 will act on the cammed surface 240 of the detent release lever 36, thereby urging the detent release lever 36 to the extended position I shown in FIG. 23. In the extended position I (FIG. 23), the engagement tab 228 and abutment flange 230 are disposed about 5 mm proud of the mounting surface 20. As further shown in FIG. 25, the rear side 20B of the mounting surface 20 includes a lock structure 252 which is configured to engage the locking lever 160 in the at-rest position AR, and lock the doors 26, 28 in the closed position C1, C2. Thus, as the carriage 146 moves along upper and lower actuation slots 214, 216, locking lever 160 will rotate from the at-rest position AR, shown in FIG. 25, to an actuated position AP, shown in FIG. 26. When the locking lever 160 is in the at-rest position AR, the doors 26, 28 are in the closed position C1, C2. When the locking lever 160 is in the actuated position AP and free from lock structure 252, the doors 26, 28 are detented in the open position O1, O2. Thus, as shown in FIG. 25, the detent lever 156 and the detent release lever 36 are shown as they would be positioned when the doors 26, 28 are closed and locked, as shown in FIG. 1.

Referring again to FIGS. 24 and 25, the detent lever 156 includes an abutment portion 260 which engages a retention feature 254 disposed on the rear side 20B of the mounting surface 20. As the detent lever 156 moves laterally in the direction as indicated by arrow N, the abutment portion 260 will clear the retention feature 254. Once the abutment portion 260 clears the retention feature 254, the detent lever 156 is free to move upward along the path as indicated by arrow K to the actuated position M shown in FIG. 26. The detent lever 156 further includes a connecting portion 262 which is coupled to a biasing mechanism 264 which biases the detent lever 156 towards the actuated position M, such that when the abutment portion 260 clears the retention feature 254, the detent lever 156 will automatically move to the actuated position M, thereby causing the detent release lever 36 to move to the extended position I due to the urging interaction of the cammed surfaces 240, 242. In the actuated position M, the detent lever 156 serves to detent the second door 28 in the open position O2. As gearingly coupled to the second door 28, the first door 26 will also detent in the open position O1 when the detent lever 156 is in the actuated position M. As used herein, the term "detent" is meant to convey that the detent lever 156 blocks movement of another part. In this case, the doors 26, 28 detent in the open position O1, O2 as they are blocked from movement to the closed position C1, C2 by the detent lever 156.

Figure 26:
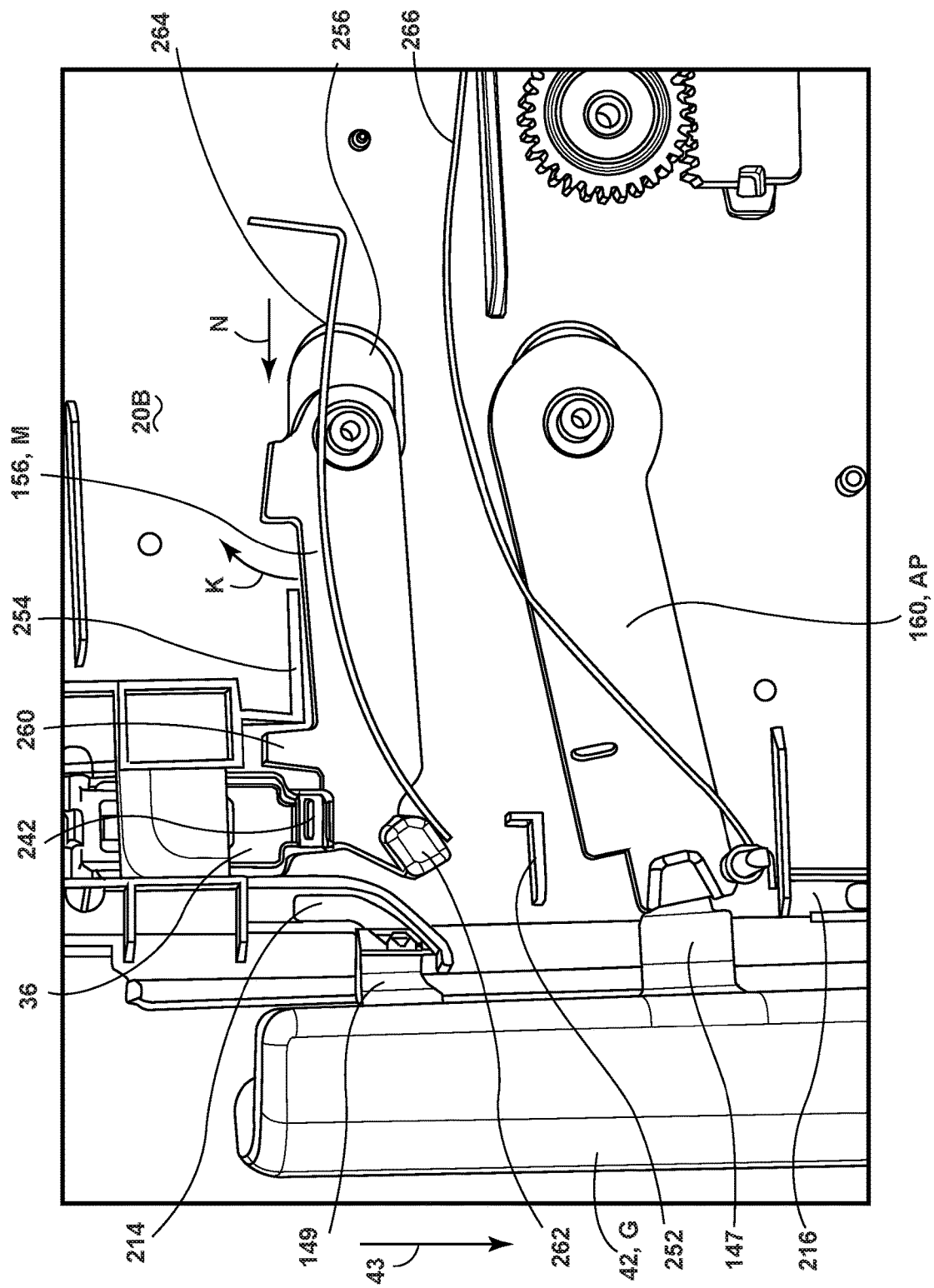
FIG. 26 is a rear perspective view of the mounting surface having the right hand door removed and showing an actuator lever in an actuated position and the locking lever in an unlocked position.

Referring now to FIG. 26, the detent lever 156 is shown in the actuated position M as the abutment portion 260 has cleared the retention feature 254 and therefore allowed the detent lever 156 to move to the actuated position M as biased by biasing member 264. As further shown in FIG. 26, the second door 28 is removed to show the actuation lever 42 coupled to the carriage 146 which is coupled to upper and lower actuation slots 214, 216. The actuation lever 42 is moved to the fully actuated position G along the actuation path as indicated by arrow 43, such that the detent lever 156, as coupled to the second door 28 in assembly, has moved laterally in the direction as indicated by arrow N within slot 256. Thus, the movement of the actuation lever 42 downwardly along actuation path 43, causes the second door 28 to move laterally to the open position O2 (FIG. 1) which also moves the detent lever 156 to a position from which the detent lever 156 can be biased upwards towards the actuated position M to interact with detent release lever 36. Thus, in FIG. 26, the detent lever 156 and the detent release lever 36 are shown interacting as they would be when the doors 26, 28 are opened and detented open, as shown in FIG. 27.

Referring now to FIG. 27, the electronic device holder 10 is shown with the first and second doors 26, 28 detented to the open positions O1, O2, such that the frame 30 is in a disconnected or open configuration O3 around the mounting surface 20. In order to move the frame 30 from the connected position, shown in FIG. 1, to the disconnected or open position O3, shown in FIG. 27, it is contemplated that a user has moved actuation lever 42 downward along actuation path 43 to the actuated position G, thereby opening the first and second doors 26, 28. In this position, the electronic device holder 10 is configured to receive an electronic device for retention therein. Opening the first door 26 has also moved the electrical connector 40 to an extended position V, as further described below. The first and second doors 26, 28 will remain detented in the open position O1, O2 until actuated to the closed position C1, C2 by a user, as further described below.

As further shown in FIG. 27, the ejector pin 34 includes a retractable plunger 270 which is shown in an extended position, wherein the plunger 270 extends outwardly from the mounting surface 20. It is contemplated that the mounting surface 20 includes a cushioned surface, such as a flocking member, that will serve as an anti-vibrational member between the electronic device holder 10 and an electronic device. The retractable plunger 270 of the ejector pin 34 is biased towards the extended position and will also bias an electronic device against the frame 30 of the electronic device holder 10 when an electronic device is retained therein. Further, the plunger 270 will urge an electronic device to the forward tilt position FT (FIG. 28) when the electronic device is released by the first and second doors 26, 28 opening. As an electronic device is loaded into the electronic device holder 10, the retractable plunger 270 will easily move to a retracted position that is substantially flush with the mounting surface 20, yet pressing against the electronic device for better retention with reduced potential for rattle.

Figure 28:
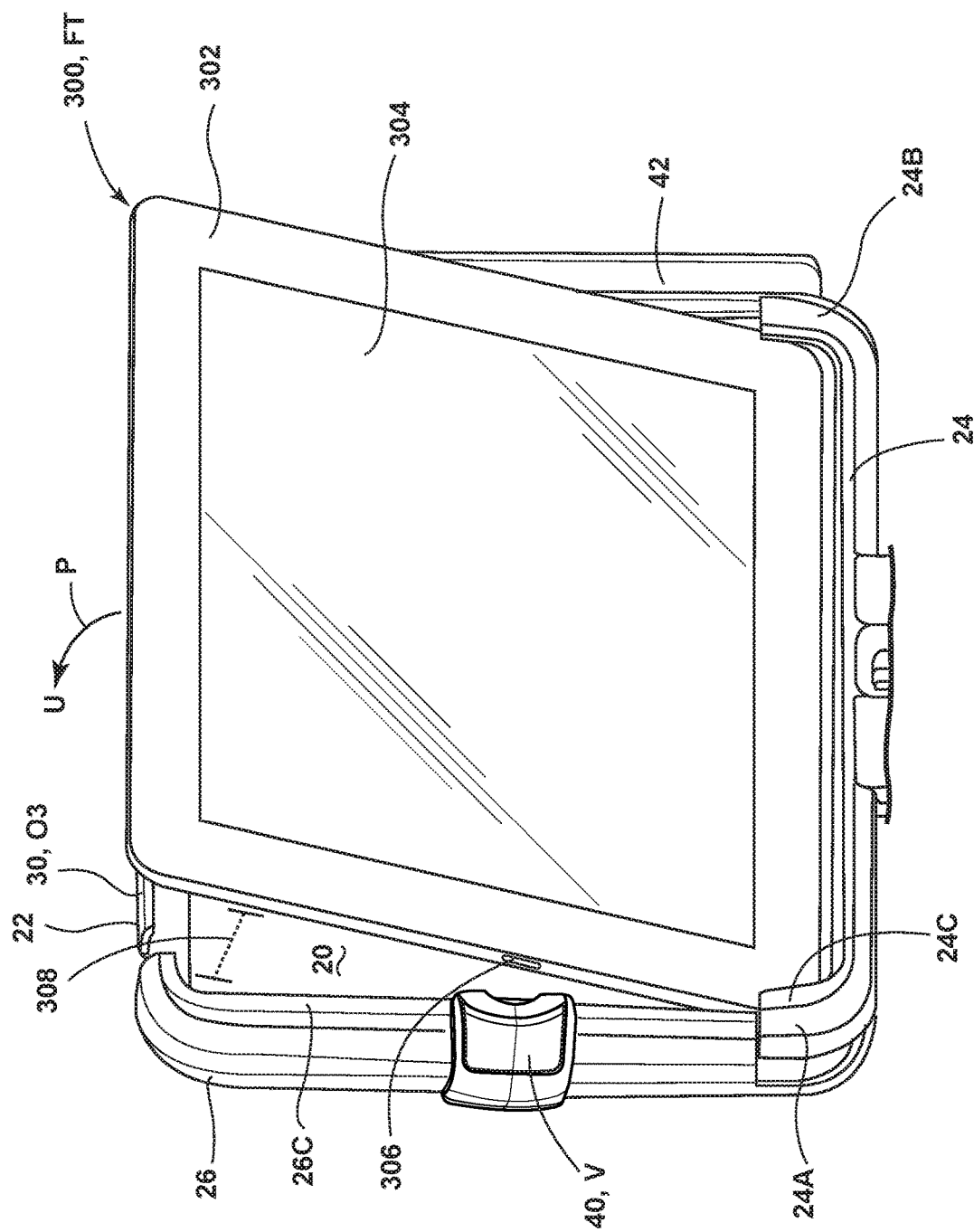
FIG. 28 is a perspective view of an electronic device in a pre-load forward tilt position as loaded into the electronic device holder.

Referring now to FIG. 28, the electronic device holder 10 is shown with the first and second doors 26, 28 still detented in the open positions O1, O2, such that electronic device 300 can be loaded into the open frame 30. As noted above, the electronic device holder 10 is configured to be presented to a vehicle occupant for easy insertion and removal of an electronic device. As shown in FIG. 28, the electronic device 300 is in the form of a tablet device. The electronic device holder 10 is configured such that the tablet 300 is securely held during loading into the electronic device holder 10. The electronic device holder 10 of the present concept is configured such that a user can load and unload an electronic device with one hand. This one-handed loading action is made possible by an easy and semi-automatic load and unload capability of the electronic device holder 10.

As further shown in FIG. 28, the electronic device 300 includes an outer frame 302 which surrounds a central screen area 304. On a left side of the electronic device 300, a power port 306 is disposed. The electronic device 300 is shown in a forward tilt position FT, in which the electronic device 300 is essentially supported by the lower frame member 24 at turned up retaining corners 24A, 24B. In the forward tilt position FT, a gap 308 is defined between the electronic device 300 and the mounting surface 20. The gap 308 is shown at the upper portion of the electronic device 300 and helps provide the necessary clearance for a user to grasp and remove the electronic device 300 from the electronic device holder 10. From the forward tilt position FT, the electronic device 300 is ready to be rotated back towards the mounting surface 20 long a path as indicated by arrow P. In this way, the electronic device 300 moves from the forward tilt position FT to an upright position U (FIG. 29), wherein the electronic device 300 is disposed between the upper and lower frame members 22, 24. However, as a one-handed loading device, the retaining corners 24A, 24B provide an effective retention mechanism for the electronic device 300 when it is pushed forward by the ejector pin 34, such that the electronic device 300 is prevented from tilting too far forward and falling from the mounting cavity 32.

Figure 29:
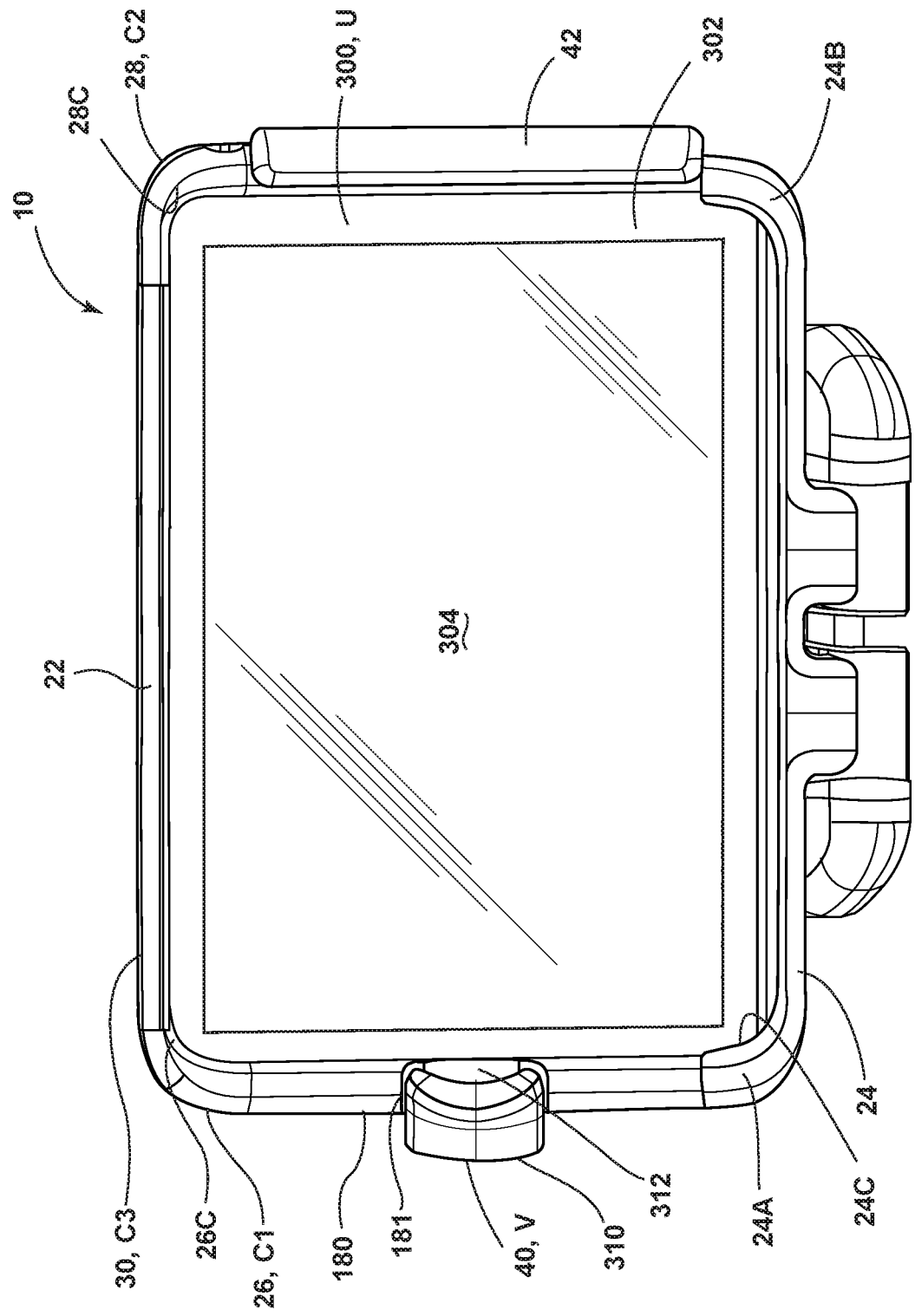
FIG. 29 is a front perspective view of the electronic device of FIG. 28 in an upright position within mounted in the electronic device holder.

Referring now to FIG. 29, the electronic device holder 10 is shown with the first and second doors 26, 28 in the closed positions C1, C2, such that the electronic device 300 is in the upright position U and retained by the frame 30 in a closed position C3. The biasing mechanisms 210, 212 (FIG. 20) load as the first and second doors 26, 28 are moved laterally apart to the open position O1, O2 (FIG. 27). From this position, the biasing mechanisms 210, 212 are prepared to move the first and second doors 26, 28 towards the closed position C1, C2 (FIG. 29) when actuated by the user. To actuate the closure of the first and second doors 26, 28, it is contemplated that a user has a number of different options available. As noted above, the detent release lever 36 is disposed on the mounting surface 20 (FIGS. 22, 23) and is actuated when loading the tablet 300 into the electronic device holder 10. Specifically, when the tablet 300 is moved from the forward tilt position FT (FIG. 28) to the upright position U (FIG. 29) the back of the tablet 300 will engage the detent release lever 36 and move the detent release lever 36 to the substantially flush or release position H. The movement of the detent release lever 36 to the flush or release position H from the extended position I causes cammed surface 240 of the detent release lever 36 to engage cammed surface 242 (FIG. 24) of the detent lever 156. This action on detent lever 156 urges abutment portion 260 of detent lever 156 to clear retention feature 254 disposed on the rear side 20B of the mounting surface 20 (FIGS. 24-26), thereby releasing the second door 28 from the open position O2, and allowing the first and second doors 26, 28 to spring closed as biased by biasing mechanisms 210, 212 (FIG. 20). When the occupant is ready, a simple one-handed squeezing action of the top of the tablet 300 into the mounting cavity 32 will depress the detent release lever 36 and the doors 26, 28 will close. Further, the detent release lever 36 can be actuated directly by the user in the absence of the tablet 300, by pushing the detent release lever 36 from the extended position I (FIG. 23) to the flush or release position H (FIG. 22) to close the doors 26, 28. Alternatively, it is contemplated that a sharp inward tap to the second door 28 will result in the instant closure of both doors 26, 28 without damaging the electronic device holder 10. Using any of the methods noted above, the door closure action is both decisive and automatic to positively relay to a user that the tablet 300 is fully locked and retained within the electronic device holder 10.

Referring again to FIG. 29, the electrical connector 40, disposed on first door 26, is still in the extended position V. The electrical connector 40 is slideably disposed through a receiving aperture disposed in the first door 26 and is further configured to align with power port 306 (FIG. 28) disposed on the left hand side of the electronic device 300. In use, the electrical connector 40 is moved to the extended position V by the movement of the first door 26 to the open position O1 along path 27 (FIG. 1). This is due to an abutting relationship between the body portion 180 of first door 26 and the electrical connector 40. Thus, as the first door 26 moves to the open position O1 along path 27 (FIG. 1), the first door 26 carries the electrical connector 40 towards the extended position V. As the first door 26 moves laterally to the closed position C1, there is no abutting relationship with the electrical connector 40, such that the electrical connector 40 remains in the extended position V as the first door closes. When loading the tablet 300 into the electronic device holder 10, the first and second doors 26, 28 must fully close automatically to secure the tablet 300 in place, regardless of the electrical connector 40 being connected to the tablet 300. Thus, the closing of door 26 does not affect the position of the electrical connector 40, and the electrical connector 40 does not interfere with the closing of the doors 26, 28.

The electrical connector 40 is configured to electrically connect the electronic device 300 to the power module 57 shown in FIG. 13. In this way, the electronic device holder 10 can power and charge the electronic device 300 as retained therein. With the frame 30 in the closed position C3, the electronic device 300 is essentially retained by the outer edge portions 24C, 26C and 28C of the lower frame member 24 and the first and second doors 26, 28, respectively, are configured to capture and retain the electronic device 300 in the mounting cavity 32 (FIG. 1) of the electronic device holder 10. Thus, the electrical connector 40 will be disconnected from the electronic device 300 as the doors 26, 28 move to the closed position C1, C2 to secure the electronic device 300 therein. In this way, the electronic device holder 10 allows for one-handed loading and unloading of the electronic device 300.

Figure 30:
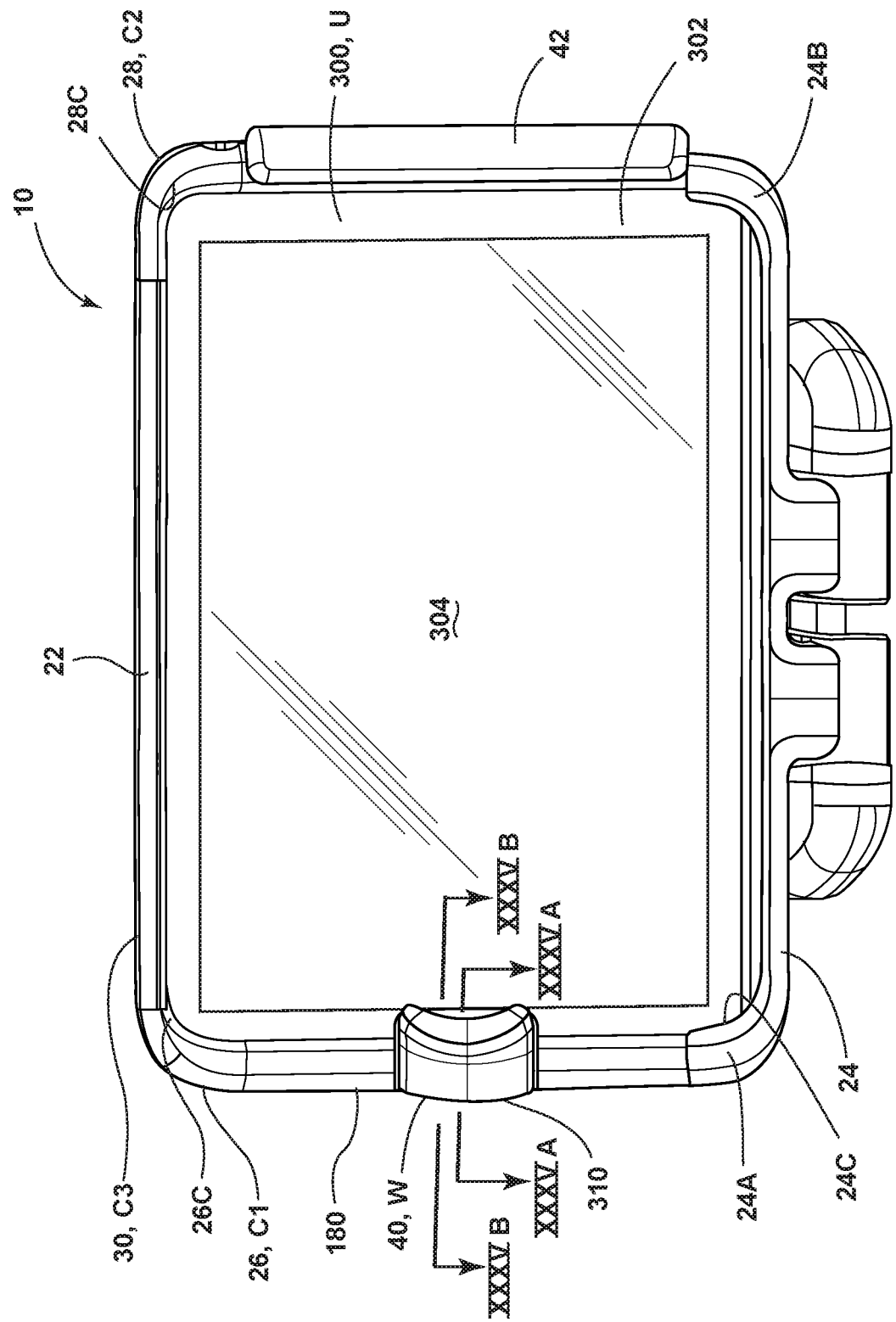
FIG. 30 is a front plan view of the electronic device mounted in the electronic device holder with the left and right hand doors closed and an electrical connector connected to the electronic device.

Referring now to FIG. 30, the electrical connector 40 is shown in a connected position W. The electrical connector 40 is moved to the connected position W by a user manually locating the power port 306 (FIG. 28) on the electronic device 300, and pushing the electrical connector 40 laterally towards the electronic device 300 and first door 26, when the first door 26 is in the closed position C1. The electrical connector 40 is configured to have an adequate amount of play as mounted to the device holder 10, such that a user can manipulate the electrical connector 40 up and down and side to side to ensure that the electrical connector 40 properly connects with and is received in power port 306 of the electronic device 300, as further described below.

Figure 31:
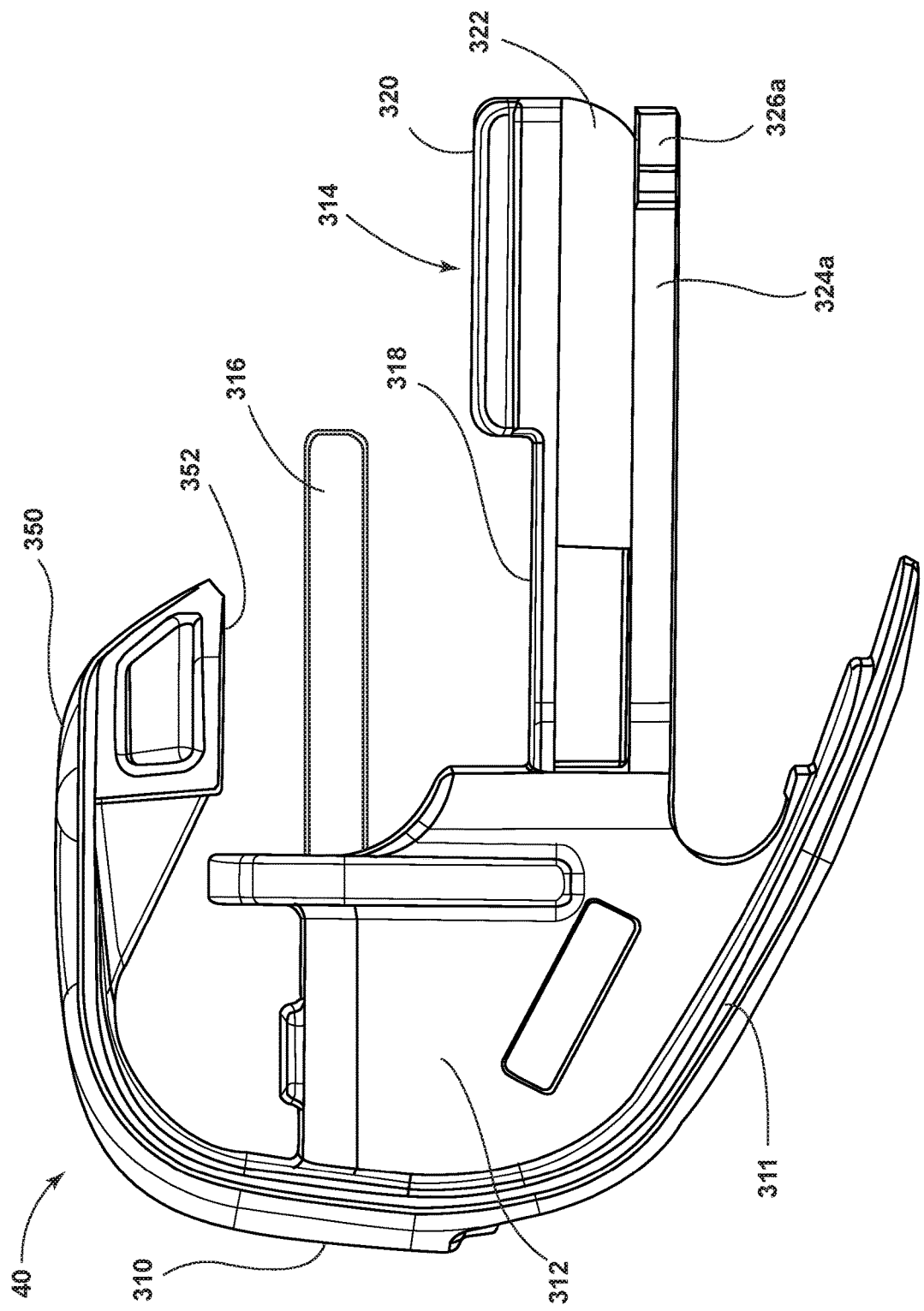
FIG. 31 is a side elevational view of the electrical connector removed from the electronic device holder and having a power plug mounted thereto.

Referring now to FIG. 31, the electrical connector 40 is shown having an outer housing 310, a body portion 312, an upper portion 350 and a lower portion 314. The outer housing 310 includes a shoulder portion 311 which generally abuts the body portion 180 of the first door 26 (FIG. 30) when the first door 26 moves outwardly to the open position O1, as shown in FIG. 28. The outer housing 310 generally includes a C-shaped cross-section which substantially conforms to the C-shaped cross-section of the body portion 180 of the first door 26 (FIG. 19). In assembly, the electrical connector 40 is received through an aperture 181 (FIG. 29) disposed on the first door 26 and is slidingly coupled to the mounting surface 20, as further described below. As further shown in FIG. 31, the body portion 312 includes a power plug 316 which is mounted thereto. The power plug 316 is configured to electrically connect with the power port 306 (FIG. 28) of the electronic device 300 to power or charge the electronic device 300, as further described below. The lower portion 314 of the electrical connector 40 defines a mounting portion having an outwardly extending flange 318 with a plurality of tunable ribs 320 disposed on an upper portion thereof, and a central guide member 322 disposed on a lower portion thereof. The lower portion 314 further includes first and second retaining legs 324*a*, 324*b* (FIG. 32) which each include abutment portions 326*a*, 326*b*, respectively.

Figure 32:
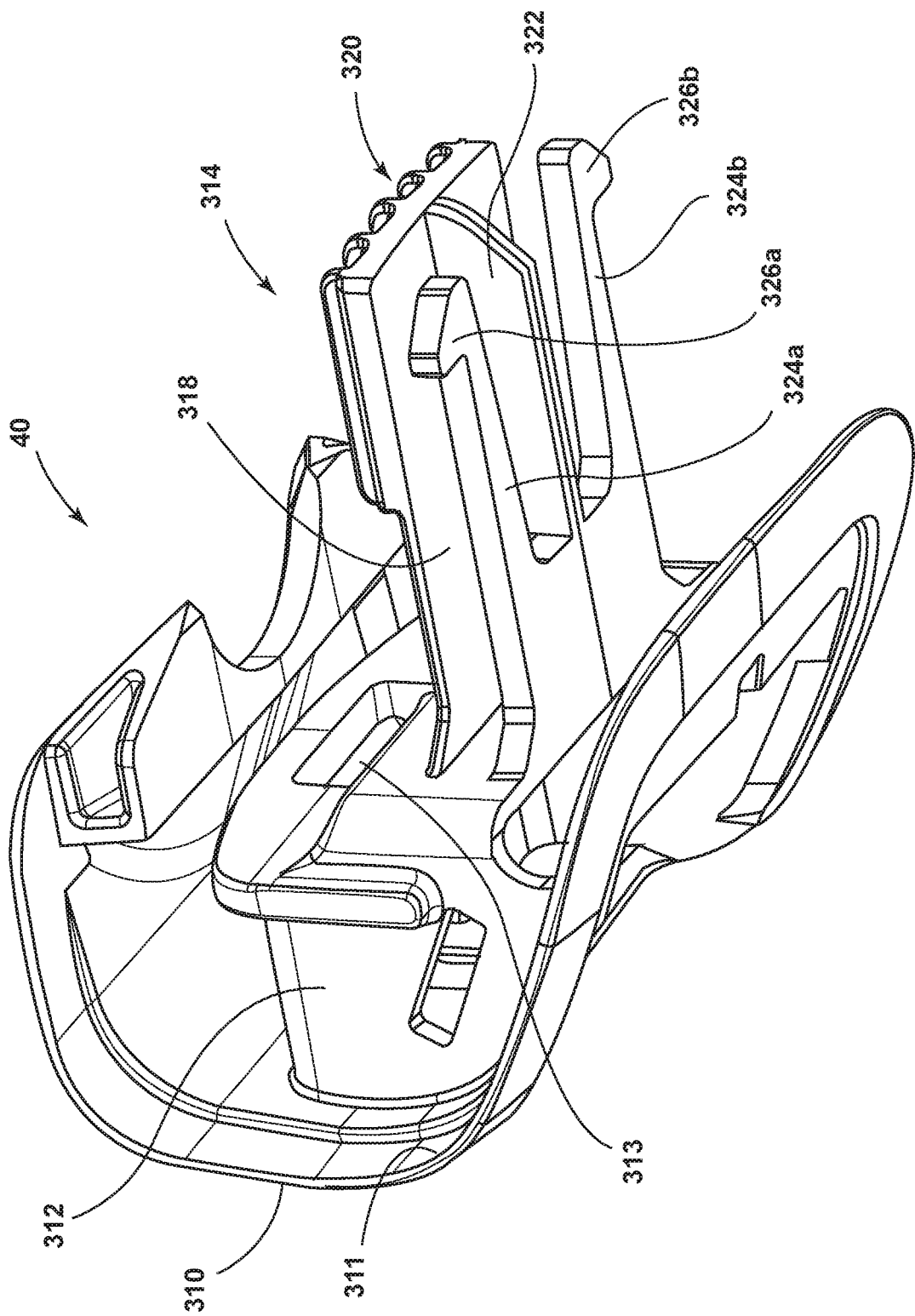
FIG. 32 is a perspective view of the electrical connector of FIG. 31 with the power plug removed.

Referring now to FIG. 32, the electrical connector 40 is shown having the power plug 316 removed to reveal an aperture 313 disposed within the body portion 312 of the electrical connector 40, through which the power plug 316 (FIG. 31) outwardly extends. As shown in FIG. 32, the retaining legs 324*a*, 324*b* outwardly extend below the flange member 318 and are configured to be flexibly resilient retention legs for coupling the electrical connector 40 to the mounting surface 20, as further described below.

Figure 33:
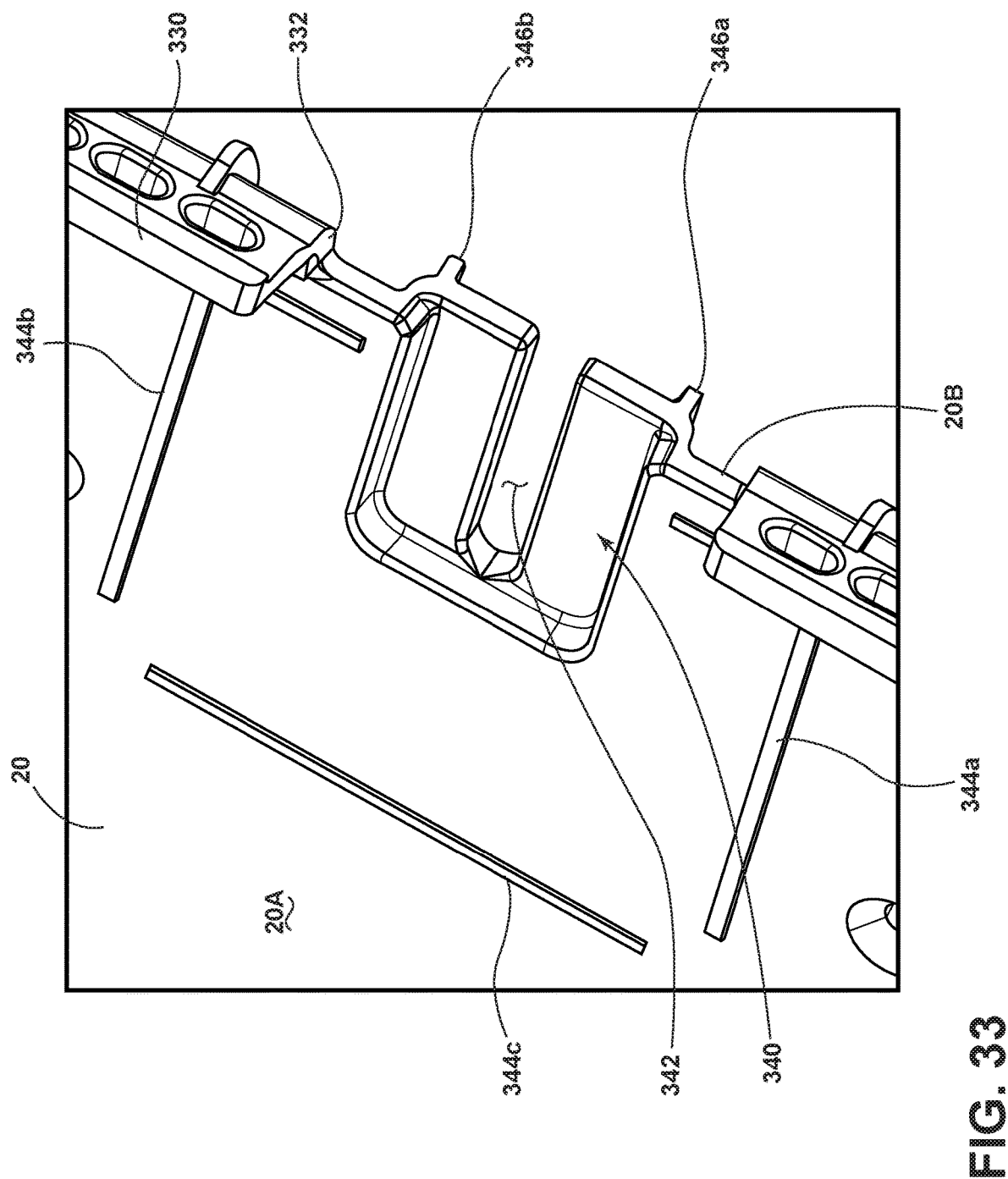
FIG. 33 is a perspective view of an inset slot disposed on the mounting surface.

Referring now to FIG. 33, the front side 20A of the mounting surface 20 is shown having an upwardly extending side wall 330 with a notched-out portion 332. The notched-out portion 332 opens into an inset channel 340 having a centrally located groove 342. Extending outwardly from the front side 20A of the mounting surface 20 are ribs 344*a*-344*c*, which serve as retaining guides for a slipper pad as further described below. The inset channel 340 further includes outwardly extending ribs 346*a*, 346*b* which are configured to retain the electrical connector 40 in a slideably connected arrangement with the mounting surface 20, as further described below.

Figure 34A:
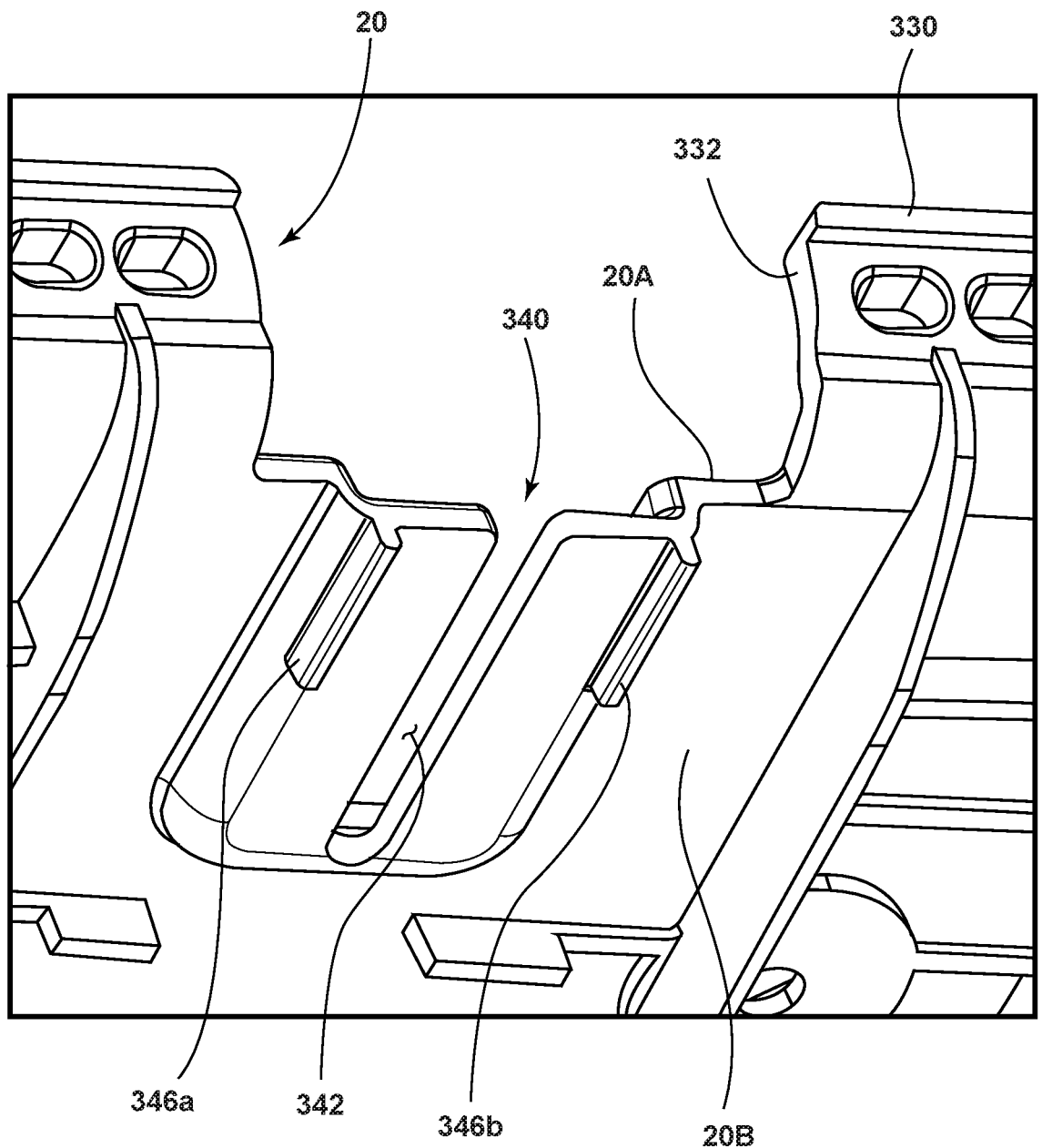
FIG. 34A is a rear perspective view of the inset slot of FIG. 33.
Figure 34B:
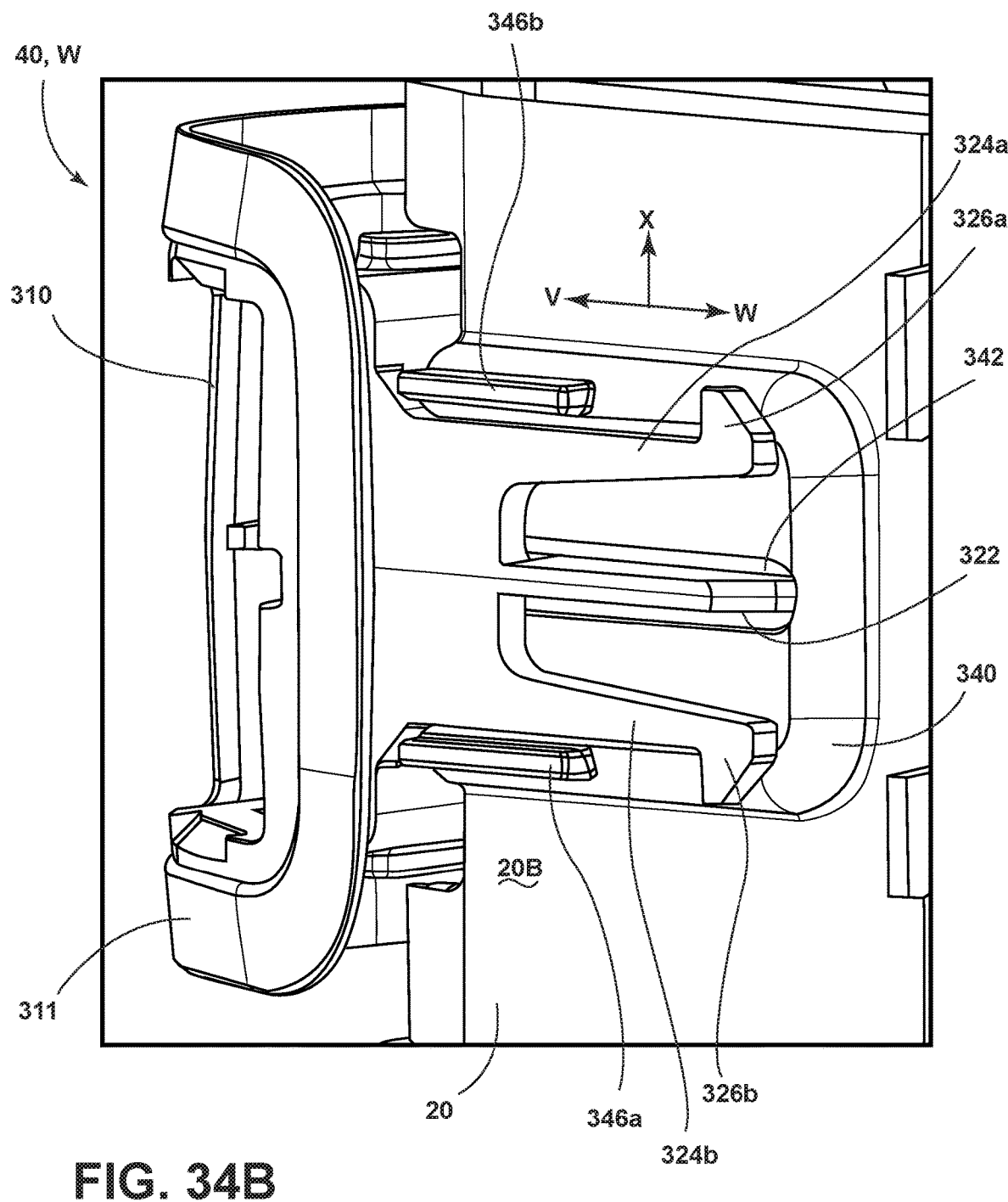
FIG. 34B is a rear perspective view of the inset slot of FIG. 34A having the electrical connector coupled thereto.

Referring now to FIGS. 34A and 34B, the inset slot 340 is shown from the rear side 20B of the mounting surface 20, and with specific reference to FIG. 34B, the electrical connector 40 is shown slideably connected to the inset slot 340. As shown in FIG. 34B, the central guide member 322 is disposed within the central groove 342 of inset channel 340. In this way, the central guide member 322 guides the sliding movement of the electrical connector 40 between the extended position V (FIG. 29) and the connected position W (FIG. 30) along a path as indicated by arrow X. The abutment portions 326*a*, 326*b* of retaining legs 324*a*, 324*b* retain the electrical connector 40 within the inset slot 340 in a slideable manner by their interaction with outwardly extending ribs 346*a*, 346*b* disposed on the rear side 20B of the mounting surface 20. This interaction ensures that the electrical connector 40 will not become fully removed from its connection with the mounting surface 20 when the first door 26 moves to the open position O1 (FIG. 28). In FIG. 34B, the first door 26 has been removed to show the connection between the electrical connector 40 and the mounting surface 20, however, the first door 26 would be disposed between the electrical connector 40 and mounting surface 20 in assembly. In FIG. 34B, the electrical connector 40 is shown in the connected position W in which the shoulder portion 311 of the outer housing 310 would be abutting the body portion 180 of the first door 26 (FIG. 30), and concealing any gaps therebetween.

Figure 35A:
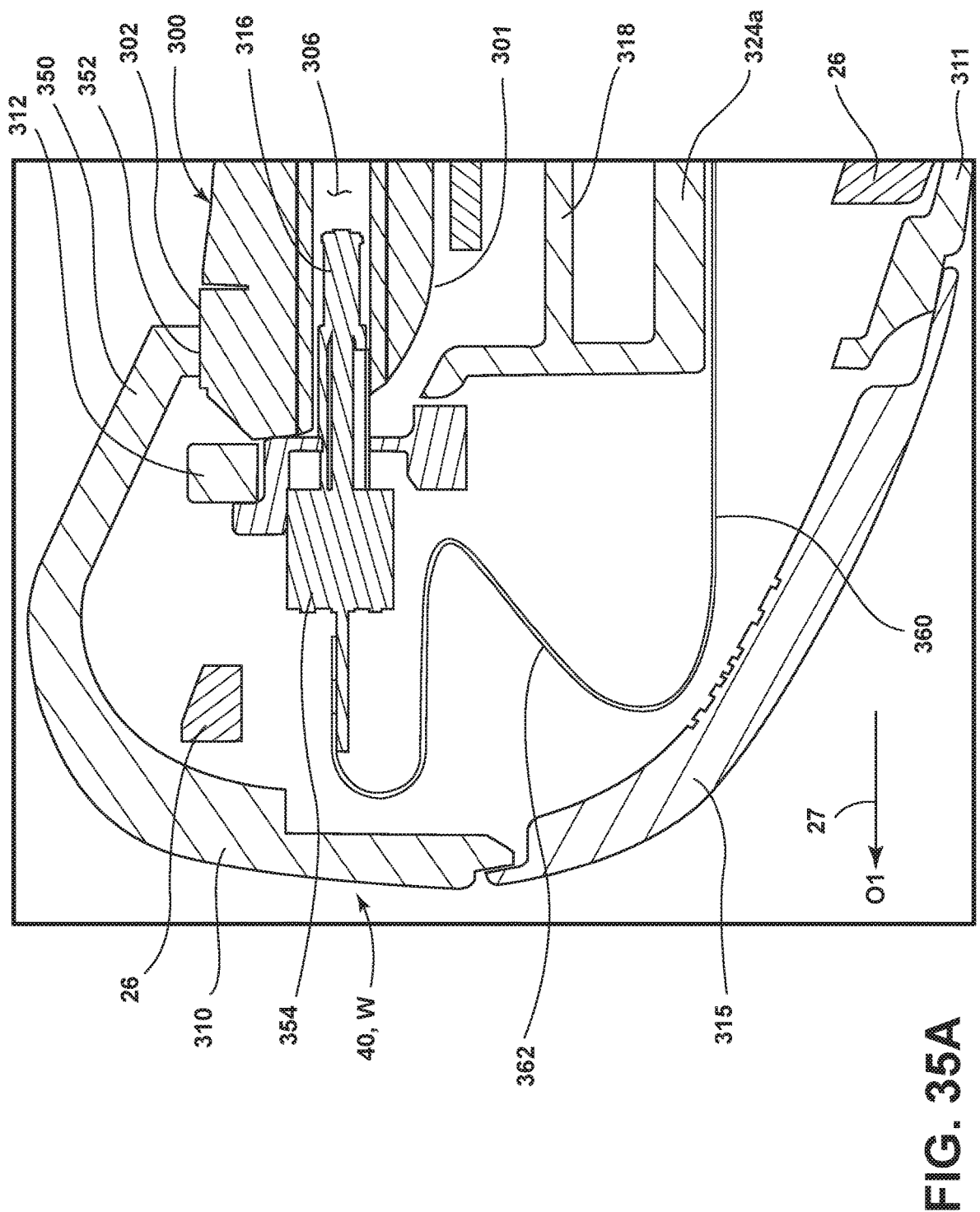
FIG. 35A is a cross-sectional view of the electrical connector having a power plug received in a power port of the electronic device taken at line XXXVA of FIG. 30.
Figure 35B:
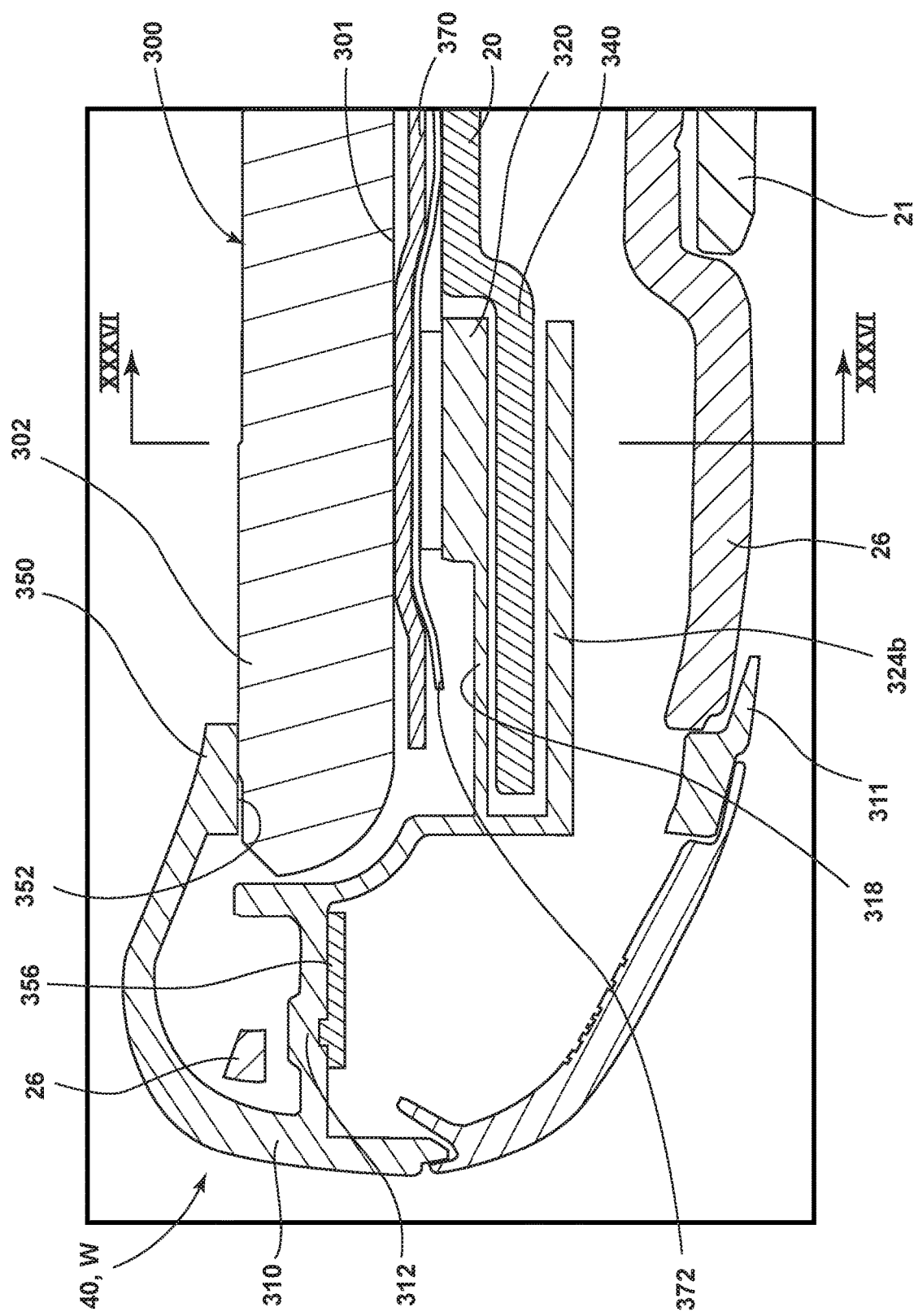
FIG. 35B is a cross-sectional view of the electrical connector coupled to the electronic device taken at line XXXVB of FIG. 30.

Referring now to FIGS. 35A and 35B, the electrical connector 40 is shown in the connected position W. With specific reference to FIG. 35A, the power plug 316 is shown inserted into the power port 306 of the electronic device 300. The outer housing 310 of the electrical connector 340 further includes an upper portion 350 having a lower surface 352 which locates to the outer frame 302 of the electronic device 300 on an upper side thereof. In this way, the upper portion 350 of the outer housing 310 captures and retains the electronic device 300 when the electrical connector 40 is in the connected position W. With the power plug 316 connected to the power port 306, the electronic device 300 is fully powered and ready for use by a user. As noted above, the connection of the power plug 316 and power port 306 may also serve to charge the electronic device 300 or provide data thereto. The power plug 316 is connected to a mounting portion 354 which is further connected to the body portion 312 of the electrical connector 40. As further shown in FIG. 35A, a wire 360 is used to couple to the power plug 316 at the mounting portion 354 for providing power to the electronic device 300 through the power plug 316, wherein the power may be supplied from the power module 57 shown in FIG. 12. The wire 360 includes a slack portion 362 which provides the slack necessary in order for the door 26 to move to the open position O1 along the path as indicated by arrow 27. In this way, the power plug 316 remains connected to the wire 360 when the door 26 moves laterally to the open position O1, and the power plug 316 is unplugged from the power port 306 of the electronic device 300. The wire 360 is contemplated to be a ribbon cable or other like supply line to provide power as well as data to the electronic device 300 through power plug 316 and power port 306. As further shown in FIGS. 35A and 35B, the electrical connector 40 includes an access door 315 which provides access for tooling and other instruments for properly connecting the power plug 316 to the body portion 312 of the electrical connector 40.

Referring now to FIG. 35B, the electrical connector 40 is again shown in cross-section with a wing support 356 coupled to the body portion 312. The wing support 356 is contemplated to hold the mounting portion 354 of the power plug 316 in assembly. As noted above, the upper portion 350 of the electrical connector 40 contacts the outer frame 302 of the electronic device 300 at lower surface 352. Further, on back panel 301 of the electronic device 300, the serially aligned tunable ribs 320 are engaged therewith from an underside of the electronic device 300. Specifically, as shown in FIG. 35B, the electronic device holder 10 includes a layer of padding or flock herein indicated by reference numeral 370. The flocking layer 370 is used to cover the mounting surface 20 to provide a padded layer or liner to the mounting surface 20 and to cushion the electronic device 300 in an anti-vibrational and anti-rattle manner. Disposed below the flocking layer 370, a slipper pad 372 is disposed which is used to engage the tunable ribs 320 of the electrical connector 40 so that the tunable ribs 320 will easily slide towards the connected position W and not be caught up on the padding of the flocking layer 370. Thus, as shown in FIG. 35B, the tunable ribs 320 serve to push the flocking layer 370 and slipper pad 372 upward into contact with the back panel 301 of the electronic device 300. Thus, the tunable ribs 320 and the upper portion 350 of the electrical connector 40 self-position in a vertical manner, as shown in FIG. 35B, to the outer frame 302 and back panel 301 of the electronic device 300 as the electrical connector 40 moves to the connected position W.

Figure 36:
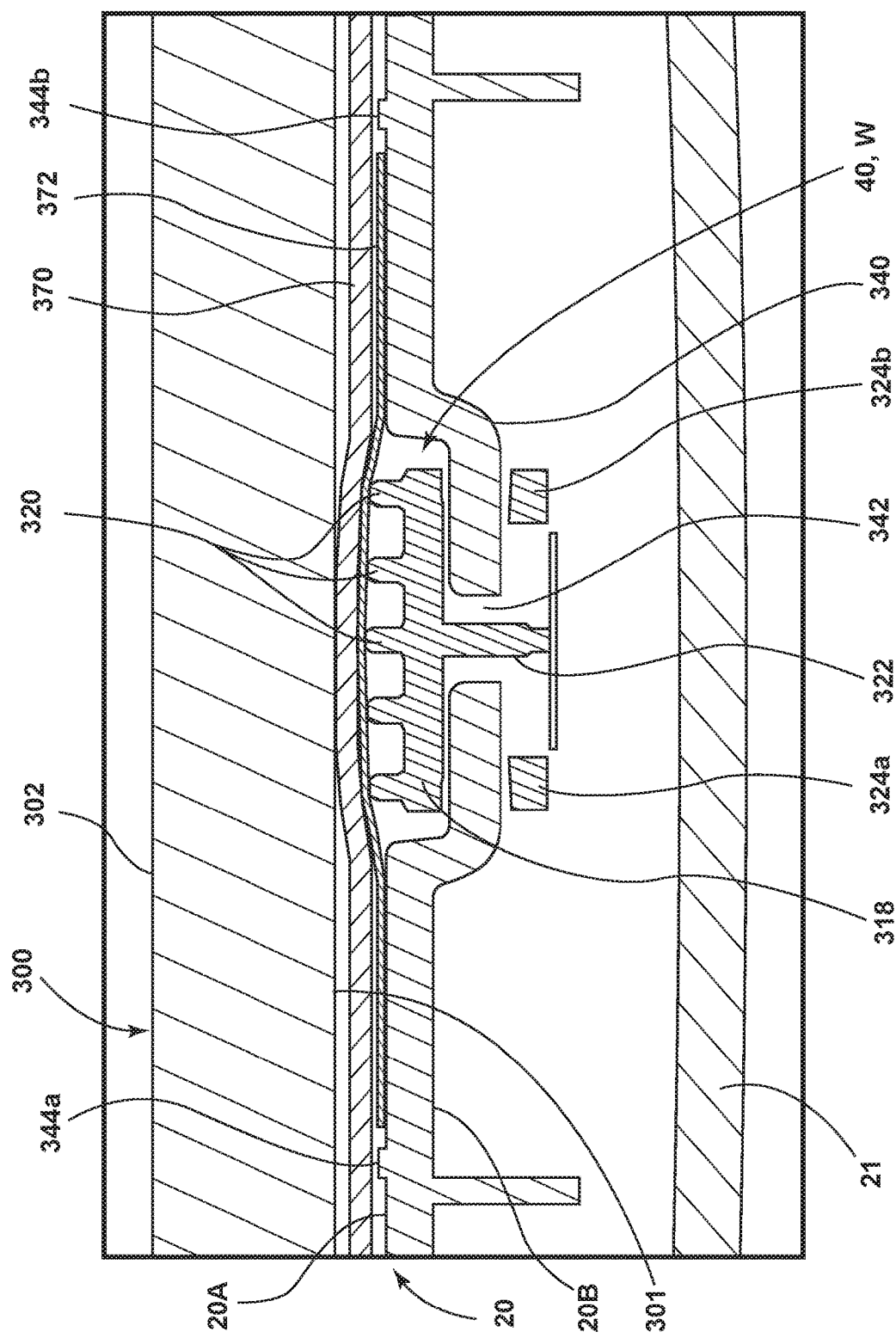
FIG. 36 is a cross-sectional view of the electrical connector as coupled to the electronic device taken along line XXXVI of FIG. 35B.

Referring now to FIG. 36, the serially aligned tunable ribs 320 of the electrical connector 40 are shown acting on the slipper pad 372 and flocking layer 370 against the back panel 301 of the electronic device 300 to positively capture the electronic device 300. As further shown in FIG. 36, the upwardly extending ribs 344a, 344b disposed on the front side 20A of the mounting surface 20 are used to position the slipper pad 372 into its proper position for being received against the serially aligned tunable ribs 320 of the electrical connector 40 and covering the flocking layer 370 from interrupting movement of the tunable ribs 320.

Figure 37:
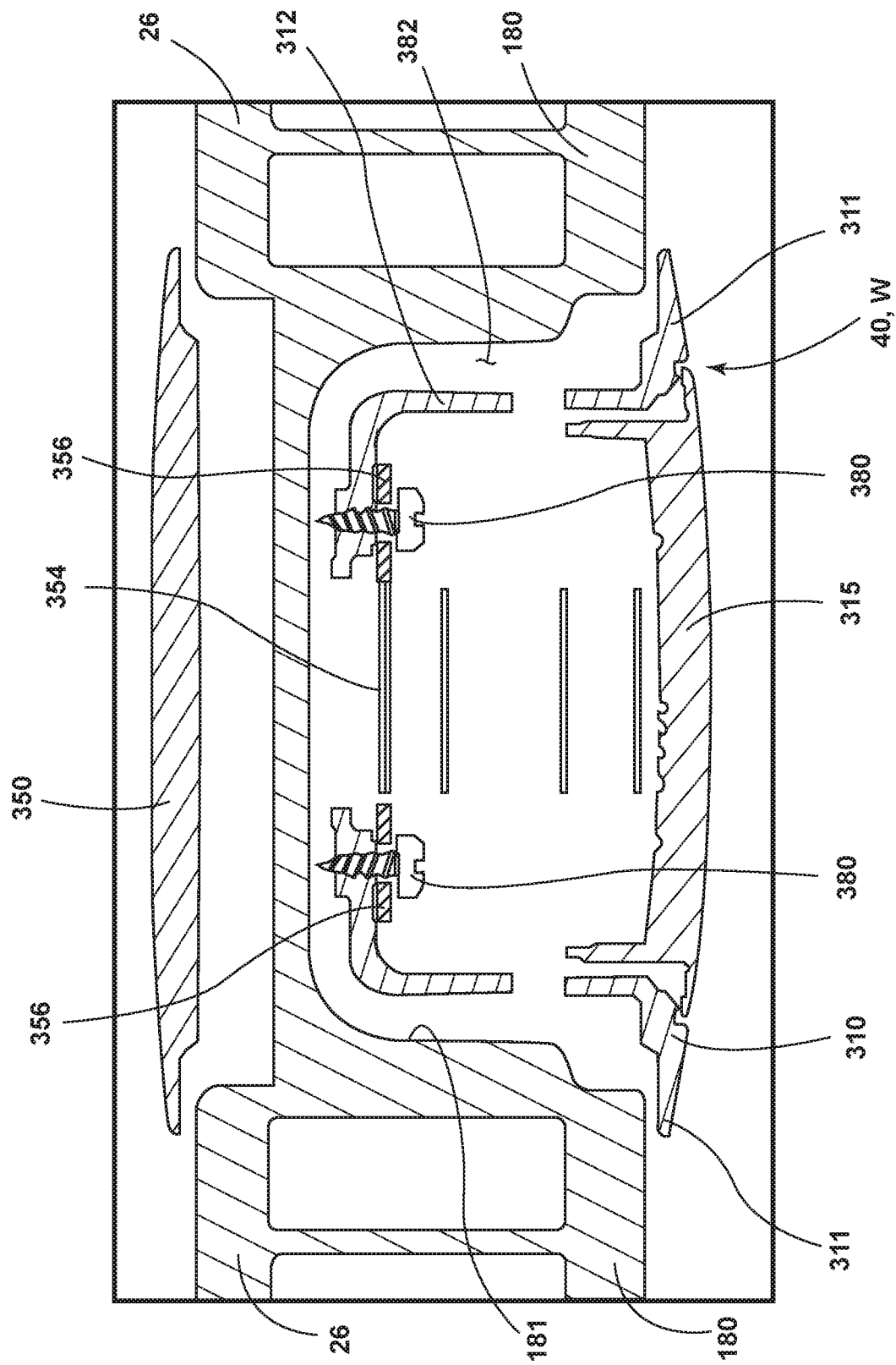
FIG. 37 is a cross-sectional view of the electrical connector as coupled to the first door.

Referring now to FIG. 37, the electrical connector 40 is shown having fasteners 380 connected to the support wings 356 of the mounting portion 354, thereby mounting the power plug 316 (FIG. 31) to the electrical connector 40. As further shown in FIG. 37, the electrical connector 40 is disposed within aperture 181 of the body portion 180 of the first door 26. In the view of FIG. 37, the shoulder portion 311 of the outer housing 310 will abut the body portion 180 of the door 26 when the door moves to the open position O1. Further, in the view of FIG. 37, the electrical connector 40 is shown to have a certain amount of play or float between the aperture 181 and the body portion 312 of the electrical connector 40. This gap, shown at 382, allows for the electrical connector 40 to float within aperture 181 approximately 1.0-2.0 mm, thereby allowing a user to properly position the electrical connector 40 in a manner such that the power plug 316 aligns with and properly connects to the power port 306. Without this gap 382, the electrical connector 40 would be a substantially rigid electrical connector that would not have the room to maneuver in order to ensure proper electrical connection to the electronic device 300.

Figure 38:
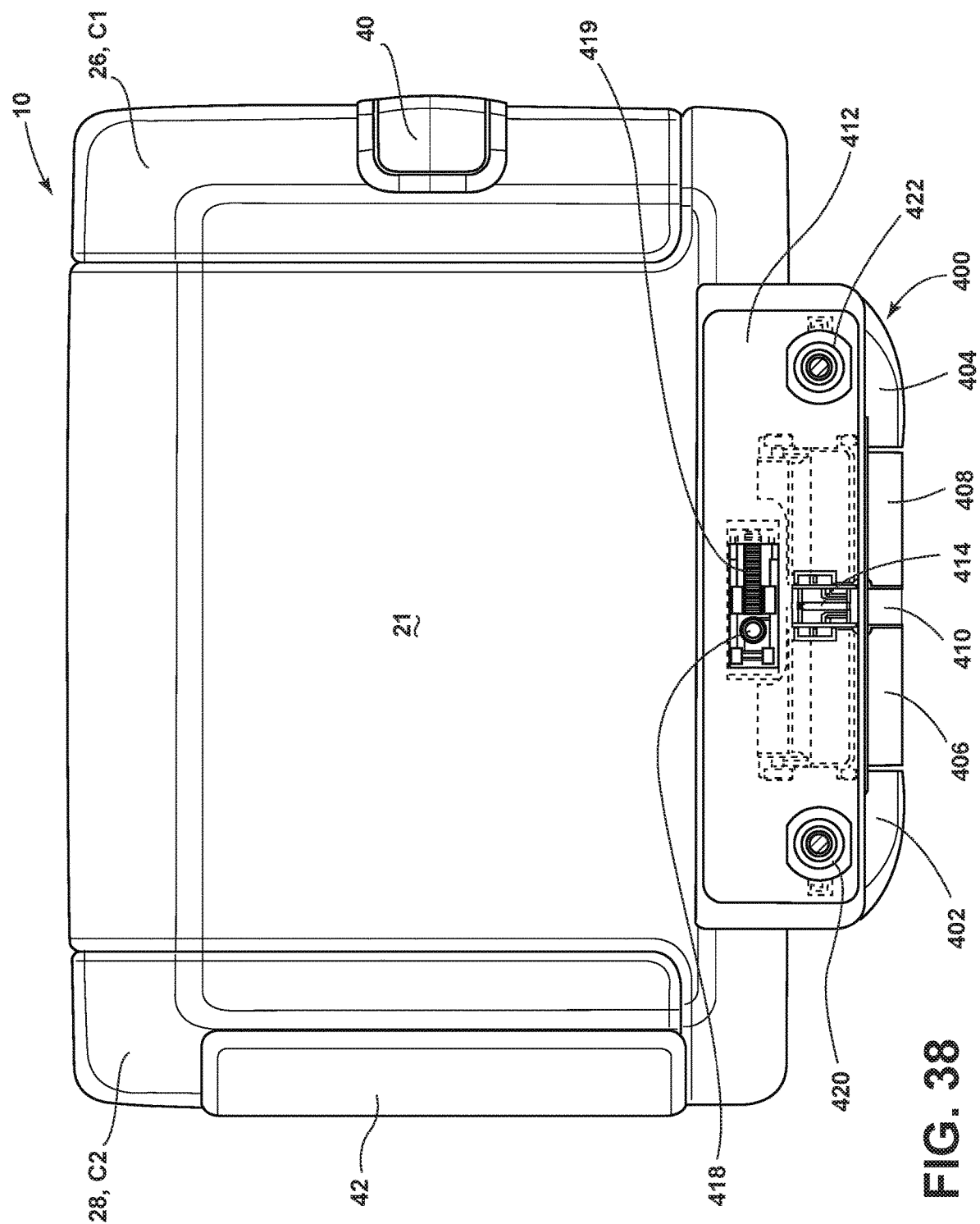
FIG. 38 is a rear elevational view of the electronic device holder.
Figure 39:
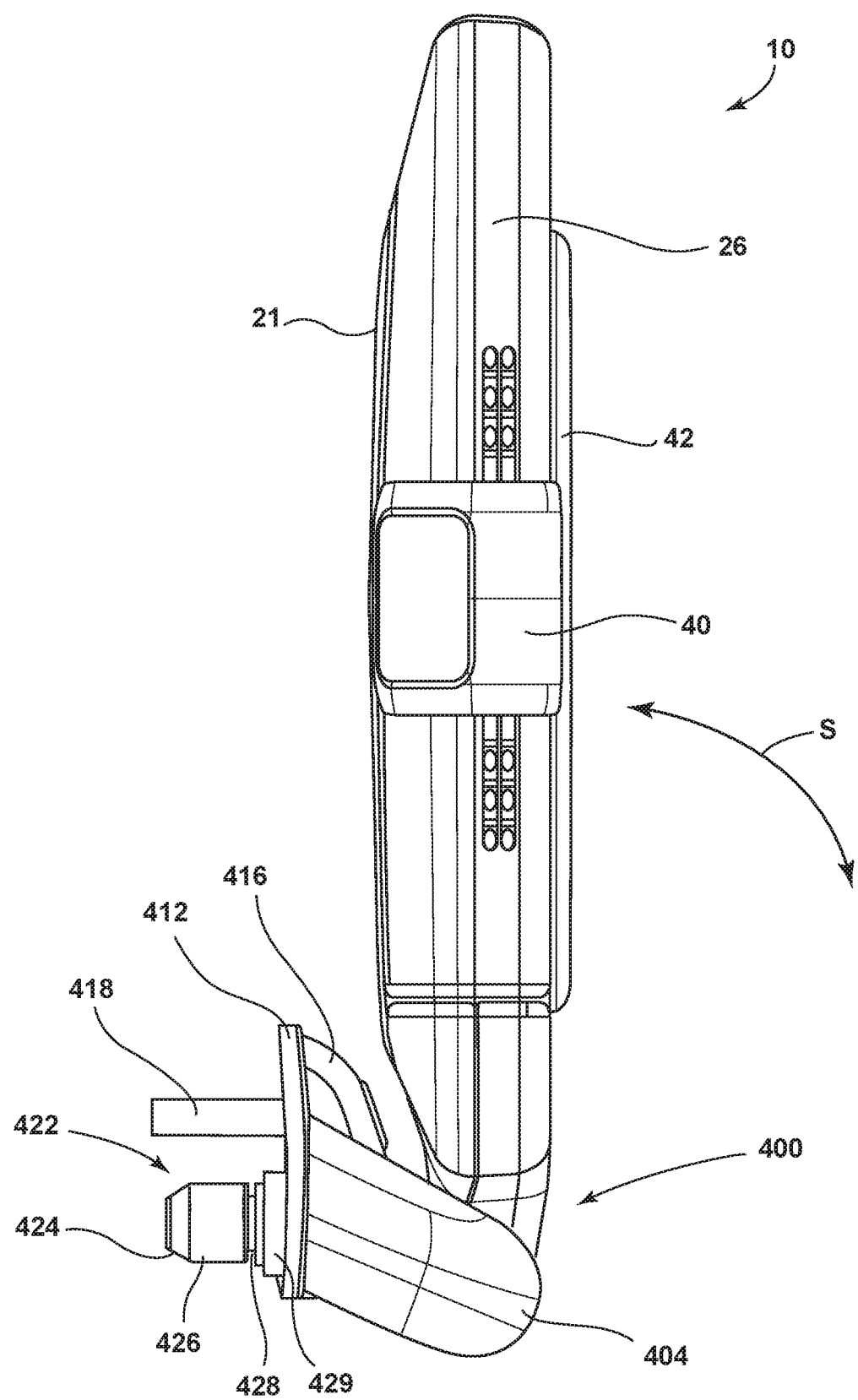
FIG. 39 is a side elevational view of the electronic device holder of FIG. 38.

Referring now to FIG. 38, the electronic device holder 10 is shown from a rear view as disconnected from the seatback 16 (FIG. 1). The doors 26, 28 are in the closed positions C1, C2 relative to the rear housing 21. The electronic device holder 10 includes a mounting portion 400 which hingedly connects the electronic device holder 10 to the seatback 16. The mounting portion 400 includes first and second end caps 402, 404 disposed on opposite sides of hinge covers 406, 408. A central raceway 410 is also disposed on the mounting portion 400. The hinge covers 406, 408 cover friction hinge assemblies for pivoting the electronic device holder 10, as further described below. The mounting portion further includes an accessory bezel 412, through which a male power plug 414 is accessible. Extending outwardly from the accessory bezel 412 is a post member 418 which is part of a release button 416, which is best shown in FIG. 39. The post member 418 is biased towards a locked position by biasing mechanism 419, which is shown in FIG. 38 in the form of a coil spring. In use, the post member 418 laterally moves the locking plate 90b (FIG. 45) between locked and unlocked positions, as further described below. First and second cone nuts 420, 422 also extend outwardly from the accessory bezel 412 and are used to couple and support the electronic device holder 10 through the access apertures 114a, 114b and receiving apertures 80a, 80b (FIG. 13), to thereby mount the electronic device holder 10 to the seatback 16 (FIG. 1), as further described below.

Referring now to FIG. 39, the electronic device holder 10 is shown from a side profile, wherein the post member 418 and cone nut 422 are shown extending outwardly from the accessory bezel 412. The first and second cone nuts 420, 422 (FIG. 38) are contemplated to be steel cone nuts which have a common configuration and are exemplified in FIG. 39 by the description of second cone nut 422. As shown in FIG. 39, cone nut 422 includes an outermost angled portion 424 and a cylindrical body portion 426. Adjacent to the accessory bezel 412, a channel 428 is disposed on cone nut 422 which is configured to retain a portion of the locking plate 90b (FIG. 45) therein when the electronic device holder 10 is mounted and locked in place on the seatback 16, as further described below. The cone nut 422 further includes a collar portion 429 which abuts the mounting bracket 56 in assembly as part of the all-steel load path through the device. As noted above, the mounting portion 400 of the electronic device holder 10 is a hinged mounting portion which allows the electronic device holder 10 to pivot along a path as indicated by arrow S. Therefore, the electronic device holder 10 is configured to move from an upright position, shown in FIG. 1, to a downward storage position, shown in FIG. 40. As used with the electronic device holder 10, the first and second cone nuts 420, 422 define mounting members for the electronic device holder 10. Other configurations for such mounting members are also contemplated.

Figure 40:
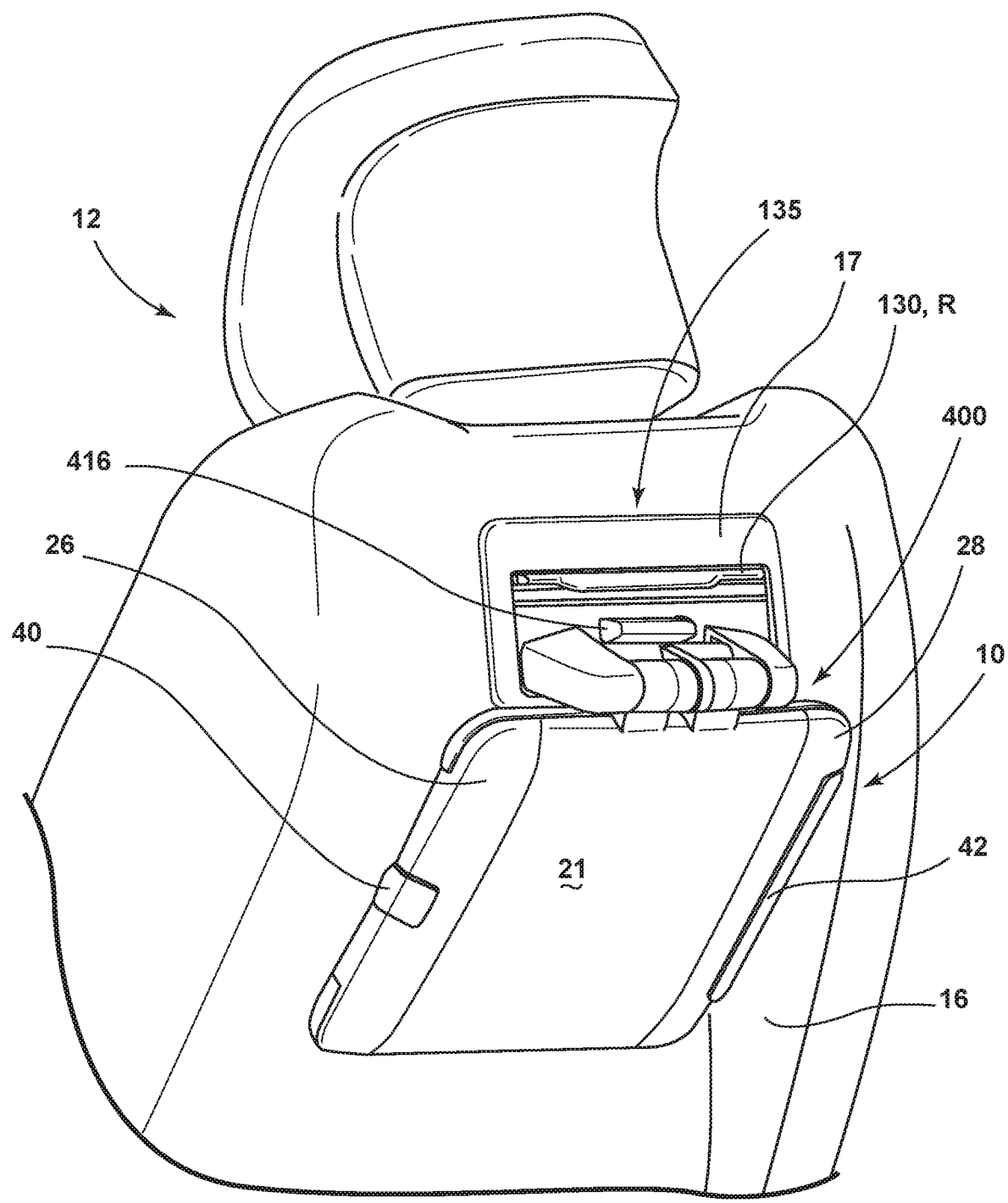
FIG. 40 is a rear perspective view of a vehicle seat having an electronic device holder mounted thereto in a downward storage position.

Referring now to FIG. 40, the electronic device holder 10 is shown in the downward storage position, wherein the electronic device holder 10 shields and protects an electronic device stored therein. The mounting portion 400 includes a pair of friction hinges, further described below, which ensure that the electronic device holder 10 will remain in the downward storage position once pivoted thereto, such that the electronic device holder 10 will not randomly rotate into the leg area of a rear seated passenger. Thus, the electronic device holder 10 is designed to be self-retaining in the stowed position shown in FIG. 40, wherein the electronic device holder 10 is nestled into the seatback 16. The electronic device holder 10 can be stowed with or without an electronic device, such as tablet 300, retained therein and the tablet 300, if captured within the electronic device holder 10, can continue to be charged in the folded or stowed position. As further shown in FIG. 40, the seatback dock 135 includes an outer seat bezel 17 in which the retractable door 130 is disposed. The retractable door 130 is shown in the retracted position R, such that the electronic device holder 10 can be mounted to the seatback 16 at mounting portion 400.

Figure 41:
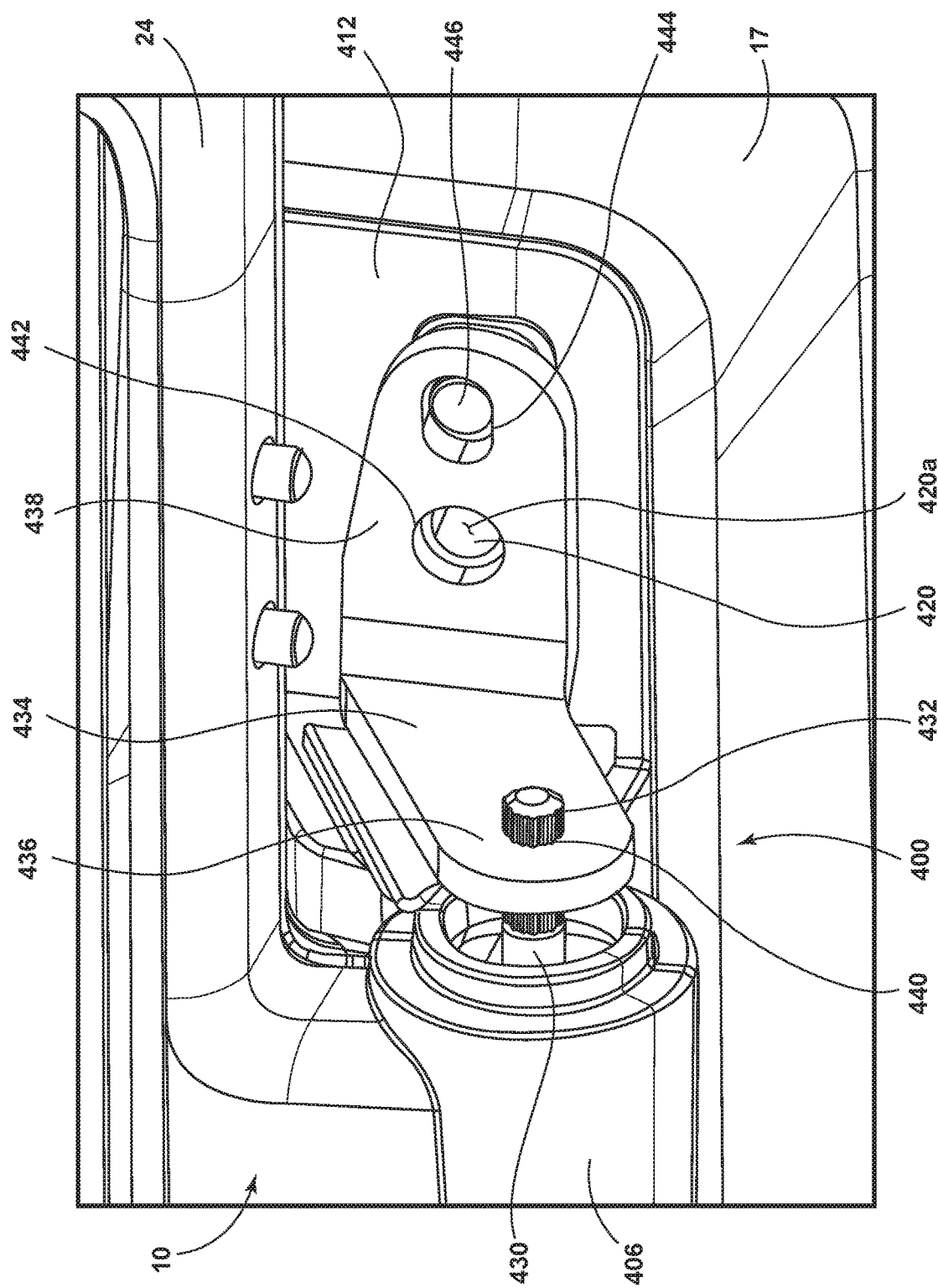
FIG. 41 is a perspective view of a mounting portion of the electronic device holder.

Referring now to FIG. 41, the mounting portion 400 includes a friction hinge 430 having a grooved hinge shaft 432 extending outwardly therefrom. As noted above, the hinge 430 is contemplated to be one of a pair of friction hinges disposed in the mounting portion 400, which are each separately covered by hinged covers 406, 408. The grooved hinge shaft 432 is shown coupled to an L-shaped bracket 434 having legs 436, 438. Specifically, the grooved hinge shaft 432 is received through aperture 440 of leg 436 of the L-shaped bracket 434, wherein aperture 440 includes a cross-section that compliments the configuration of grooved hinge shaft 432. The grooved hinge shaft 432 is machine pressed into aperture 440 to ensure that the grooved hinge shaft 432 is closely and securely received within aperture 440. The L-shaped bracket 434 and hinge shaft 432 are contemplated to be ridged steel members as part of a steel load path disposed through the electronic device holder 10. Leg 438 of the L-shaped bracket 434 includes a fastener aperture 442 and a locating aperture 444 disposed therethrough. The accessory bezel 412 includes a locating feature 446 which is received in locating aperture 444 of the L-shaped bracket 434. The fastener aperture 442 aligns with a hollow interior portion 420a of cone nut 420. In this way, the cone nut 420 couples to the L-shaped bracket 434 using a fastener, such as an M6 screw, as further described below with reference to FIG. 44B. Similarly, cone nut 422 couples to an L-shaped bracket which is coupled to another friction hinge disposed on an opposite side of the electronic device holder 10.

Figure 42:
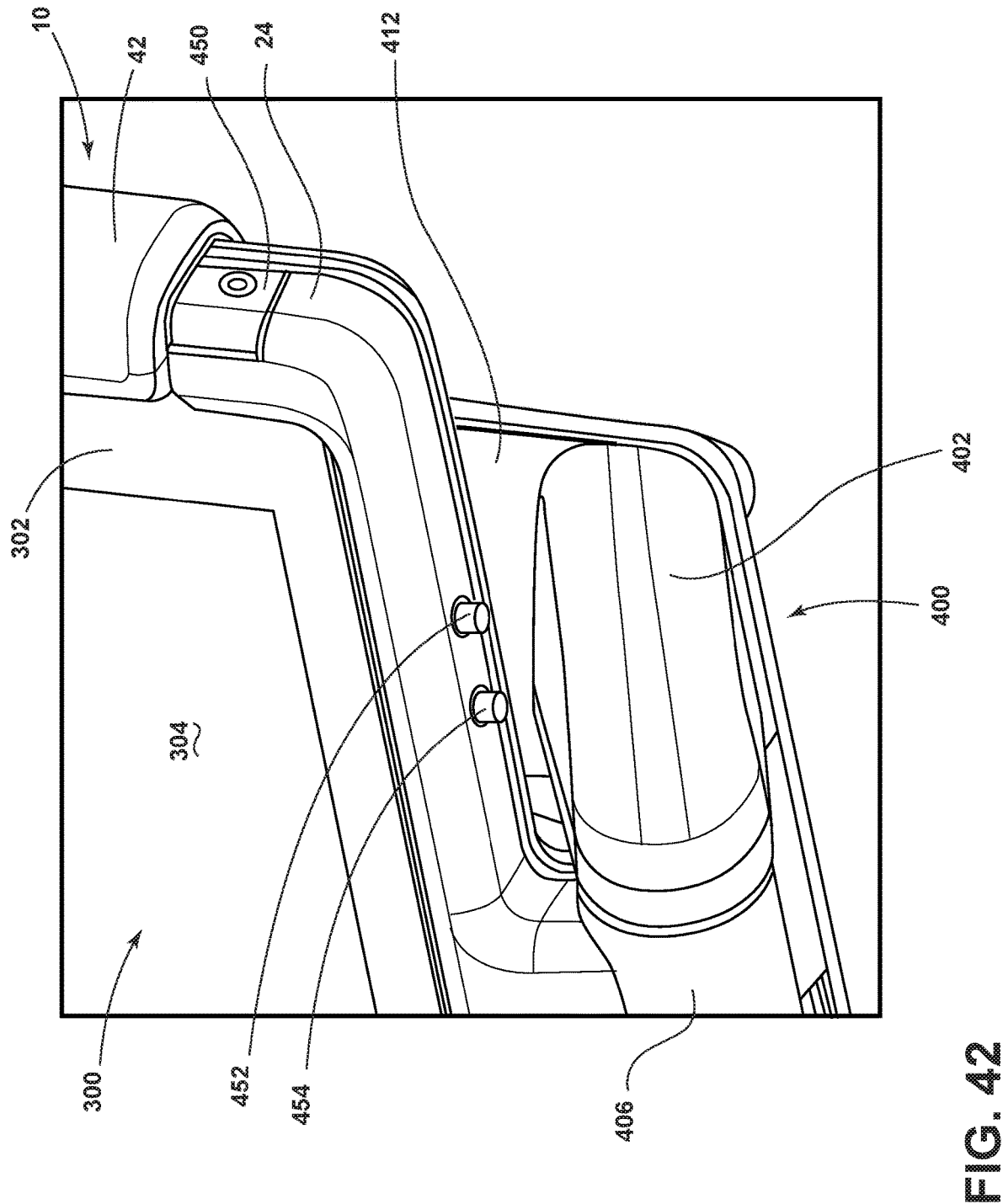
FIG. 42 is a perspective view of the mounting portion of the electronic device holder.

Referring now to FIG. 42, end cap 402 is shown in place, thereby covering the L-shaped bracket 434 as connected to friction hinge 430, as described above and shown in FIG. 41. As further noted in FIG. 42, the lower frame member 24 of the electronic device holder 10 includes a power button 450, as well as volume control buttons 452, 454. In assembly, it is contemplated that the power button 450 aligns with a power button of the electronic device 300, while the volume control buttons 452, 454 align with volume control buttons disposed on the electronic device 300. In this way, the electronic device holder 10 is configured to control the externally accessible control features of the electronic device 300 when an electronic device 300 is secured within the electronic device holder 10. The buttons 450, 452, 454 are contemplated to be made of a resilient rubber material having a spring return feature as coupled to the lower frame member 24 without any moving parts.

Referring now to FIGS. 43A and 43B, another embodiment of a locking plate 90b is shown. The locking plate 90b, similar to locking plate 90a shown in FIGS. 10 and 11, mounts to the mounting wall 79 of the mounting bracket 56 for lateral movement thereon. The locking plate 90b includes a generally planar body portion 460, through which locking apertures 97a, 97b and slots 94a, 94b are formed. A centrally disposed aperture 462 is also disposed therethrough and is configured to align with central aperture 115 of the trim retention cover 54 in assembly. A tang member 464 is disposed within central aperture 462 and is configured to connect with the post member 418 for laterally moving the locking plate 90b as mounted to the mounting bracket 56. The locking apertures 97a, 97b are configured to have an angled portion 97c and a rounded portion 97d. The angled portion 97c of each locking apertures 97a, 97b is configured to move the locking plate 90b as the steel cone nuts 420, 422 are inserted therein. Specifically, as the cone nuts 420, 422 are received in locking apertures 97a, 97b, the outermost angled portions 424 (FIG. 39) of the cone nuts 420, 422 will act on the angled portions 97c of locking apertures 97a, 97b. Thus, as shown in FIG. 43A, the locking plate 90b would slide sideways on the mounting wall 79 of the mounting bracket 56 towards the right along a path as indicated by arrow Q to an unlocked position as the cone nuts 420, 422 enter the locking apertures 97a, 97b in a wedged or biasing manner. The angled portions 97c of the locking apertures 97a, 97b would then move along the cylindrical body portion 426 (FIG. 39) of the cone nuts 420, 422 until the cone nuts 420, 422 are fully inserted and the locking plate 90b snaps into a locked position within the grooves 428 of the cone nuts 420, 422, thereby automatically locking the electronic device holder 10 to the seatback dock 135, and providing the user with tactile feedback indicating that the apparatus is received and locked in place. As noted above, the locking plate 90b is biased by biasing member 100 towards the locked position, such that when the cone nuts 420, 422 are fully inserted into the locking apertures 97a, 97b, the angled portions 97c of the locking apertures 97a, 97b will fully seat within the grooves 428 of the cone nuts 420, 422, thereby locking the mounting portion 400 of the electronic device holder 10 in place on the mounting bracket 56. This locked engagement is best shown with reference to FIGS. 44A, 44B and 45. As best shown in FIG. 43B, the mounting plate 90b further includes bracket portions 466, 468 disposed on opposite sides thereof for use in retaining a spring release feature, as further described below. The locking plate 90b further includes a central bracket portion 470 disposed on a top portion thereof for coupling to the spring loaded ejection feature, as further described below.

Figure 44A:
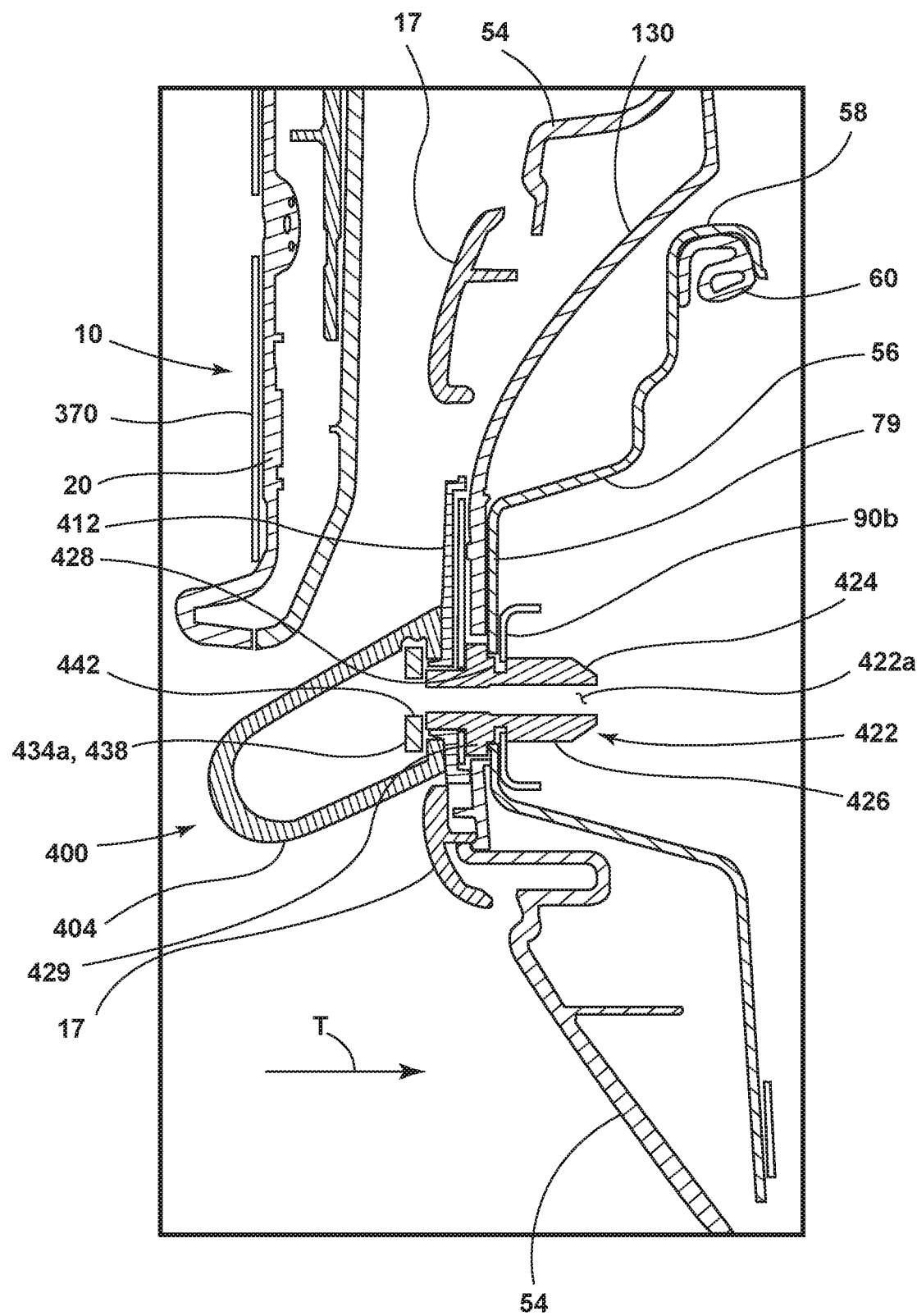
FIG. 44A is a cross-sectional view of the electronic device holder mounted to a mounting bracket.
Figure 44B:
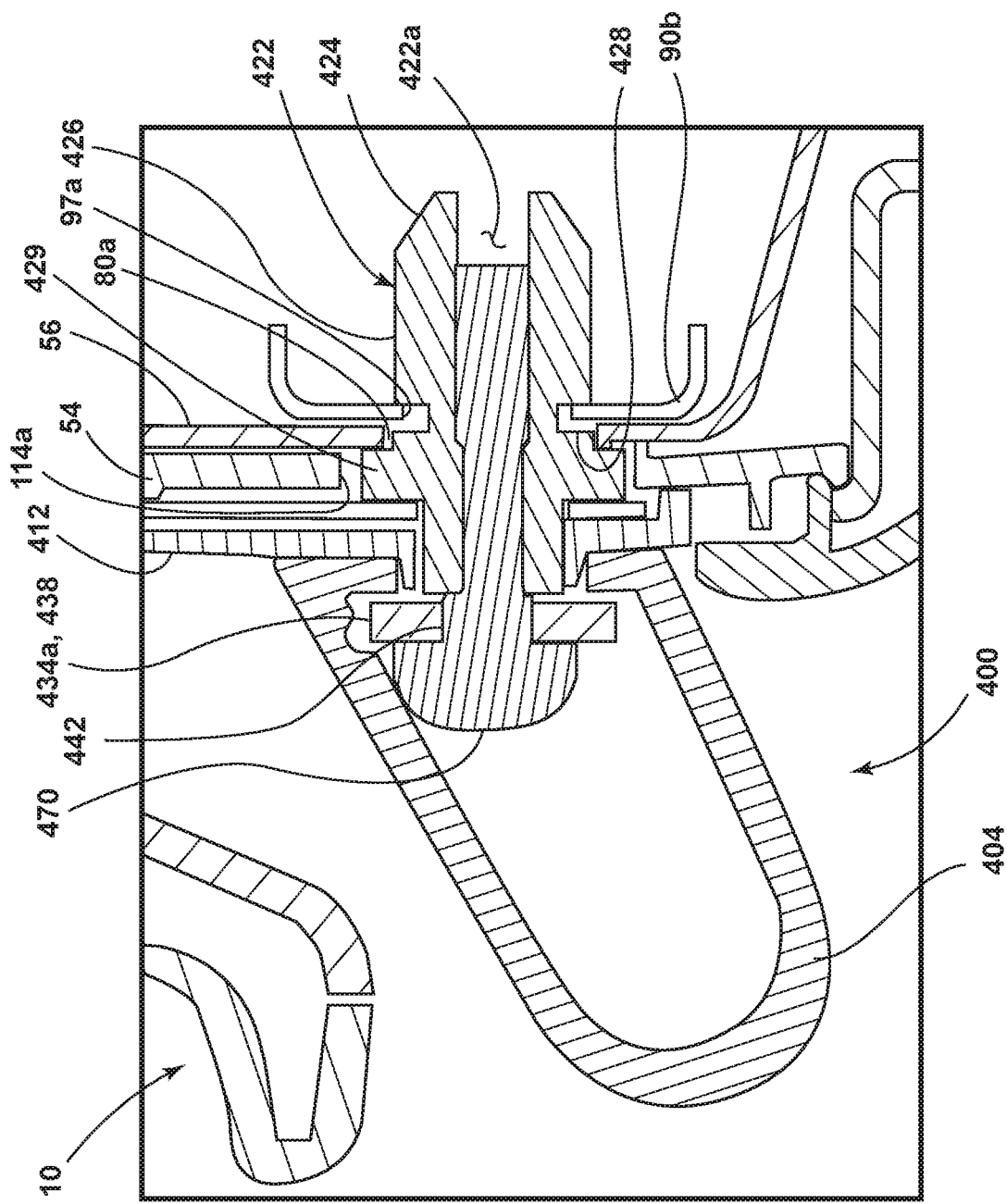
FIG. 44B is a cross-sectional view of the electronic device holder mounted to the mounting bracket.

Referring now to FIGS. 44A and 44B, the electronic device holder 10 is shown installed on the mounting bracket 56, wherein the cone nuts 420, 422 (exemplified by cone nut 422), have been inserted into the relative locking apertures, such that the cone nut 422 is locked into place by locking plate 90b being received in a locked configuration within grooves 428 of the cone nuts 420, 422. Thus, in FIGS. 44A and 44B, the angled portion 424 of the cone nut 422 has been inserted through locking aperture 97a of the locking plate 90b, such that the angled portion 424 of the cone nut 422 has acted on the angled portion 97c of locking aperture 97a. This wedging interaction forces has moved the locking plate 90b to an unlocked position on mounting wall 79 of the mounting bracket 56. As the cone nut 422 is further inserted in a direction as indicated by arrow T, the locking plate 90b slides along the cylindrical body portion 426 of the cone nut 422 until the locking plate 90b reaches the groove 428 of the cone nut 422. When the groove 428 and the locking plate 90b are aligned with one another, the locking plate 90b will automatically snap into the locked configuration, wherein the angled portion 97c of locking aperture 97a (FIG. 43A) is fully seated within the groove 428, thereby locking the mounting portion 400 of the electronic device holder 10 in place. As further shown in FIG. 44B, a fastener 470, in the form of an M6 screw, is shown coupling the steel cone nut 422 to a steel L-shaped bracket 434a, a reciprocal L-shaped bracket to L-shaped bracket 434 shown in FIG. 41 at aperture 442, thereby providing an all-steel connection between the mounting bracket 56 and the electronic device holder 10.

Figure 45:
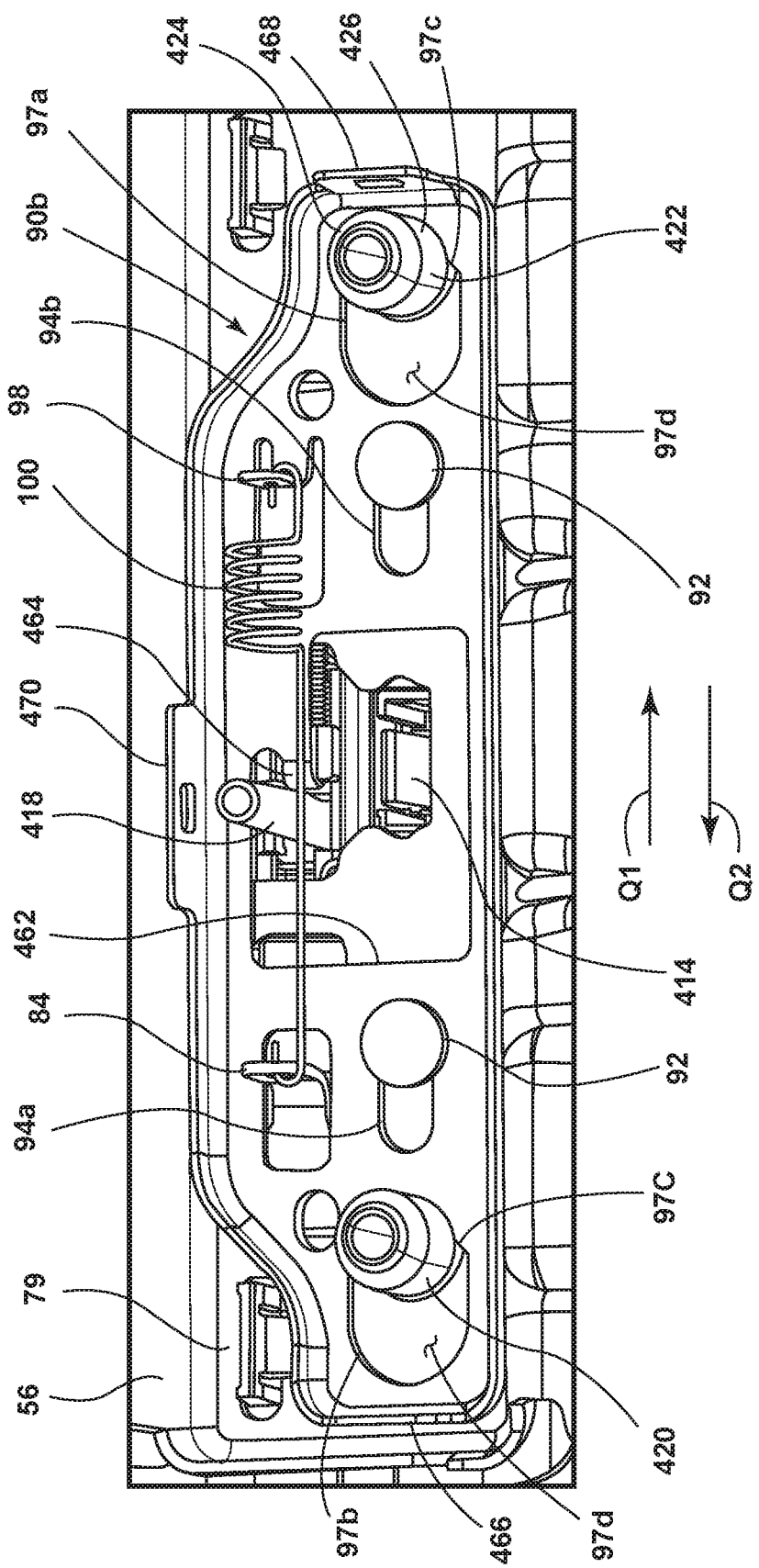
FIG. 45 is a perspective view of the locking plate of FIG. 43A as mounted to the mounting bracket with the electronic device holder further mounted thereto.
Figure 46:
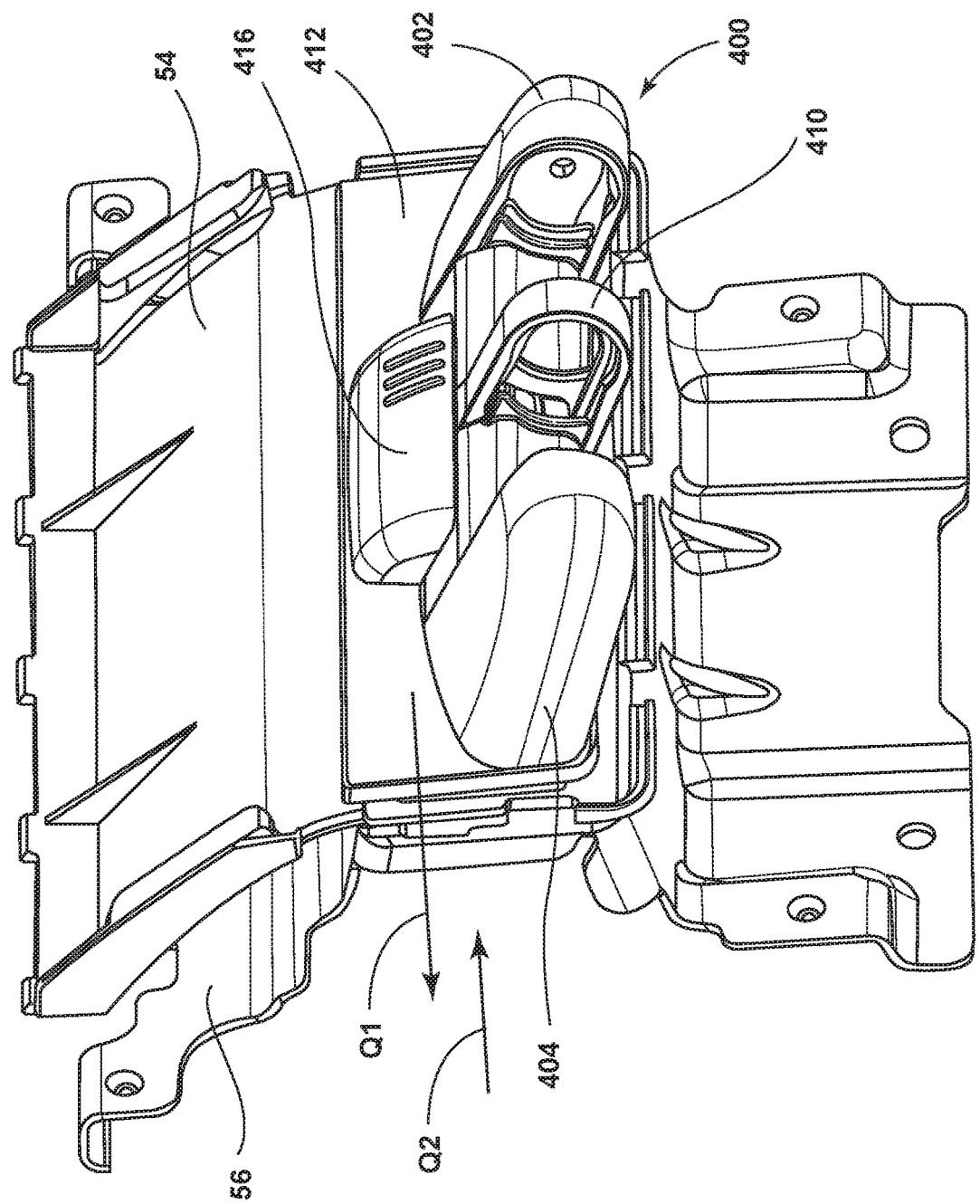
FIG. 46 is a rear perspective view of the mounting portion of the electronic device holder as mounted to the mounting bracket.

Referring now to FIG. 45, the electronic device holder 10 has been mounted to the mounting bracket 56, such that the first and second cone nuts 420, 422 are received in locking apertures 97b, 97a, respectively, with the angled portions 97c fully received in a locked engagement with grooves 428 of the cone nuts 420, 422. Thus, when inserting the first and second cone nuts 420, 422 into the locking apertures 97a, 97b, the outermost angled portions 424 of the cone nuts 420, 422 will urge the locking plate 90b sideways as indicated by arrow Q1. In this way, the cylindrical body portions 426 of the cone nuts 420, 422 will be generally positioned near the rounded portions 97d of the locking apertures 97a, 97b. When the angled portions 97c of the locking apertures 97a, 97b aligns with the groove 428 (FIG. 44B) of the first and second cone nuts 420, 422, the locking plate 90b will snap into a locked engagement in a direction as indicated by arrow Q2 as biased by the biasing mechanism 100 as coupled to outwardly extending tab 84 disposed on mounting wall 79 of the mounting bracket 56. When a user wishes to release the locking plate 90b to remove the electronic device holder 10 from the mounting bracket 56, the user will engage release button 416, as best shown in FIG. 46, and manually move the release button 416 in a direction as indicated by arrow Q1, such that the post member 418, shown in FIG. 45, acts on tang 464 to move the locking plate 90b laterally along mounting wall 79 of the mounting bracket 56 to the unlocked position. The movement of the release button 416 in the direction as indicated by arrow Q1 moves the locking plate 90b, such that the first and second cone nuts 420, 422 are generally disposed within the rounded portions 97d of the locking apertures 97a, 97b. In this way, the locking plate 90b is in an unlocked condition and free from the grooves 428 of the first and second cone nuts 420, 422, such that the user can now easily remove the mounting portion 400 from its locked connection with the mounting bracket 56. When the used has disconnected the mounting portion 400, the user will release button 416 which will automatically move in the direction indicated by arrow Q2 as biased by biasing member 419 (FIG. 38).

Figure 47:
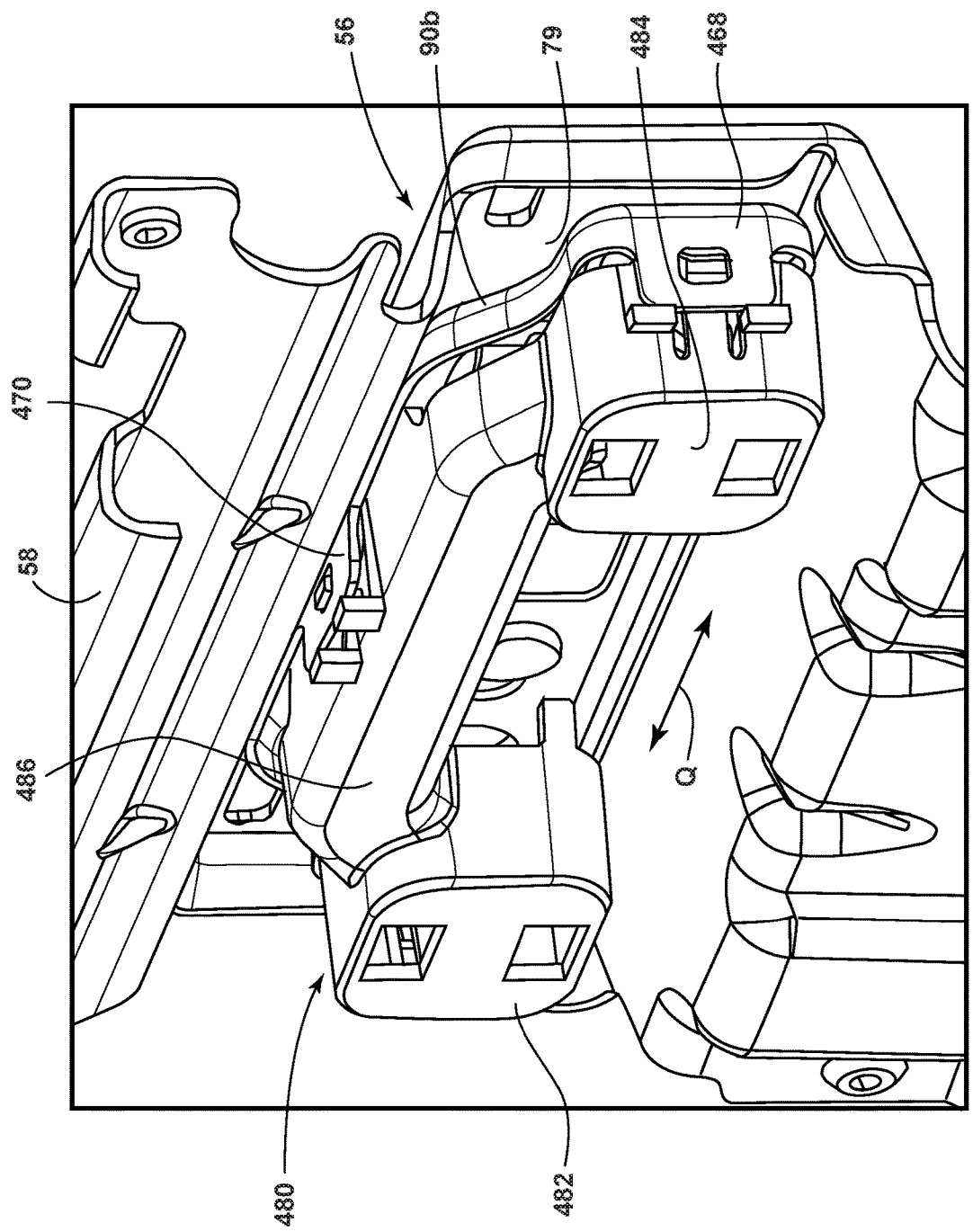
FIG. 47 is a rear perspective view of a button cover mounted to the locking plate as mounted to the mounting bracket.

Referring now to FIG. 47, a button cover 480 is shown coupled to the locking plate 90b at brackets 466, 468 and 470. The button cover 480 includes first and second housing portions 482, 484 which are interconnected by bridge portion 486. The housing portions 482, 484 are configured to include a button and biasing mechanism for providing a spring release feature for help in ejecting the mounting portion 400 from the mounted position with the vehicle seat 12, as further described below.

Figure 48:
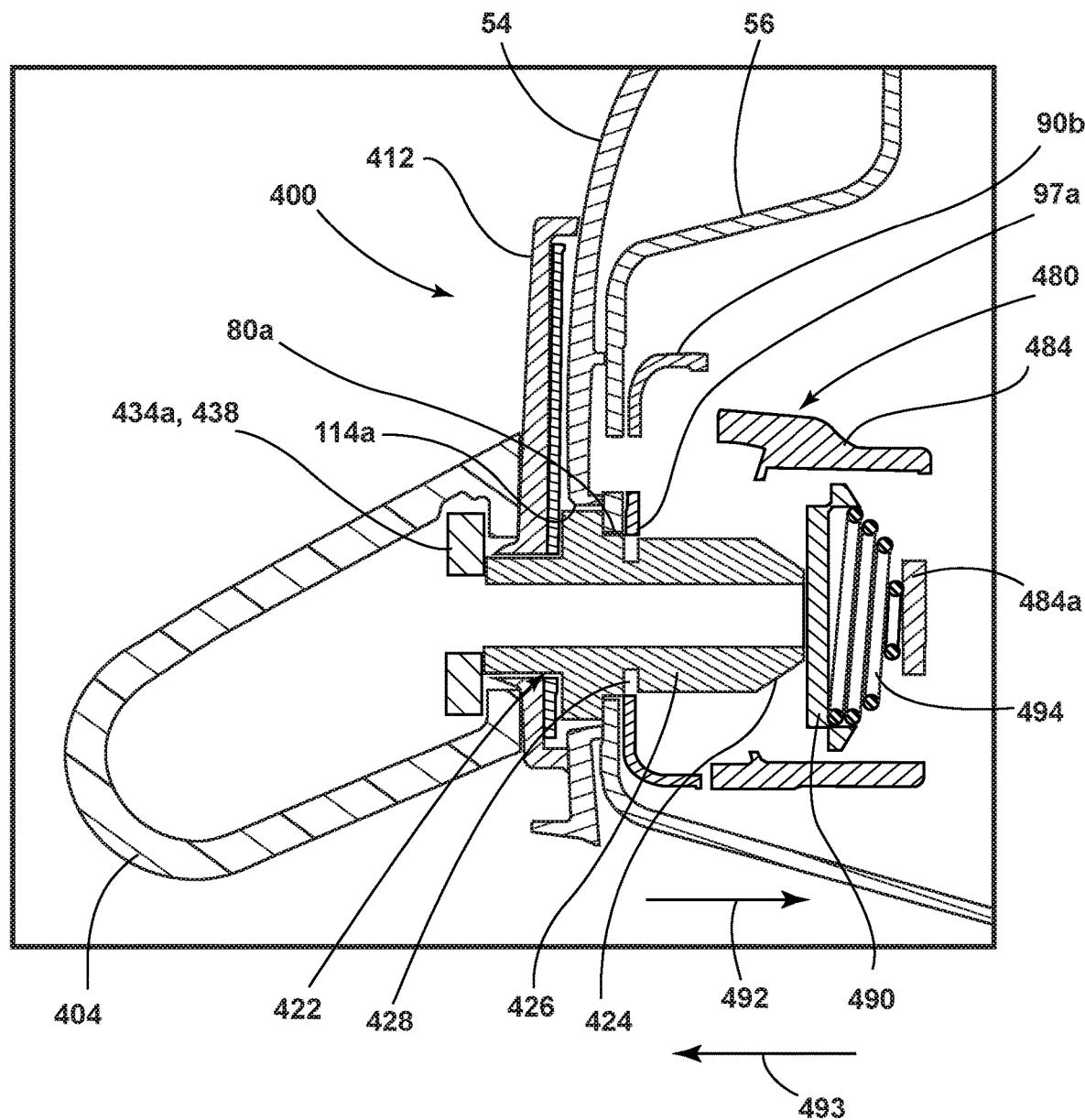
FIG. 48 is a cross-sectional view of a cone nut received through the mounting bracket and received within the button cover.

Referring now to FIG. 48, the button cover 480 is shown having a button 490 disposed therein which has been pushed laterally into the housing portion 482 in a direction as indicated by arrow 492. As the button 490 moves laterally into the housing portion 484, a spring 494 is loaded against a back wall 484a of the housing portion 484. In this way, as cone nut 422 enters receiving aperture 80a of the mounting bracket 56 and locking aperture 97a of locking plate 90b, the cone nut 422 will abut button 490 and move the button 490 laterally in a direction as indicated by arrow 492 to a loaded position against spring 494, as shown in FIG. 48. Thus, when the locking plate 90b is moved in the direction as indicated by arrow Q1 (FIG. 45) by release button 416 (FIG. 46), the spring 494 will act on button 490 to help eject the cone nut 422 from the housing portion 484 and ultimately from mounting bracket 56 in a direction as indicated by arrow 493. Again, this spring release of the cone nut 422 is also realized on cone nut 420 to aid in the ejection of the cone nuts 420, 422 from the mounted position on mounting bracket 56.

Thus, the buttons, exemplified by button 490 of FIG. 48, provide a spring eject feature to the seatback dock 135 (FIGS. 13 and 40), such that once the sliding locking plate 90b has been disengaged from the grooves 428 in the cone nuts 420, 422, the buttons 490 will actively push the cone nuts 420, 422 out of the seatback dock 135. The buttons 490, which abut and close the locking apertures 97a, 97b of the sliding locking plate 90b when the cone nuts 420, 422 are removed, provide a cleaner appearance to the seatback dock 135 if the customer does not close the retractable door 130 (FIGS. 12, 13) when no accessory is in place. The closure of the locking apertures 97a, 97b of the sliding locking plate 90b by the buttons 490 also acts as a shield to ensure small items are not easily pushed into the locking apertures 97a, 97b to interfere with the workings of the system.

Thus, when mounting the electronic device holder 10 to the seatback 16, a user will first make sure that the retractable door 130 is in the retracted position R (FIG. 13) on the seatback dock 135 to reveal access apertures 114a, 114b disposed on the seatback dock 135. With reference to FIG. 38, cone nut 422 will enter access aperture 114a and mount to receiving aperture 80a of the mounting bracket 56. Similarly, cone nut 420 will enter access aperture 114b and mount to receiving aperture 80b of the mounting bracket 56. As discussed above, cone nut 422 will also enter into locking aperture 97a as the locking plate 90b slides sideways on the mounting bracket 56 by the wedged engagement of the cone nut 422 and the locking aperture 97a. Similarly, cone nut 420 will enter locking aperture 97b until the cone nuts 420, 422 are fully inserted and locking plate 90b snaps into the locked position, as described above. The tactile feedback of the locking plate 90b ensures the user that the electronic device holder 10 is fully inserted into the seatback dock 135 and is readily supported by the mounting bracket 56.

Figure 49:
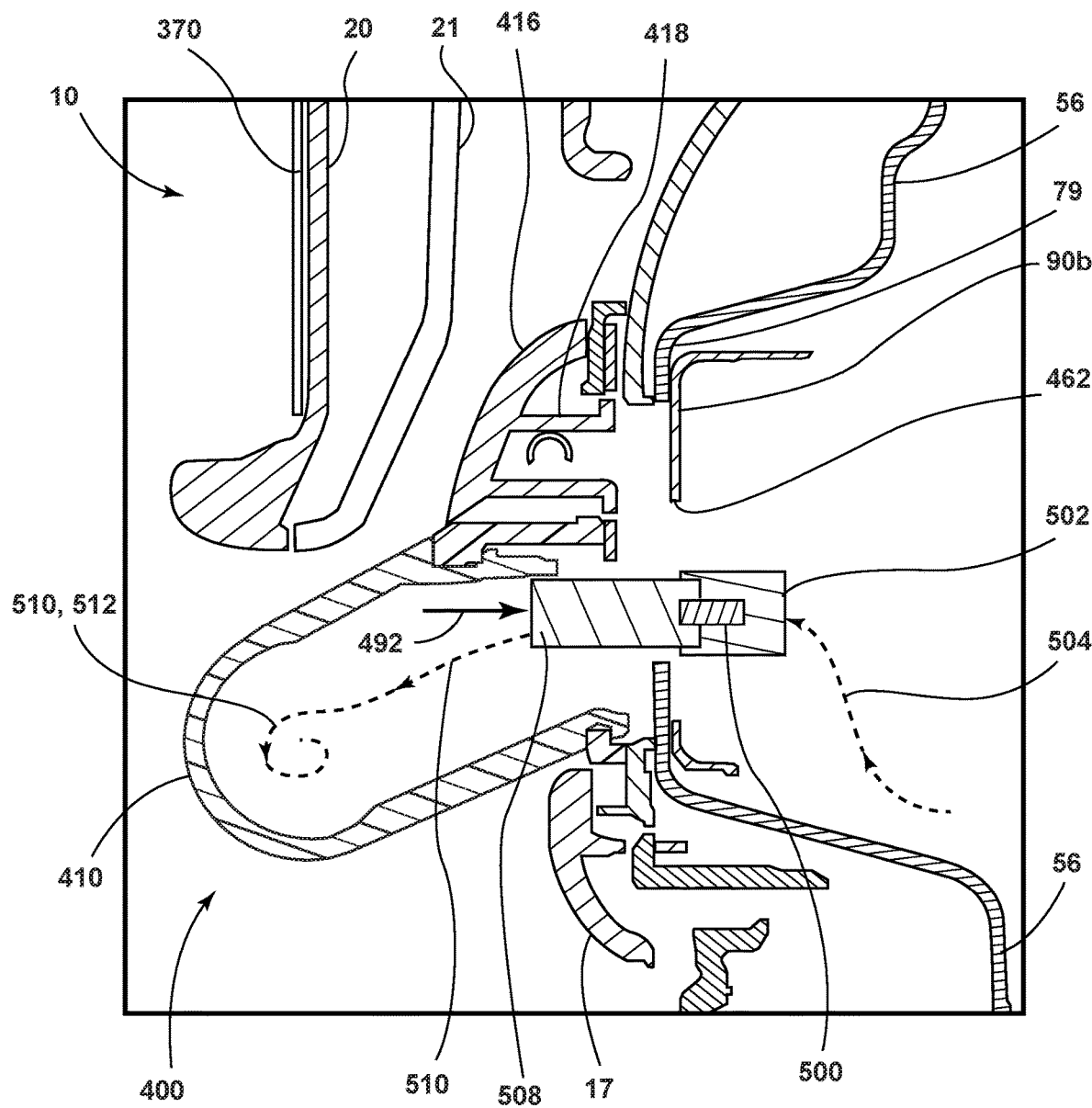
FIG. 49 is a cross-sectional view of an electrical connection between the electronic device holder and the vehicle seat.

Referring now to FIG. 49, the mounting portion 400 of the electronic device holder 10 is configured to electronically couple with a power source of a vehicle, such as power module 57 shown in FIG. 3. Thus, the mounting portion 40 includes a power plug 500 received in a female connector 502 which is coupled to a lead 504. It is contemplated that the female connector 502 may be disposed directly on the power module 57 (FIG. 3) or may be otherwise connected to the power module 57 through lead 504. As shown in FIG. 49, the female connector 502 is positioned within central aperture 462 of the locking plate 90b such that the power plug 500 can be received therethrough and connected to the female connector 502. The power plug 500 enters through the central aperture 462 of the locking plate 90b and further extends through an access aperture 506 disposed on the mounting bracket 56. The power plug 500 is coupled to a connector portion 508 which is further coupled to a lead 510 disposed in central raceway 410 of the mounting portion 400 of the electronic device holder 10. Lead 510 further includes a hinge portion 512 which is configured to be disposed at the hinge axis of the electronic device holder 10.

Figure 50:
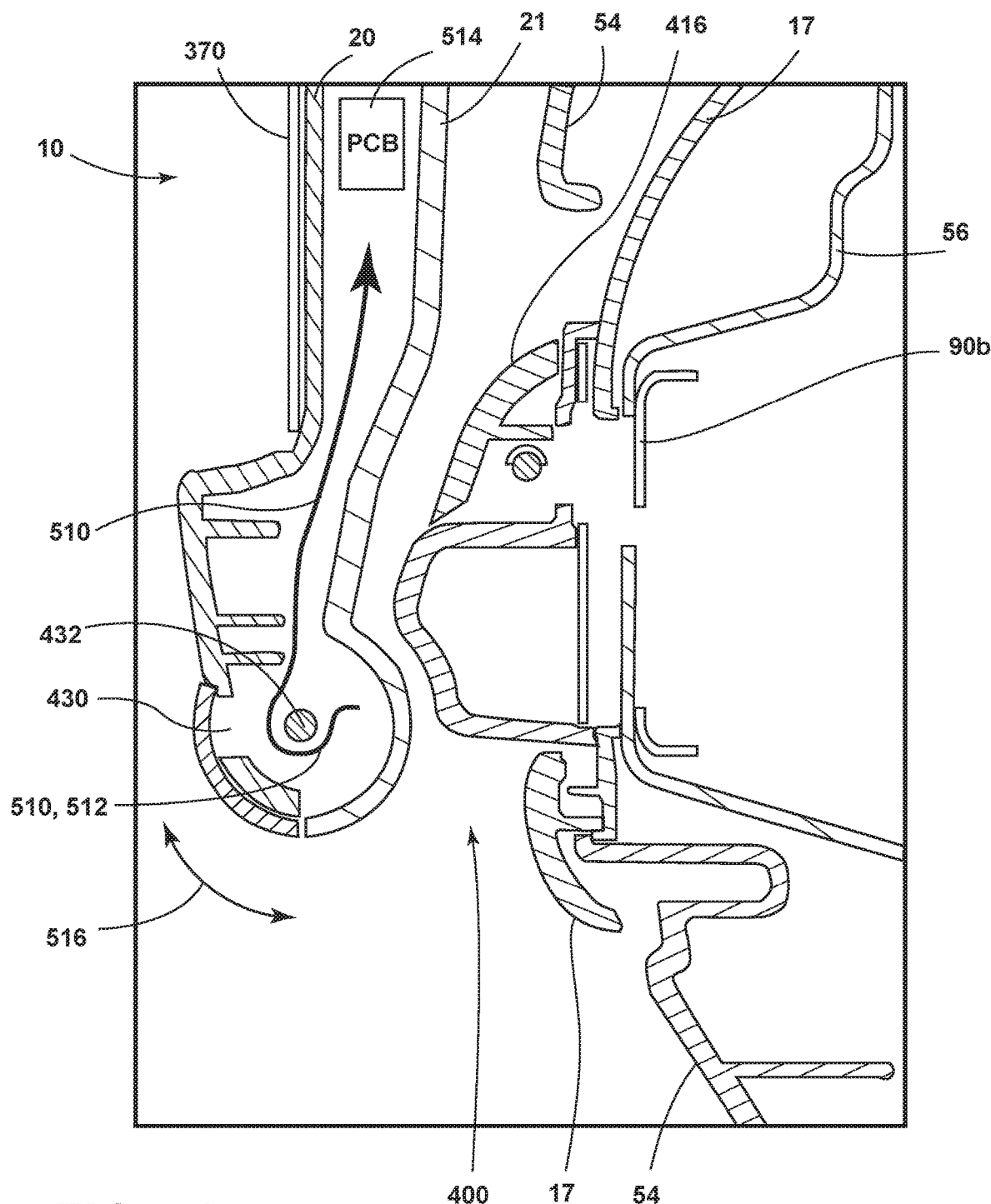
FIG. 50 is a cross-sectional view of the electronic device holder having concealed wiring disposed through the hinged connection to the vehicle seatback.

Referring now to FIG. 50, the hinge portion 512 of lead 510 is shown disposed at hinge 430 and around grooved hinge shaft 432. The lead 510 then continues upward between mounting surface 20 and rear housing 21 of the electronic device holder 10 to finally couple to a printed circuit board (PCB) 514 which is contemplated to be further coupled to power plug 316 via wire 360 as shown and described above with reference to FIG. 35A. Thus, the electronic device holder 10 is configured to electronically couple with a power source of the vehicle in an automatic manner when the first and second cone nuts 420, 422 are loaded onto the mounting bracket 56 and are in the locked position shown in FIG. 44B. In the locked position, power plug 500 aligns with female connector 502 to electronically couple the electronic device holder 10, as shown in FIG. 49. Thus, the wires and leads used in the electronic device holder 10 of the present invention are configured to be concealed as disposed in the mounting portion 400 to the electrical connector 40. The wires are concealed, yet allow for full pivotal movement of the electronic device holder 10, along a path as indicated by arrow 516 in FIG. 50, and also to allow lateral movement of the electrical connector 40 as the first door 26 opens and closes, as described above.

In assembly, first and second cone nuts 420, 422 are the primary load path between the removable electronic device holder 10 and the fixed seatback assembly 16. Load forces realized on the electronic device holder 10 pass from the electronic device holder 10, through the friction hinges 430 and hinge shaft 432 (FIG. 41), to the L-shaped bracket 434 through the M6 screw 470 (FIG. 44B), into the cone nut 422, into the mounting bracket 56 supported on the rear of the seatback frame 44 (FIG. 6), and into the sliding locking plate 90b coupled to the mounting wall 79 of the mounting bracket 56 (FIG. 45). In assembly, any up-down and side-to-side forces are transferred from the cone nuts 420, 422 and into the sides of the receiving apertures 80a, 80b (FIG. 7) in the mounting bracket 56. Forces toward the front of the vehicle are transferred from the collar 429 disposed around the cone nuts 420, 422 and into the rear face of the mounting wall 79 of mounting bracket 56 (FIG. 48). Forces toward the rear of the vehicle are transferred from the walls of the grooves 428 of the cone nuts 420, 422 the sliding locking plate 90b and then into the forward face of the mounting wall 79 of mounting bracket 56 (FIG. 44B). Thus, the load path is comprised of steel-to-steel connections throughout the assembly.

The electronic device holder 10 is designed to be intrinsically safe and this is typified by the action used to open the first and second doors 26, 28 and the automatic closure of the doors 26, 28. The first and second doors 26, 28 are simultaneously opened by hand actuation of the "shot gun" actuator 42 disposed on second door 28, but are configured to automatically spring closed when the detent release lever 36 is depressed (by the tablet or the user), or when the user taps the second door 28 inwardly towards the mounting surface 20. Similarly, as discussed above, the removable electronic device holder 20 is attached securely to the seatback 16 by pressing the cone nuts 420, 422 (FIG. 44A) forward into the two mounting apertures 80a, 80b of the main mounting bracket 54. Further, the sliding locking plate 90b (FIG. 43A) is sprung to the closed position (FIG. 45), such that when the occupant presses the cone nuts 420, 422 home against the rear face of the main mounting bracket 54, the mounting portion 400 will automatically lock without any further action from the occupant.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A mounting system for a device holder, comprising:
   a locking plate having a body portion with at least one slot disposed therethrough, wherein the locking plate is slideably mounted to a mounting bracket between first and second positions, and further wherein the mounting bracket includes a body portion having at least one mounting aperture disposed therethrough;
   at least one fastener coupling the locking plate to the mounting bracket at the at least one slot of the locking plate and the at least one mounting aperture of the mounting bracket;

a biasing mechanism operably coupled between the locking plate and the mounting bracket to bias the locking plate towards the first position; and a bezel removeably mounted to the mounting bracket and having an outwardly extending mounting member with an inset groove disposed thereon, wherein the mounting member is received through a receiving aperture of the mounting bracket, and further wherein a portion of the locking plate is received in the inset groove of the mounting member when the bezel is mounted to the mounting bracket.

2. The mounting system of claim 1, wherein the mounting member includes a body portion having the inset groove disposed on an inner portion of the body portion and an angled portion disposed at an outermost portion of the body portion.

3. The mounting system of claim 2, wherein the angled portion of the mounting member urges the locking plate towards the second position from the first position as the angled portion of the mounting member engages a perimeter of a locking aperture of the locking plate when the mounting member is received through the locking plate.

4. The mounting system of claim 3, wherein the perimeter of the locking aperture of the locking plate includes a rounded portion and an angled portion.

5. The mounting system of claim 4, wherein the angled portion of the mounting member engages the angled portion of the locking aperture when the mounting member is received through the locking aperture of the locking plate.

6. A mounting system for a device holder, comprising:
a locking plate slideably mounted to a mounting bracket via a fastener received through a slot of the locking plate and a mounting aperture of the mounting bracket; and a bezel removeably mounted to the mounting bracket and having a mounting member with a body portion with an inset groove and an angled outermost portion, wherein a portion of the locking plate is received in the inset groove when the bezel is mounted to the mounting bracket.

7. The mounting system of claim 6, wherein the locking plate is operable between first and second positions along an inner surface of the mounting bracket.

8. The mounting system of claim 7, including:
a biasing mechanism operably coupled between the locking plate and the mounting bracket to bias the locking plate towards the first position.

9. The mounting system of claim 8, wherein the angled outermost portion of the mounting member engages an angled portion of the locking aperture of the locking plate when the mounting member is received through the locking aperture of the locking plate.

10. A mounting system for a device holder, comprising:
a mounting bracket;
a locking plate slideably mounted to the mounting bracket between locked and unlocked positions;
a bezel removeably mounted to the mounting bracket; and
a mounting member outwardly extending from the bezel and having an angled outermost portion, wherein the angled outermost portion urges the locking plate towards the unlocked position as the mounting member is received through a locking aperture of the locking plate, wherein a perimeter of the locking aperture of the locking plate includes a rounded portion and an angled portion, and further wherein the mounting member includes a body portion having an inset groove disposed therearound.

11. The mounting system of claim 10, including:
a biasing mechanism operably coupled between the mounting bracket and the locking plate, wherein the biasing mechanism biases the locking plate towards the locked position.

12. The mounting system of claim 11, including:
a trim cover coupled to an outer surface of the mounting bracket, the trim cover including a retractable door operable between retracted and extended positions.

13. The mounting system of claim 12, including:
a post member slideably coupled to the bezel between first and second positions, wherein the post member extends through a central aperture of the trim cover and a central aperture of the locking plate, and wherein the post member includes a release button disposed on an outer portion thereof.

14. The mounting system of claim 13, wherein the post member engages a tab disposed on the central aperture of the locking plate at an inner portion of the post member to move the locking plate to the unlocked position from the locked position when the post member moves from the first position to the second position.

15. The mounting system of claim 14, including:
a spring coupled between the post member and the bezel, wherein the spring biases the post member towards the first position.

16. The mounting system of claim 10, including:
one or more friction hinges mounted on a first side of the bezel, wherein the mounting member is mounted to a second side of the bezel that is opposed to the first side of the bezel.

17. The mounting system of claim 10, wherein a portion of the locking plate is received in the inset groove of the mounting member when the bezel is mounted to the mounting bracket.

18. The mounting system of claim 17, wherein the angled outermost portion of the mounting member urges the locking plate towards the second position from the first position as the angled outermost portion of the mounting member engages the angled portion of the perimeter of a locking aperture.

* * * * *